United States Patent
Irwin et al.

(10) Patent No.: US 10,603,768 B2
(45) Date of Patent: Mar. 31, 2020

(54) INSTALLATION TOOL/FASTENER SYSTEM FOR ROOF TRUSS FRAMING AND CONSTRUCTION

(71) Applicant: OMG, Inc., Agawam, MA (US)

(72) Inventors: R. Timothy Irwin, Westfield, MA (US); Kevin G. Walters, Feeding Hills, MA (US); Mark J. Guthrie, West Springfield, MA (US); Tad A. Weiss, Westhampton, MA (US); Mark A. Dicaire, Northborough, MA (US)

(73) Assignee: OMG, Inc., Agawam, MA (US)

( * ) Notice: Subject to any disclaimer, the term of this patent is extended or adjusted under 35 U.S.C. 154(b) by 260 days.

(21) Appl. No.: 15/483,424

(22) Filed: Apr. 10, 2017

(65) Prior Publication Data
US 2017/0209990 A1    Jul. 27, 2017

Related U.S. Application Data

(63) Continuation of application No. 14/481,169, filed on Sep. 9, 2014, now Pat. No. 10,018,215, which is a (Continued)

(51) Int. Cl.
*B25B 21/00* (2006.01)
*B25B 21/02* (2006.01)
(Continued)

(52) U.S. Cl.
CPC ............ *B25B 21/002* (2013.01); *B25B 21/02* (2013.01); *B25B 23/005* (2013.01); *F16B 33/02* (2013.01);
(Continued)

(58) Field of Classification Search
CPC ....... B25B 15/00; B25B 21/00; B25B 21/002; B25B 21/02; B25B 23/005; F16B 33/02; F16B 35/04
(Continued)

(56) References Cited

U.S. PATENT DOCUMENTS 3,207,023 A * 9/1965 Knohl ................. F16B 25/0031
411/387.3
4,295,394 A  10/1981 DeCaro
(Continued)

FOREIGN PATENT DOCUMENTS

CN        85108469       9/1986
CN       101722488       6/2010
(Continued)

OTHER PUBLICATIONS

"Acutrak Headless Compression Screw System." Volunteers Reached the Beach to Dig up Microplastics | Acumed, Jun. 2014, www.acumed.net/products/screw-pin/acutrak-headless-compression-screw-system/. (Year: 2014).*

(Continued)

*Primary Examiner* — Joseph J Hail
*Assistant Examiner* — Arman Milanian
(74) *Attorney, Agent, or Firm* — Alix, Yale & Ristas, LLP

(57) ABSTRACT

An installation tool/fastening system employs an installation tool which is adapted for fastening a top plate to a roof support member or other structural connections and is particularly adapted for use in driving a wide variety of fasteners. One installation tool embodiment is adapted for driving a fastener having a head with a maximum diameter greater than the major diameter of the fastener threads. The installation tool is also adaptable to drive fasteners having a wide variety of drive-type head configurations including an external drive head and various recessed or socket configurations provided in the fastener head.

20 Claims, 53 Drawing Sheets

Related U.S. Application Data continuation-in-part of application No. 14/211,685, filed on Mar. 14, 2014, now Pat. No. 9,452,514.

(60) Provisional application No. 61/890,905, filed on Oct. 15, 2013, provisional application No. 61/787,170, filed on Mar. 15, 2013.

(51) Int. Cl.
  *B25B 23/00* (2006.01)
  *F16B 33/02* (2006.01)
  *F16B 25/00* (2006.01)
  *F16B 27/00* (2006.01)

(52) U.S. Cl.
  CPC ....... *F16B 25/0015* (2013.01); *F16B 25/0063* (2013.01); *F16B 25/0089* (2013.01); *F16B 27/00* (2013.01); *Y10T 29/49963* (2015.01)

(58) Field of Classification Search
  USPC .................. 81/452, 57.37; 227/119, 148
  See application file for complete search history.

(56) References Cited

U.S. PATENT DOCUMENTS

| | | | | |
|---|---|---|---|---|
| 4,510,826 A | * | 4/1985 | Marks | B25B 21/007 |
| | | | | 81/57.37 |
| 4,689,881 A | * | 9/1987 | Fall | B25B 13/481 |
| | | | | 140/119 |
| 5,740,705 A | | 4/1998 | Graham | |
| 5,791,207 A | * | 8/1998 | Ahdoot | B25B 23/101 |
| | | | | 81/452 |
| 5,827,031 A | * | 10/1998 | Swallow | B25B 15/005 |
| | | | | 411/387.4 |
| 5,921,454 A | * | 7/1999 | Larson | B25B 21/002 |
| | | | | 227/107 |
| 6,074,149 A | * | 6/2000 | Habermehl | F16B 25/0015 |
| | | | | 206/347 |
| 6,109,145 A | | 8/2000 | Habermehl | |
| 6,296,064 B1 | | 10/2001 | Janusz et al. | |
| 6,363,818 B1 | | 4/2002 | Habermehl | |
| 6,425,306 B1 | | 7/2002 | Habermehl | |
| 6,439,085 B1 | | 8/2002 | Habermehl et al. | |
| 6,647,836 B1 | | 11/2003 | Habermehl | |
| 6,729,522 B2 | | 5/2004 | Hempfling et al. | |
| 6,862,963 B2 | | 3/2005 | Habermehl et al. | |
| 6,990,731 B2 | | 1/2006 | Haytayan | |
| 7,134,367 B2 | | 11/2006 | Gehring et al. | |
| 7,287,681 B1 | | 10/2007 | Wen | |
| 7,341,146 B2 | | 3/2008 | Habermehl | |
| 7,900,420 B2 | | 3/2011 | Pope | |
| 8,376,203 B2 | | 2/2013 | Martel et al. | |
| 8,403,194 B2 | | 3/2013 | Tebo | |
| 8,955,210 B2 | | 2/2015 | Vandenberg | |
| 9,587,662 B2 | * | 3/2017 | Glass | F16B 13/002 |
| 2007/0271761 A1 | * | 11/2007 | Haytayan | B25B 21/002 |
| | | | | 29/432 |
| 2010/0213237 A1 | | 8/2010 | Tebo | |
| 2011/0089218 A1 | | 4/2011 | Santamarina et al. | |
| 2012/0204409 A1 | | 8/2012 | Vandenberg | |
| 2014/0161561 A1 | | 6/2014 | Tebo | |

FOREIGN PATENT DOCUMENTS

| | | |
|---|---|---|
| CN | 102325630 | 1/2012 |
| EP | 0034679 | 9/1981 |
| EP | 1226901 | 7/2002 |
| EP | 1226900 | 8/2008 |

OTHER PUBLICATIONS

Search Report.
International Preliminary Report on Patentability.
European Search Report.
Written Opinion dated Jul. 29, 2014.
Chinese Search Report.

* cited by examiner

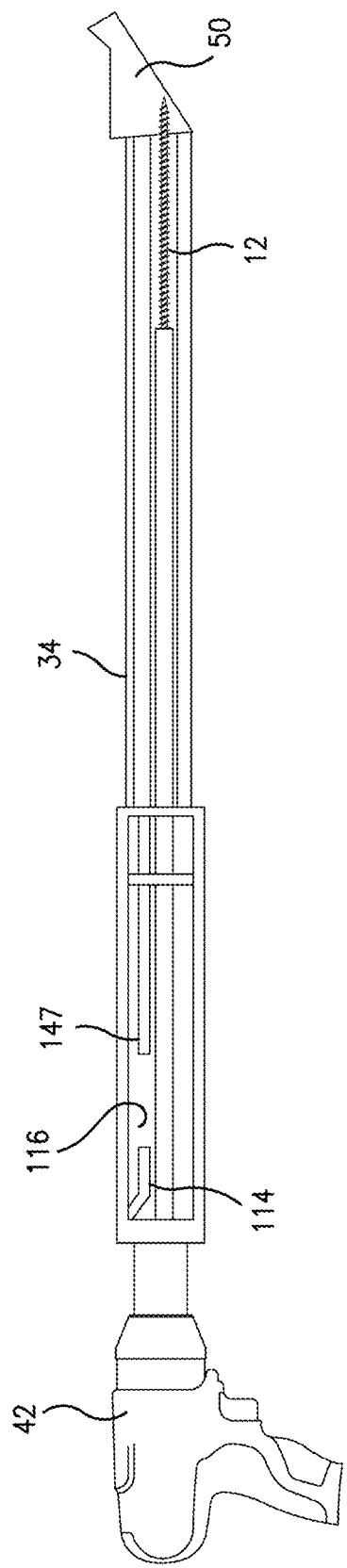

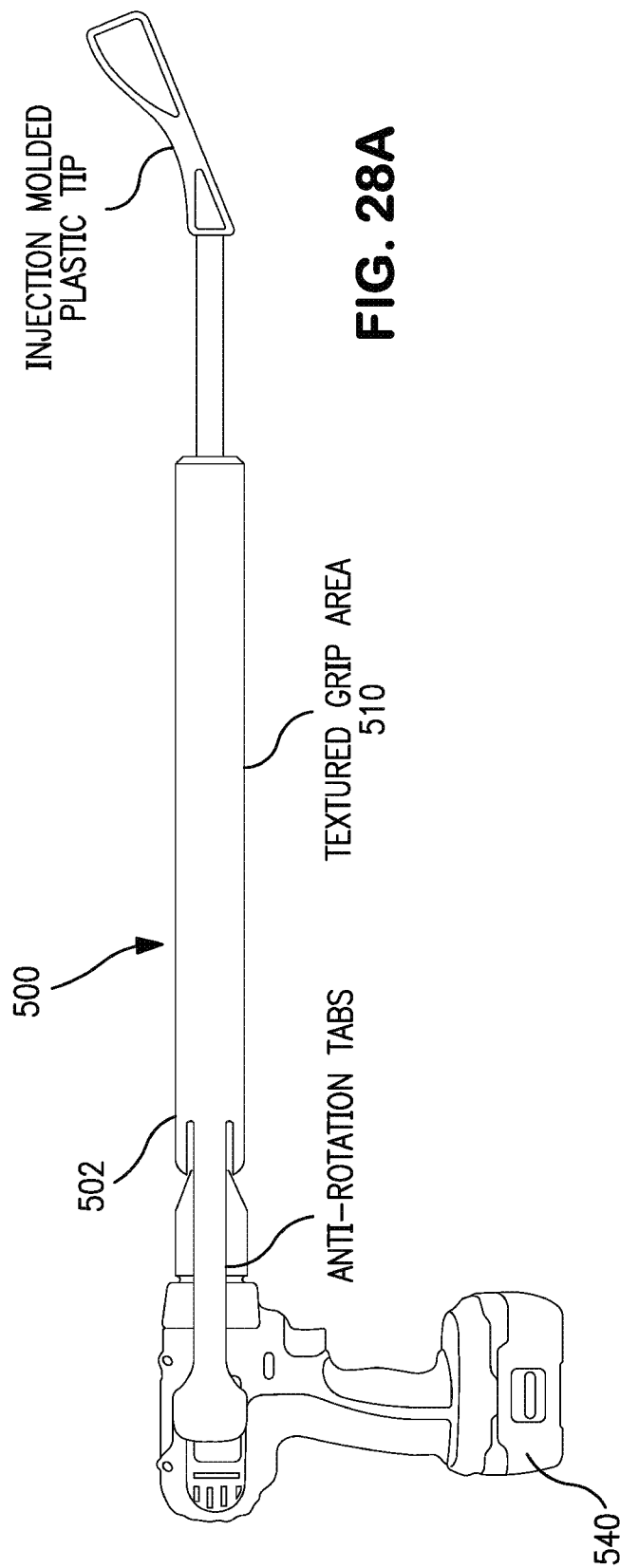
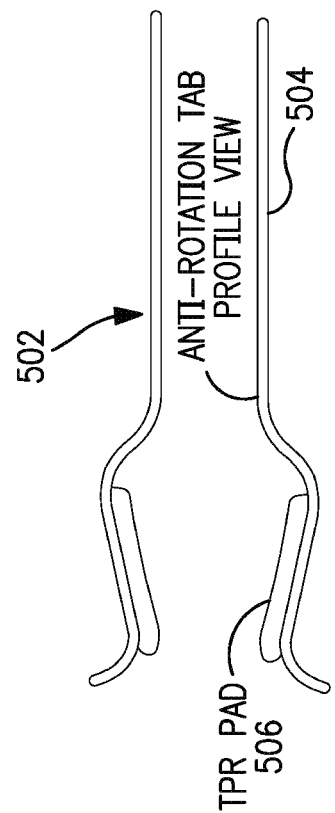
FIG. 28A
FIG. 28B

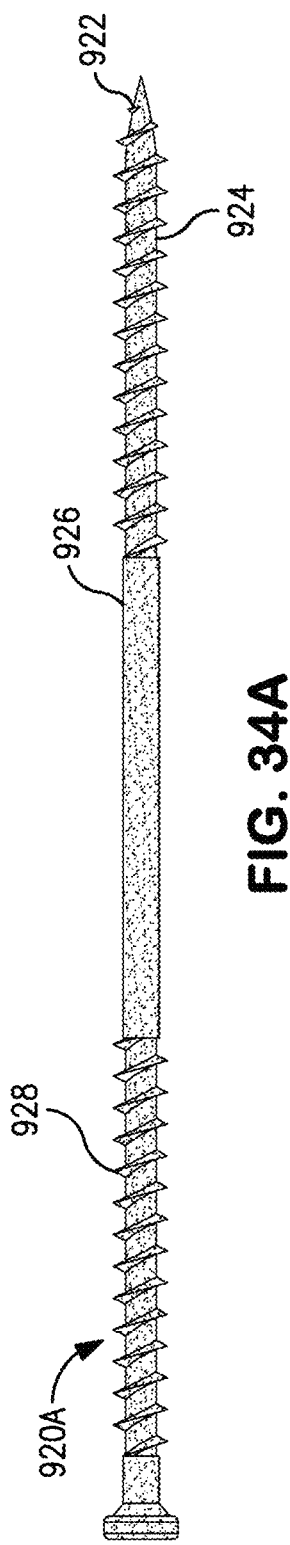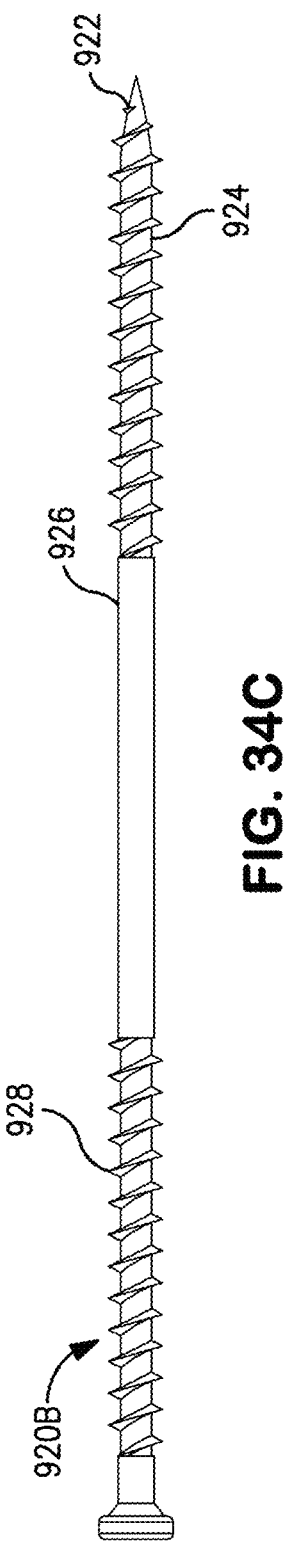

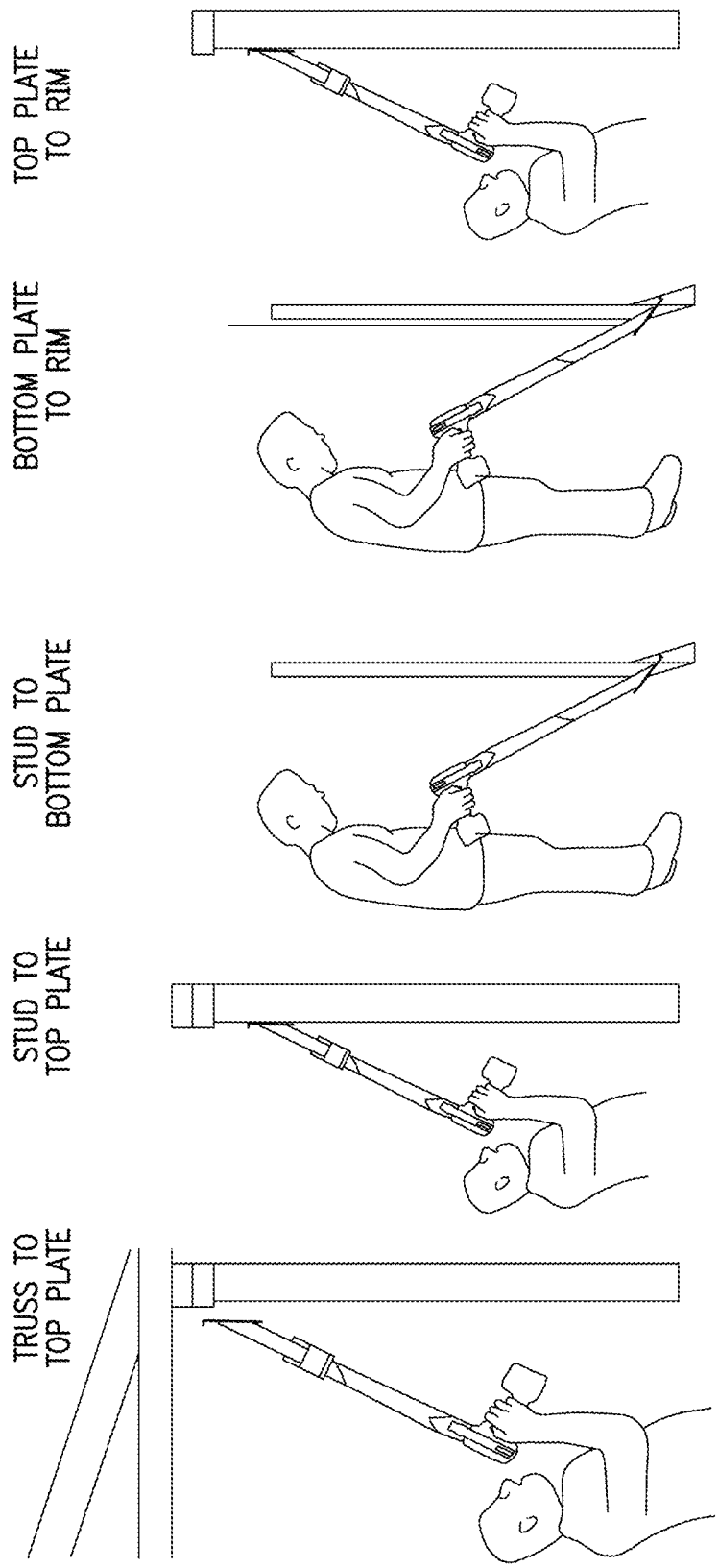

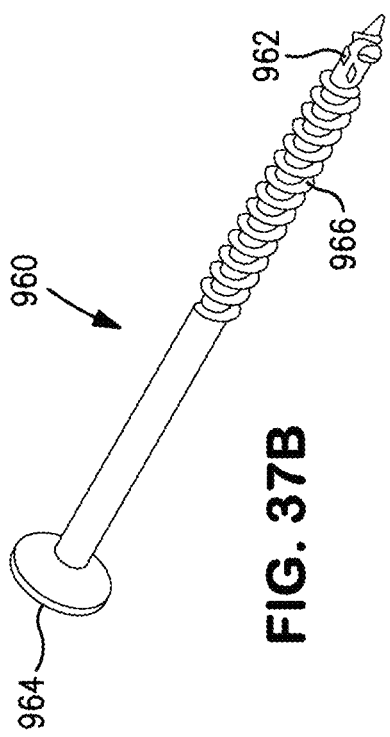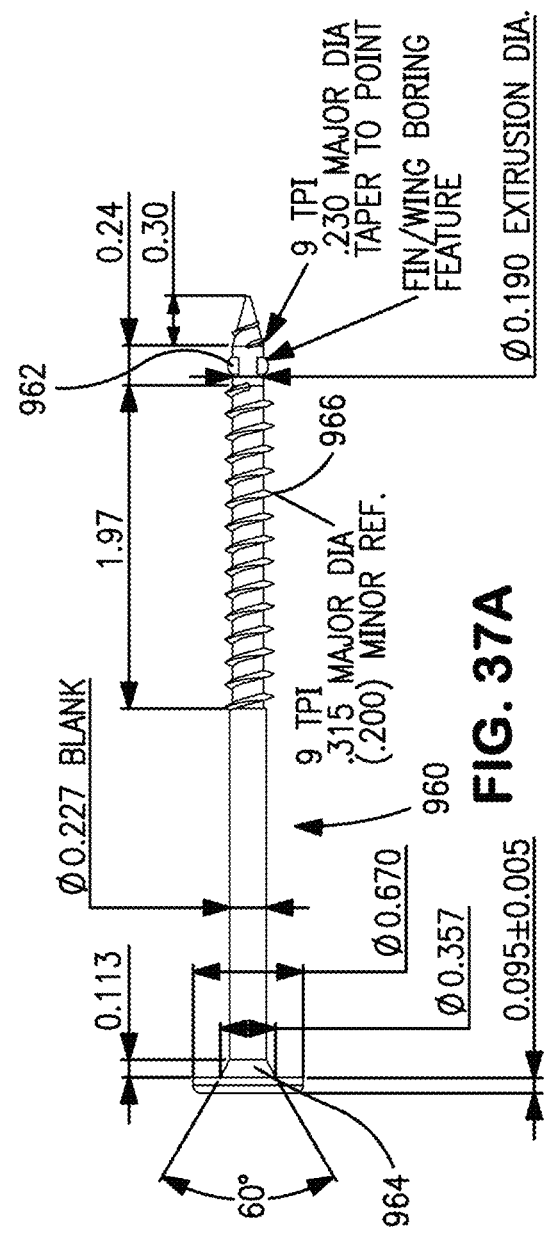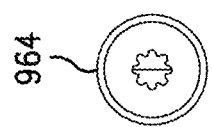

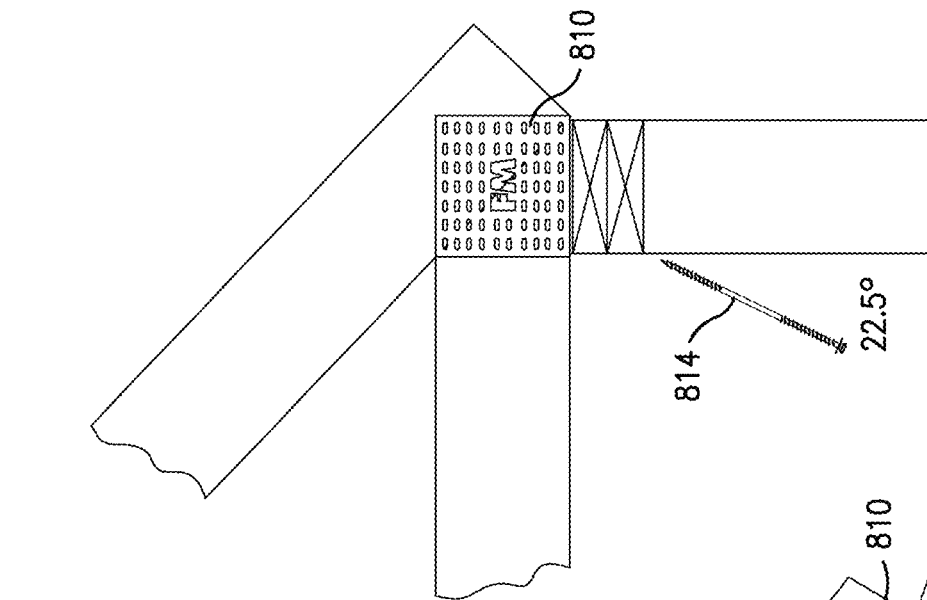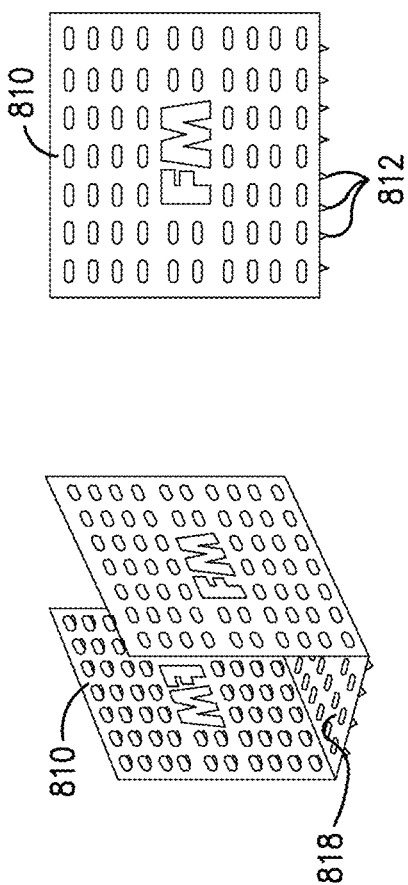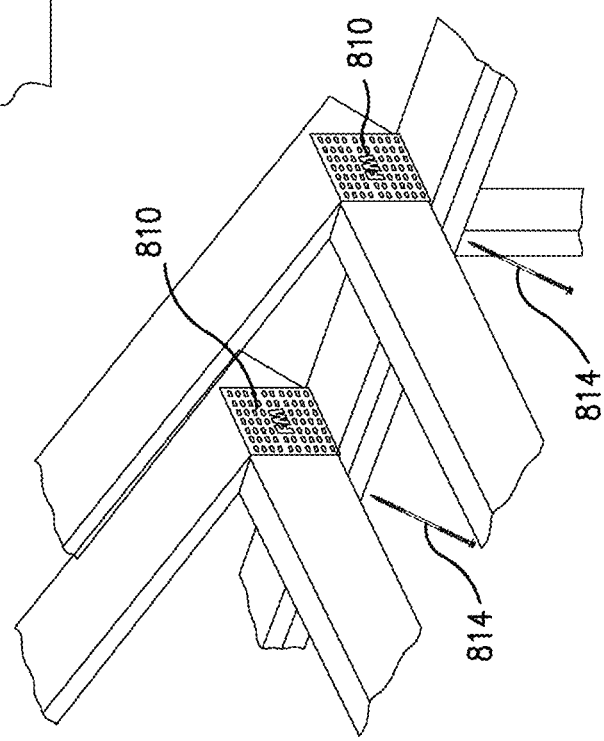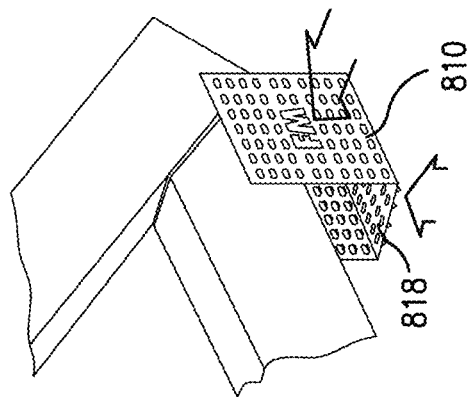

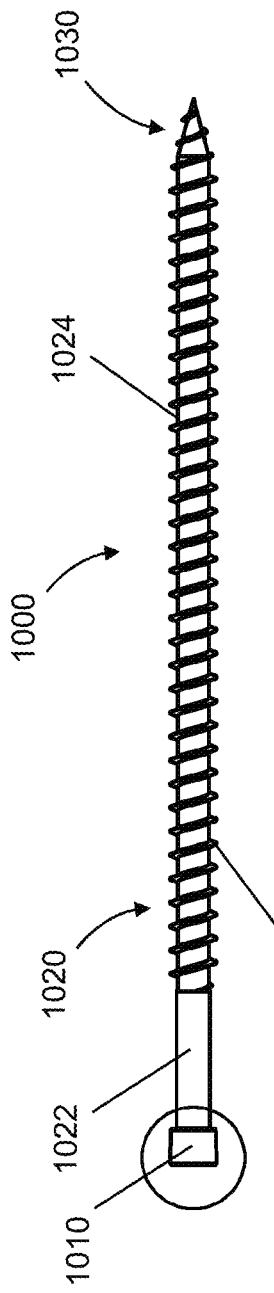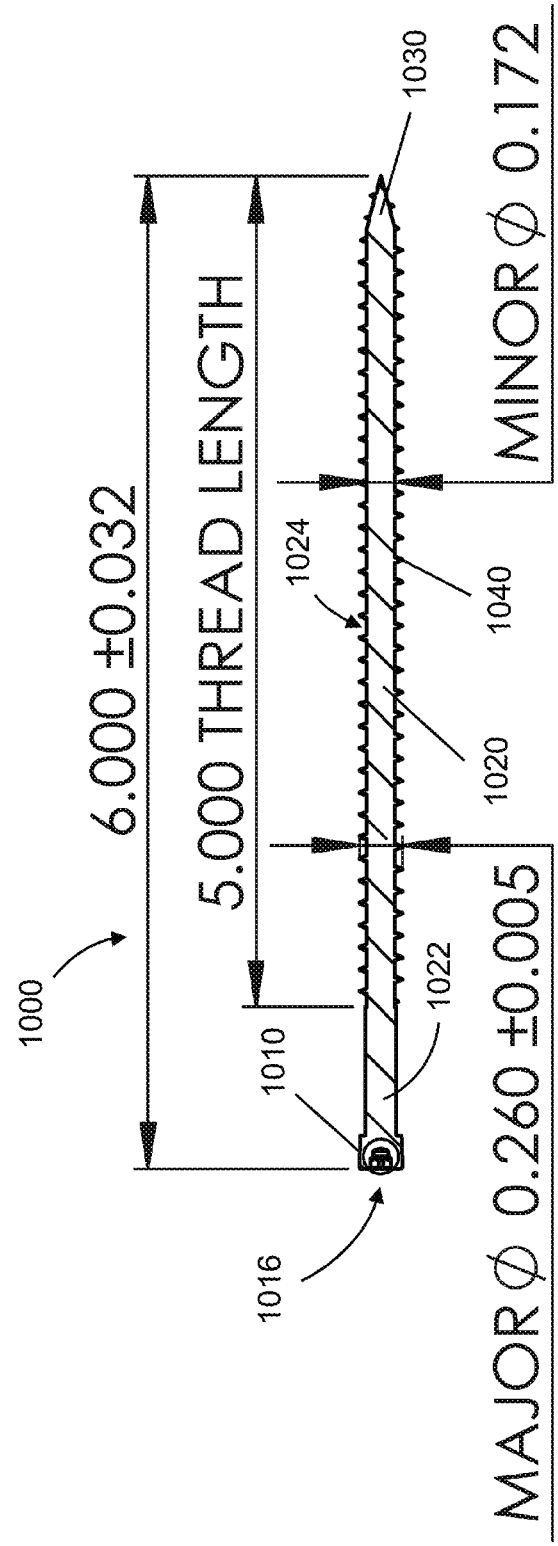

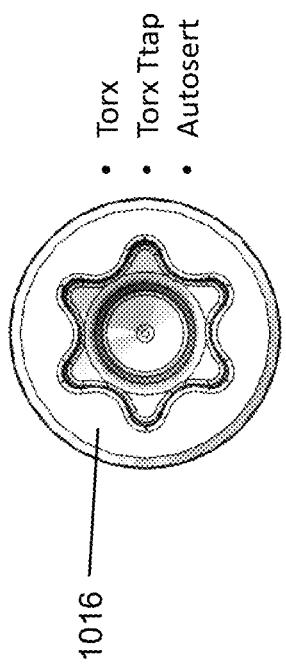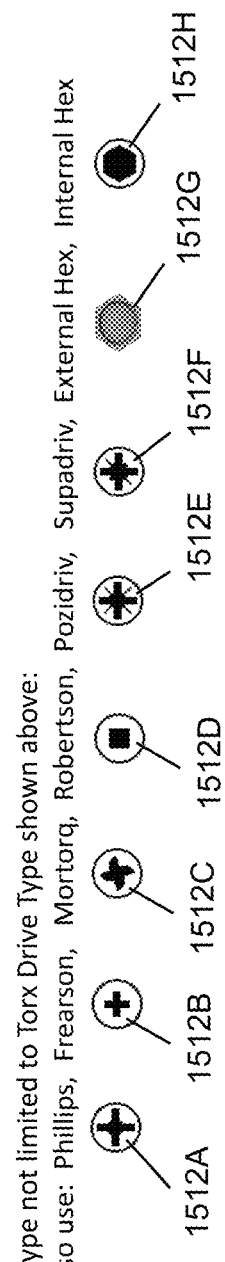
Fig. 46

INSTALLATION TOOL/FASTENER SYSTEM FOR ROOF TRUSS FRAMING AND CONSTRUCTION

CROSS-REFERENCE TO RELATED APPLICATIONS

This application is a continuation-in-part of patent application Ser. No. 14/481,169 filed on Sep. 9, 2014, which application is a continuation-in-part application of U.S. patent application Ser. No. 14/211,685 filed on Mar. 14, 2014, which application claims the priority of U.S. Provisional Patent Application No. 61/787,170 filed on Mar. 15, 2013 and U.S. Provisional Patent Application No. 61/890,905 filed on Oct. 15, 2013, the disclosures of which applications are incorporated herein in their entirety.

BACKGROUND

The present disclosure relates to generally fastening systems employed to connect wood structural members to comply with construction codes. The present disclosure relates generally to tools and methods for installing a fastener to secure wood framing components. More particularly, this disclosure relates to tools and techniques to precisely install fasteners to secure the top plate to roof trusses or rafters.

Local and state building codes, which are typically based on universal codes such as the International Residential Code and the International Building Code, set forth various requirements for securing wooden framing components. Provisions are made in such codes to require that the top plate and the rafters, or roof trusses, must be connected to comply with pre-established connection force standards calculated to resist substantial uplift forces that may be experienced throughout the lifetime of the structure. For locations which are susceptible to high wind uplift and/or seismic activity, typically, a stronger force-resistant connection between the top plate and rafters or trusses is required.

To satisfy building code requirements, the use of metal brackets and a large number of nails are commonly installed using pneumatic nail guns. Many of the structural locations requiring these robust connections are at the top corners of walls and where walls meet roof trusses and the like. These locations typically require workers to stand on ladders and employ a hammer or pneumatic nail guns to nail brackets to roof rafters, roof trusses and the like. A common complaint is that the ladders are not a stable platform and maneuvering bulky nail guns into cramped locations while standing on a ladder is both difficult and dangerous.

The concept of a continuous load path (CLP) from the peak of the roof to the foundation is one that is gaining some popularity in the construction industry. Various devices of straps, brackets, cables, threaded rods and bolts are currently employed to tie various building components together and create an integrated unit where stress on any one structural component is transferred to other components for additional durability.

There are a number of techniques, fasteners and hardware items that are conventionally employed to provide the required connection between the top plate and the rafters or roof trusses. Hurricane clips or other forms of metal straps or clips are traditionally used and secured by multiple nails or threaded fasteners. There is commonly a trade-off between connection integrity and construction efficiency. For example, hurricane clips, which are effective and widely used in many locations, may require eight or more nails or threaded fasteners to meet the requisite code connection standard.

It is possible to employ threaded fasteners such as elongated screws to replace some of the metal brackets and nails currently employed to meet building codes. However, such screws need to be installed at a particular angle and position to ensure penetration through several wood members to engage, for example, a roof truss or rafter. There is a need for a construction system that would facilitate the use of threaded fasteners to connect building components in a manner that meets building codes and allows building inspectors to visually confirm correct installation of such threaded fasteners.

A highly secure and efficient connection between the top plate and rafters or roof trusses can be implemented by employing multiple specialty six-inch threaded fasteners, such as TimberLOK® wood screws manufactured and marketed by OMG, Inc., of Agawam, Mass. To secure the framing components with the sufficient retentive force, each threaded fastener is driven through the top plate and into the rafters or roof trusses at a 22.5±5° optimum angle with respect to the vertical. Although securing multiple threaded fasteners is typically more efficient than attaching a hurricane clip or other strap-type connector, it is difficult to consistently implement a 22.5° angle within a reasonable range of precision. The usage of protractors, levels and other similar-type tools to obtain the optimum angle for the threaded fastener has proven to be clumsy, difficult, time consuming and, at best, only marginally advantageous over more conventional securement methods.

The present disclosure addresses the need for a tool and method and associated fastener to connect the top plate and rafters or roof trusses by efficiently installing multiple threaded fasteners having a consistently precise optimum connection angle.

Definitions

As used herein, the term "roof support member" means any framing component that provides structural support to a roof of a building, such as a rafter, a truss or a horizontal ceiling joist.

As used herein, the term "top plate" means the horizontal framing component (which may include two or more members such as two 2×4-inch members) attached to the topmost portion of the vertical structural members or studs to which the roof support members are mounted and secured.

SUMMARY

Briefly stated, an installation tool is employed to fasten a first member to a second member. The installation tool comprises a driver assembly having an elongated tube assembly with a proximal end and a distal end. The tube assembly is preferably telescopic. A driver, which generates torque, is mounted adjacent the proximal end. A torque transfer unit is disposed in the tube for transferring torque produced by the driver to a fastener coupler adjacent the distal end. A guide assembly is mounted adjacent the distal end and has an end and a locating surface and a fastener channel defining an axis disposed at an angle θ to the locating surface. The fastener channel is configured to receive a fastener so that when the locating surface is engaged against the first member and the locating end is positioned adjacent the second member and the fastener is received in the channel and the driver is energized, the fastener coupler engages the fastener and is torqued to drive the fastener through the first member at the angle θ into the second member. The angle θ is preferably approximately 22½°. A stabilizing piercing edge preferably projects from the locating end. The stabilizing edge is the vertex of a square stabilizer plate.

The telescopic tube assembly comprises a proximate tube receiving the driver and is retractable relative to a second tube. The second tube is lockable to the proximal tube at an extended position. A handle is slidably adjustable relative to the telescopic tube assembly. The handle has a grip which generally projects radially relative to the telescopic tube assembly. The driver may be a battery powered drill or have a cord for an electrical connection. The telescopic tube assembly is preferably configured so that the first tube is attached to the driver and is slidably engageable with the second tube, and the first tube retracts relative to the second tube as the driver drives the fastener. The first member is preferably a top plate and the second member is a roof support member.

An installation tool fastens a top plate to a roof support member and comprises an elongated telescopic tube assembly with a proximal end portion and a distal end. The proximal end portion is adapted to receive a power tool. A torque transfer unit is disposed in the tube assembly for transferring torque produced by the power tool to a fastener coupled adjacent the distal end. A guide assembly is mounted at the distal end and has a locating end and a locating surface. A fastener channel defines an axis disposed at an angle θ to the locating surface and is configured to receive a fastener. The locating surface and the end are positioned relative to the top plate and roof support member. The fastener is received in the channel and the received tool is energized. The fastener coupler engages the fastener and is torqued to drive the fastener through the top plate at an angle θ into the roof support member.

The angle θ is preferably 22½°. A handle is mounted to the telescopic tube assembly. A stabilizing edge projects from the locating end. The stabilizing edge is a vertex of a plate removably mounted to the guide assembly. The fastener is preferably a wood screw approximately 6 inches or more in length.

A handle assembly secures the telescopic tube assembly in an extended position and is releasable to allow the telescopic tube assembly to retract. The tube assembly retracts a distance approximately equal to the length of the fastener when the fastener is driven.

A method for connecting a top plate to a roof support member comprises loading a fastener in a rotary drive installation tool having perpendicular locating surface and locating end and employing the locating structures to orient the fastener to be driven at a proper entry angle. The method further comprises energizing the installation tool to drive the fastener through the top plate into the support member at the proper entry angle. An end projection of the installation tool is stabbed into a wood member to stabilize the tool. The method further comprises seating the fastener in the top plate at a location at least three feet above the height of the installer while the installer remains standing at a ground level.

A fastener for an installation tool comprises a head portion defining a recess for coupling with a driving tool. The head portion has a maximum head diameter. An elongated shank longitudinally extends from the head portion and terminates in a tapered tip. A helical thread longitudinally extends along the shank and has a major diameter substantially equal to the maximum head diameter.

In one preferred embodiment, the fastener has a longitudinal length of approximately 6.00 inches and the helical thread has a pitch of 7.5 threads per inch. The helical thread preferably extends onto the tapered tip. The shank has an unthreaded portion adjacent the head. The major diameter of the thread and the maximum head diameter are each approximately 0.26 inches in one preferred embodiment. The helical thread extends approximately 5.00 inches. The head portion has a slight taper from a maximum diameter portion adjacent an engagement end. In one preferred embodiment, the recess is a T-25 AutoSert™ drive socket.

Another fastener embodiment for an installation tool comprises a head portion defining a recess for coupling with a driving tool and having a first coupling end with a maximum head diameter and uniformly tapering toward a second end at an acute angle. An elongated shank longitudinally extends from the head portion and terminates in a tapered tip. The shank has a threaded portion and an unthreaded portion adjacent the second head end. A helical thread longitudinally extends along the shank onto the tapered tip and has a major diameter substantially equal to the maximum head diameter. In one preferred embodiment, the acute angle is approximately 4°.

An installation tool and fastener for fastening a member to a second member comprises a fastener having a head with a coupling recess and a maximum diameter and a shank extending from the head and having a thread with an uninterrupted major diameter substantially equal to the maximum head diameter. A transfer assembly comprises an elongated telescopic tube assembly having a proximal end portion and a distal end. The proximal end portion is adapted to receive a power tool. A torque transfer unit is disposed in the tube assembly for transferring torque produced by the power tool to a fastener coupler adjacent the distal end. A guide assembly is mounted at the distal end and has a guide and a fastener channel defining an axis and a uniform channel diameter. The channel diameter is slightly greater than the major diameter of the fastener thread and is configured to receive the fastener. When the guide is positioned relative to the first member, the fastener is received in the channel and the received tool is energized, the fastener coupler extends into the head recess to rotatably engage the fastener and the received tool drives the fastener through the first member into the second member.

In one embodiment, the fastener is a wood screw approximately 6.00 inches or more in length and the maximum head diameter and the major diameter of the fastener thread is approximately 0.26 inches. The head preferably extends an axial length of 0.20 inches and has a uniform inward taper at an acute angle from the maximum head diameter. The fastener thread preferably has pitch of 7.5 threads per inch and a thread flank angle having a range of 25° to 45°.

An installation tool and fastener for fastening a first member to a second member comprises a fastener having a driver head with a drive-type and a maximum head diameter. A shank extends from the head and has a thread with a major diameter greater than the maximum head diameter. A transfer assembly comprises an elongated tube assembly having a proximal end portion and a distal end. The proximal end portion is adapted to receive a torque driver. A torque transfer unit is disposed in the tube assembly for transferring torque produced by the torque driver to a fastener coupler adjacent the distal end. A guide assembly is mounted at the distal end and has a guide and a fastener channel defining an axis at an acute angle to the guide. The fastener channel has a uniform channel which is slightly greater than the major diameter and is configured to receive the fastener. When the guide is positioned relative to the first member, the fastener is received in the channel and a received torque driver is energized, the fastener coupler rotatably engages the driver head and the received torque driver drives the fastener through the first member into the second member.

The drive-type may be either a Torx™, a TorxTTap™ a TorxPhase™, an AutoSert™ and a T-25 AutoSert™ drive. The drive-type may also be a Philips drive, an external square drive, an internal square drive, an external hex drive and an internal hex drive. In some embodiments, the drive-type is selected from the group consisting of Freeroom™, Mortorq™, Roberts™, Pozidriv™ and Supadriv™ drives. The shank has an unthreaded portion adjacent the head and the thread extends approximately 5.00 inches.

In another embodiment, the installation tool and fastener for fastening a first member to a second member comprises a fastener having a head with a drive-type and maximum head diameter and a shank extending from the head and having a thread with a major diameter less than the maximum head diameter. A transfer assembly comprises an elongated tube assembly having a proximal end portion and a distal end. The proximal end portion is adapted to receive a power tool and a torque transfer unit is disposed in the tube assembly transfers torque produced by the power tool to a fastener coupler adjacent the distal end. A centering module is disposed in the tube assembly. The centering module engages the fastener shank to center the fastener in the tube. A guide assembly is mounted at the distal end and has a guide in a fastener channel defining an axis in acute angle to the guide. The fastener channel has a uniform channel diameter which is slightly greater than the maximum diameter and is configured to receive the fastener. When the guide is positioned relative to the first member, the fastener is received in the channel and a received tool is energized, the fastener coupler rotatably engages the driver head and the received tool drives the fastener through the first member into the second member. The drive-type may be selected from the various groups as previously described. The fastener preferably has a longitudinal length of approximately 6 inches.

In another embodiment, an installation tool and fastener for fastening a first member to a second member comprises a fastener having a head with an external drive head and a shank extending from the head and having an uninterrupted thread. The fastener has a maximum diameter. A transfer assembly comprises an elongated telescopic tube assembly having a proximal end portion and a distal end. The proximal end portion is adapted to receive a power tool and torque transfer unit is disposed in the tube assembly. A torque transfer unit disposed in the tube assembly transfers torque produced by the power tool to a fastener coupler adjacent the distal end. A guide assembly is mounted at the distal end and has a guide and a fastener channel defining an axis at an acute angle to the guide. The fastener channel has a uniform channel diameter which is slightly greater than the maximum diameter and is configured to receive the fastener. When the guide is positioned relative to the first member, the fastener is received in the channel and the received tool is energized, the fastener coupler engages the head to rotatably drive the fastener through the first member into the second member.

The external drive may be an external square drive or an external hex drive.

BRIEF DESCRIPTION OF THE DRAWINGS

FIG. 4A is a fragmentary side sectional view of the structure of FIG. 4, illustrating a fastener connecting a top plate to a roof support member at a location adjacent a vertical stud;

FIG. 4B is a fragmentary side sectional view of the structure of FIG. 4, illustrating a fastener connecting a top plate to a roof support member at a location between vertical studs;

FIGS. 15A-15D are annotated representative side elevational views, partly in schematic, illustrating the sequential operation of the installation tool of FIG. 13;

FIGS. 28A and 28B are annotated side views of an installation tool together with an enlarged top plan view of a portion of the tool, respectively;

FIGS. 34A-34D are respectively a side view of a fastener employed in an installation tool, an enlarged top plan view of the fastener and a side elevational view of a fastener with a different tint together with an enlarged top plan view of the fastener with the different tint;

FIGS. 35A-35E schematically illustrate an installer using an installation tool for fastening respectively a truss to a top plate, a stud to a top plate, a stud to a bottom plate, a bottom plate to a rim, and a top plate to a rim;

FIGS. 37A-37C are respectively a diagrammatic view of a fastener which may be employed for an installation tool, a perspective view of the fastener and a top plan view of the head of the fastener;

FIGS. 39A-39E respectively illustrate another bracket for construction in connection with a portion of a truss, a schematic view of a fastener in connection with a second truss assembly portion together with the brackets, a third side end view of the bracket together with a fastener in a truss assembly, a perspective view of the bracket and a side elevational view of the bracket;

FIGS. 44A-F are respectively a side view; a left side end view; a diagrammatic sectional view taken along line C-C of FIG. 44B; an enlarged diagrammatic sectional view of the circled portion of FIG. 44A; an enlarged fragmentary sectional view, partly in diagram form, of the sectional view of FIG. 44C; and an enlarged fragmentary diagrammatic view of a thread portion, of a fastener which may be employed with an installation tool;

FIG. 46 is a schematic diagram of various drive-types which may be incorporated into the fasteners of FIGS. 45A-45D;

DETAILED DESCRIPTION

With reference to the drawings wherein like numerals represent like parts throughout the several figures, a fastener installation tool is generally designated by the numeral 10. The fastener installation tool 10 is a heavy-duty hand tool adapted for installing threaded fasteners 12 at a consistent angle of approximately 22½° (to the vertical) into a top plate for connection with a roof support member.

Figure 4:
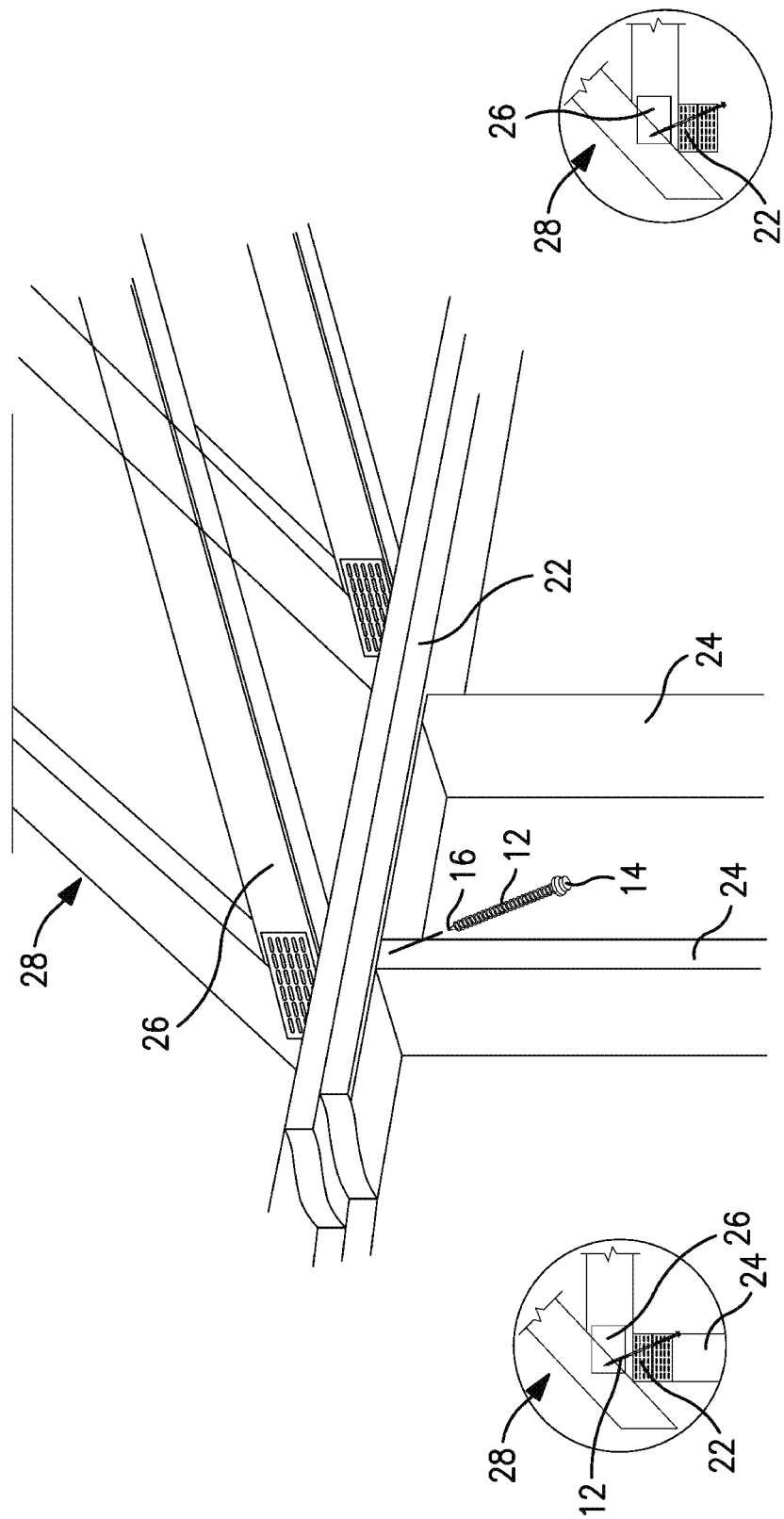
FIG. 4 is a representative perspective view, partly in schematic, of a structure during its construction phase and illustrating the usage of a fastener to connect a top plate to a roof support member.

As best illustrated in FIGS. 4, 4A and 4B, for a representative structure 20 for which the installation tool 10 is particularly adapted, a top plate 22, which may include a single 2×4 or a double 2×4, is mounted at the top of spaced vertical studs 24. Roof support members 26 of roof trusses 28 are mounted and supported on the top plate 22. Threaded fasteners 12 are driven into the top plate at a 22½° angle for engagement with the roof support member 26. Multiple spaced threaded fasteners 12 are sequentially driven at pre-established spacings to provide the proper uplift resistance.

FIG. 4A illustrates the fastener driven at the upper location of the stud 24. FIG. 4B illustrates the fastener as driven at the location along the top plate between the vertical studs 24. The fasteners 12 are each preferably a six-inch fastener having a continuous threaded portion with a pointed tip and a head defining a socket or a six-inch TimberLOK® fastener manufactured and marketed by OMG, Inc., of Agawam, Mass. The TimberLOK® fastener 12 has a hex head 14 and a drill tip 16. Alternative configurations for head 14 are also possible.

As will be further described below, the installation tool 10 is preferably dimensioned, principally by means of the length of a telescopic tube assembly 30, to provide an installation tool which may be effectively used by installers having a wide range of height and reach for a wide range of commonly vertically dimensioned structures. The principal function of the telescopic tube assembly 30 is to exert positive forward or upward pressure against the top plate/roof support interface.

Figure 5:
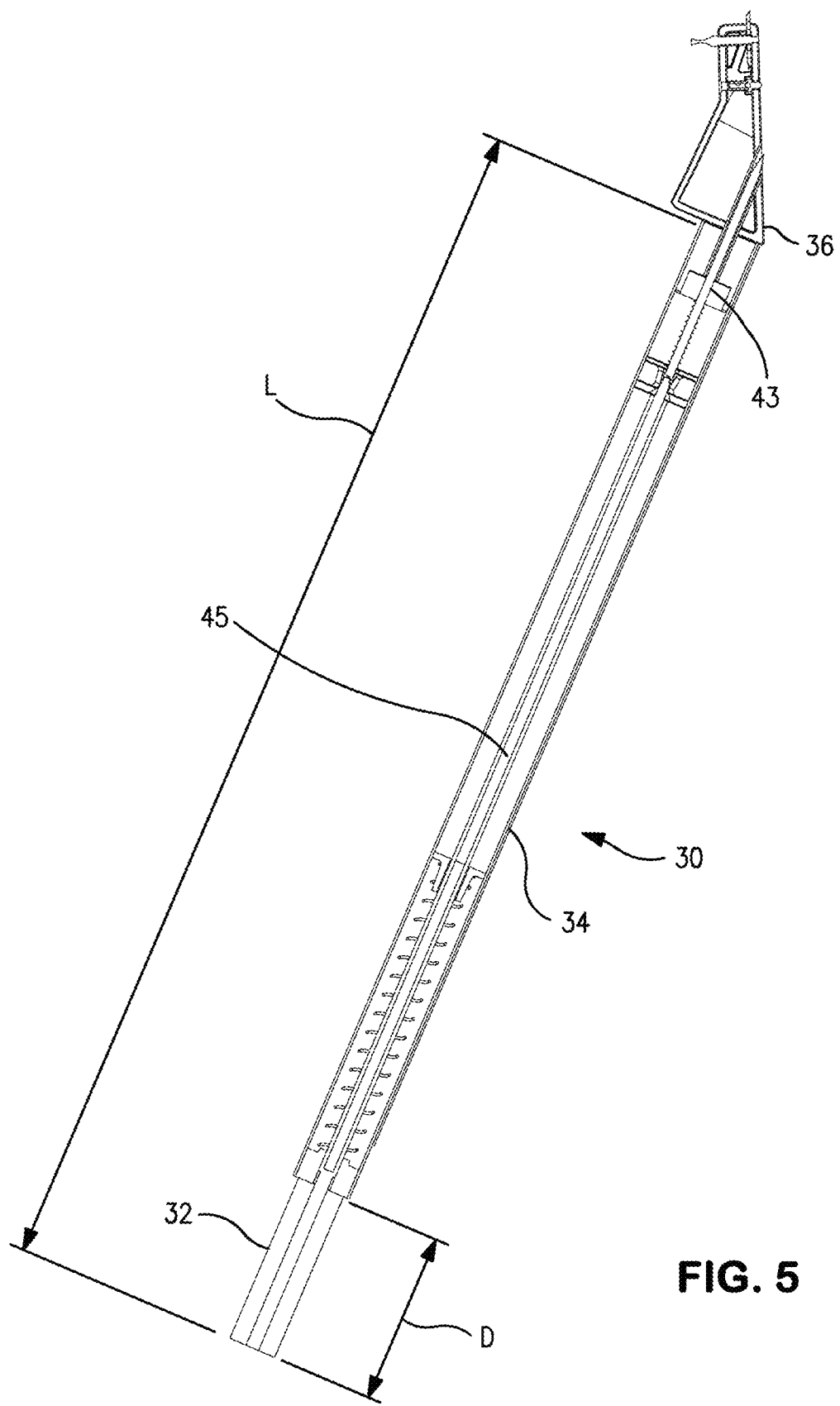
FIG. 5 is a side elevational view, portions broken away to show detail and partly in diagram form, of the installation tool of FIG. 1.
Figure 6:
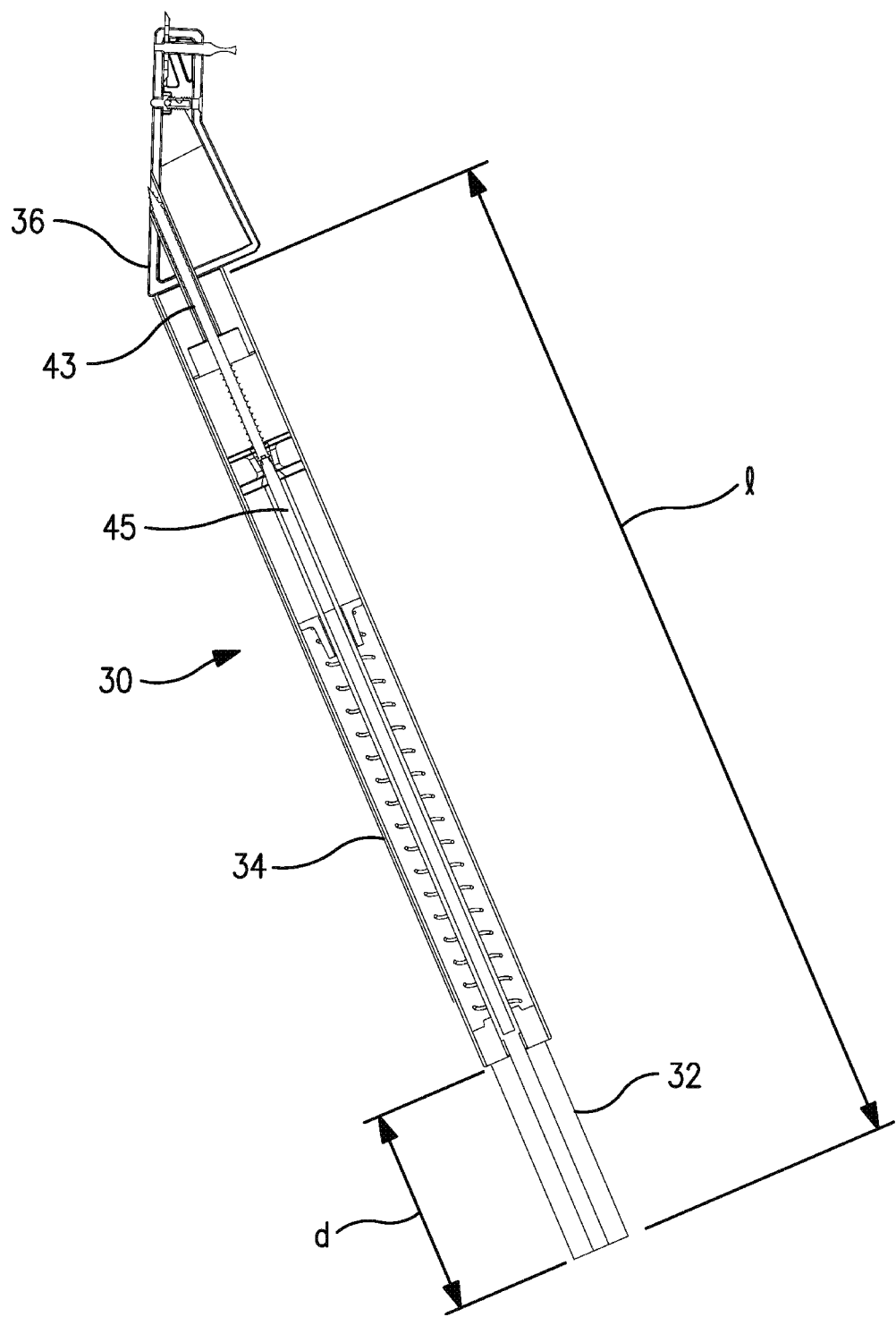
FIG. 6 is a side elevational view, portions broken away to show detail and partly in diagram form, of a modified embodiment of the fastener installation tool of FIG. 1.

With reference to FIGS. 5 and 6, representative tube assembly lengths are designated by L and l and representative fastener lengths are designated by D and d which also represents the travel distance to drive the screws. For one example in FIG. 5, L=36.14" and D=8". In FIG. 6, l=27.4" and d=6". The telescopic tube assembly 30 preferably has a maximum length of between 27.4 inches and 36.14 inches to accommodate the height and reach of the installer. For a six-inch fastener 12, the telescopic assembly 30 must retract 6 inches to drive the fastener, as will be described below.

The installation tool 10 dimensions allow for the tool to be effectively and efficiently used for connecting the top plates 22 to the roof support members 26 without requiring the use of a ladder, platforms or other means for providing the proper effective height relationship for driving the fasteners 12. Moreover, the proper fastener angle may be sequentially implemented from location to location along the top plate 22 to ensure a proper consistent angle for each of the multiple fasteners and to provide an integrated composite connection having an uplift resistance of high integrity.

The installation tool 10 preferably comprises a driver assembly 40 which includes a power driver 42. The driver 42 may be a conventional drill gun such as DeWalt™ model or an impact driver. The elongated telescopic tube assembly 30, which may have a rounded, rectangular or other profile, is mounted over and attaches to the forward torque end 44 of the driver 42. The telescopic tube assembly 30 comprises a proximal tube 32 which receives and mounts the driver 42 and a longer tube 34 secured to the tube 32. During fastener driving, tube 32 slides relative to tube 34 which essentially remains stationary in relation to the components to be connected by the fastener. Tube 34 terminates in a distal end 36.

A fastener guide assembly 50 is mounted at the distal tip 36 of the tube assembly. The guide assembly 50 provides the proper alignment structure for implementing the preferred 22½° entry angle for the fastener. The assembly 50 also engages the support member for stabilizing the installation tool during the driving process. The guide assembly 50 is dimensioned in accordance with the dimensions of a given fastener. The guide assembly has a fastener channel 52 which functions to receive and load the fastener in a muzzle-loading fashion. The fastener drill tip 16 is positioned proximate the channel opening 53. The fastener is inserted head 14 first into the fastener channel 52 of the guide assembly. The fastener head 14 is engaged by a complementary torque coupler 43, such as a socket, for a hex thread fastener or a projecting coupler for a fastening head socket at the applicator end of the torque drive assembly train 45. The drive train 45, which may include multiple components, extends through and is housed within the tube assembly 30 and is driven by the torque driver 42.

Figure 8:
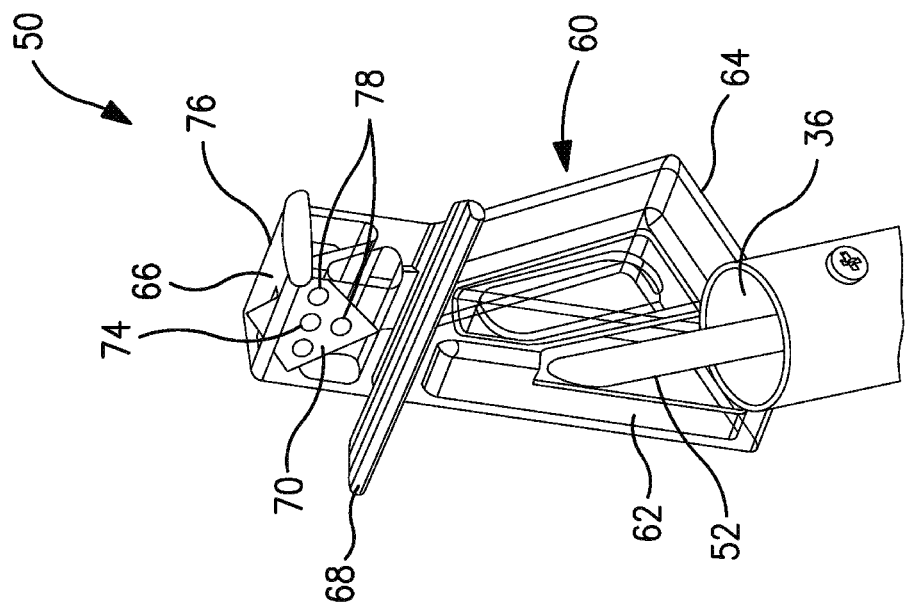
FIG. 8 is a perspective view of the guide portion of FIG. 7, portions being shown in phantom and portions being shown to reveal internal detail.
Figure 7:
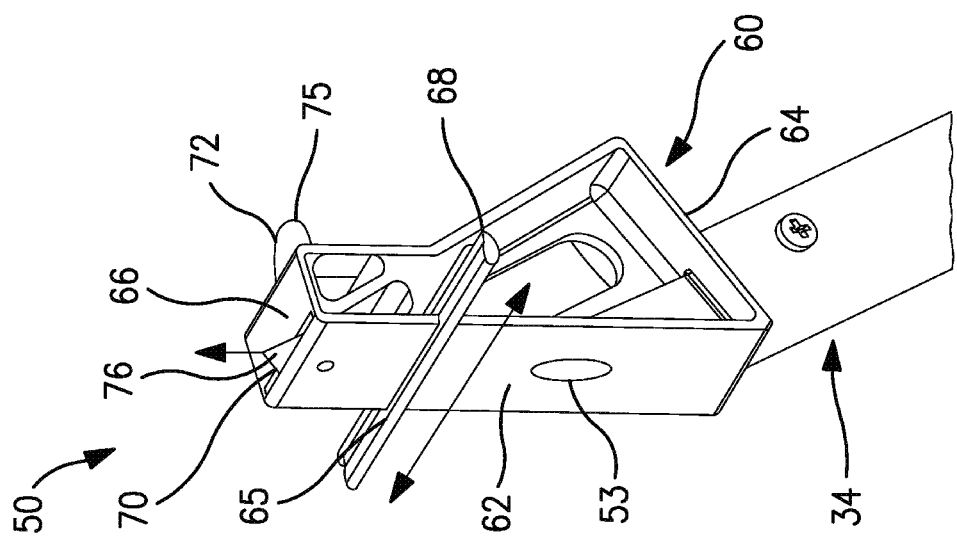
FIG. 7 is a perspective view, partly in diagram form, of a guide portion of the installation tool of FIG. 1.

With reference to FIGS. 7 and 8, guide assembly 50 is preferably a cast or molded member of a lightweight rigid form which is mounted at the distal end 36 of the tube assembly. The guide assembly 50 has a frame 60 with a planar locating or engagement surface 62 disposed at an acute angle with respect to lower planar mounting surface 64. Mounting surface 64 preferably engages against the end of the tube assembly and transversely extends across the end of the tube 34. A planar end plate 66 is preferably perpendicular to surface 62 and is positioned and configured to closely approach or even contact the underside of the roof support member 26 (as will be explained below). The acute angle is preferably 22½°, although other angles may be provided depending on the intended application of the installation tool 10.

The fastener channel 52, which may be formed by a cylinder, has a central axis which is perpendicular to the surface 64. The fastener channel axis is disposed at an acute angle of preferably 22½° to the surface 62. Surface 62 defines the channel opening 53. The channel 52 receives the fastener 12 so that the head 14 is proximate and readily engageable with the torque coupler 43.

A transverse slot 65 receives an alignment bracket 68 having a T-shaped section which protrudes transversely at opposed sides of the engagement surface 62 and also projects outwardly from the surface 62. The alignment bracket 68 is positioned and configured to fit or ride below the 2×4 of the top plate 22 to ensure proper perpendicular alignment with the top plate 22. The alignment bracket 68 may be secured in the frame by a friction or interference fit or may be secured by a fastener (not illustrated) to the frame and can be transversely moved. In one embodiment, the bracket C is located approximately 1⅝ inches below the end plate 68.

The upper portion of the frame is traversed by a slot 69 which receives a metal stabilizer plate 70. The stabilizer plate is secured in place by a threaded adjustment knob 72. The knob 72 connects with a threaded rod 74. The rod extends through an opening in the plate 70 and threads into a central threaded opening 75. The stabilizer plate 70 preferably has a square configuration with four vertices which form edges 76. The edges 76 are sharpened. When the plate 70 is mounted in position, one edge 76 or vertex projects upwardly from the end surface 66 of the frame. Openings 78 are provided in the plate to provide a height adjustment for vaulted ceilings and other configurations. Alternatively, the projecting structure is in the form of a barb.

The function of the stabilizer plate 70 is to provide a stabbing point to engage into the wood proximate the interface of the top plate 22 and the roof support member 26 to thereby stabilize the tool and prevent movement while the fastener is being torqued by the installation tool. The stabilization is especially important at the initial stages of driving the fastener.

In addition, the stabilizer plate functions to present a stabbing point so that upon inspection, an inspector will readily perceive that the fastener is at the proper angle.

The guide assembly 50 is positioned by the installer at the intersection of the top plate 22 and the roof support member 26 with the projecting stabilizer plate edge 76 engaging into the wood and the engagement surface 62 engaging in surface-to-surface relationship against the vertical side of the top plate 22. The end surface 66 is typically positioned proximate the underside of the roof support member 26, but is slightly offset due to the less than complete penetration of the stabilizer edge, and the alignment bracket 68 engages the lower edge portion of the top plate 22.

Prior to engagement of the guide assembly with the top plate/roof support structure (as previously described), a fastener 12 is dropped into the fastener channel 52 with the fastener head 14 proximate to or engaging with the complementary coupler 43. A portion of the fastener 12 is typically initially received in a chamber of tube 34 adjacent the distal end 36. The fastener drill tip 16 is proximate the channel opening 53 in the engagement plate 62. It will be appreciated that the guide assembly 50 as properly positioned provides the proper entry point and entry angle for the fastener 12 as the fastener is driven through the top plate 22 into the roof support member 26.

Figure 42:
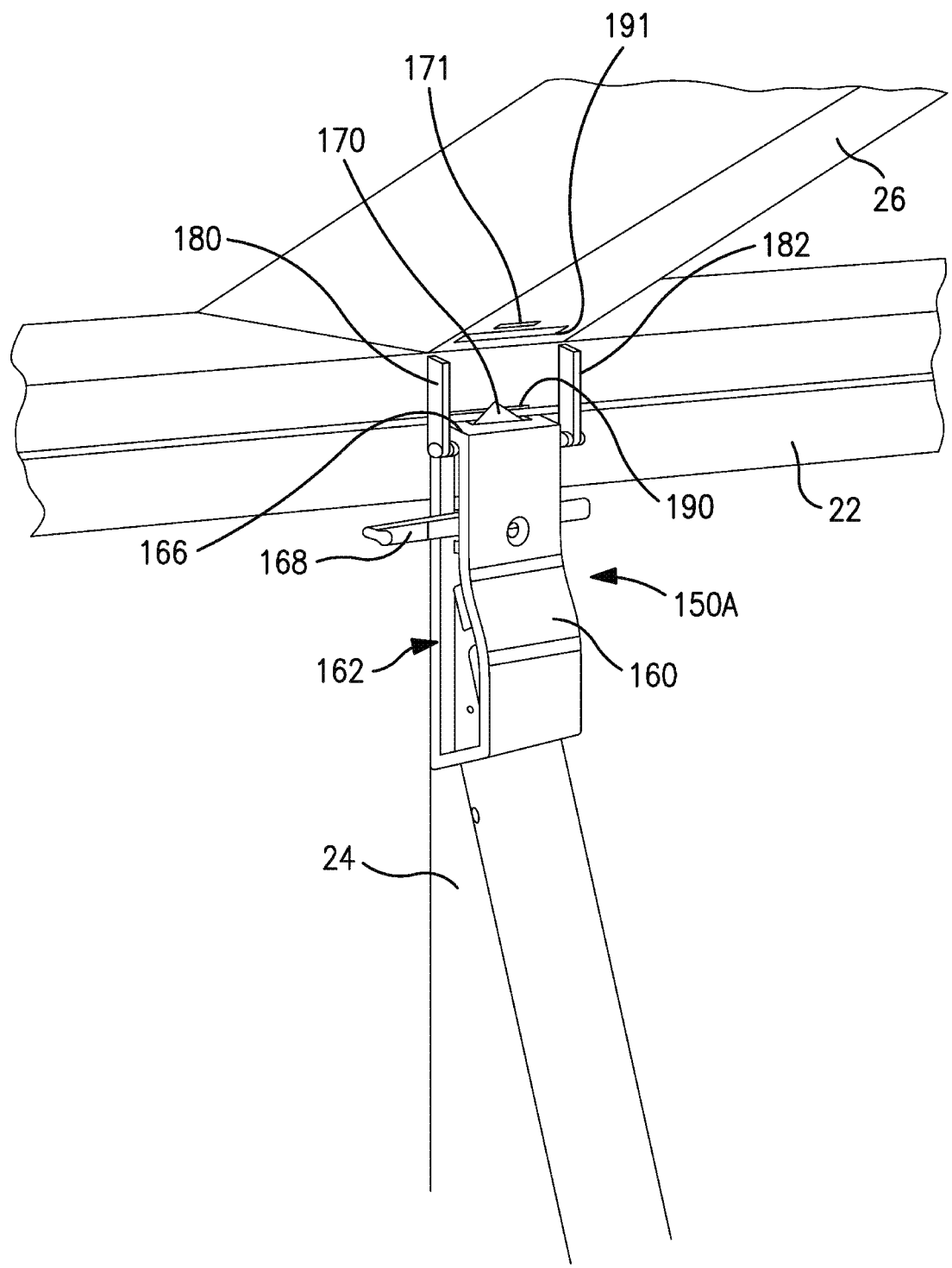
FIG. 42 is a representative perspective view of a structure during its constructive phase and illustrating another embodiment of an installation tool guide head.
Figure 43:
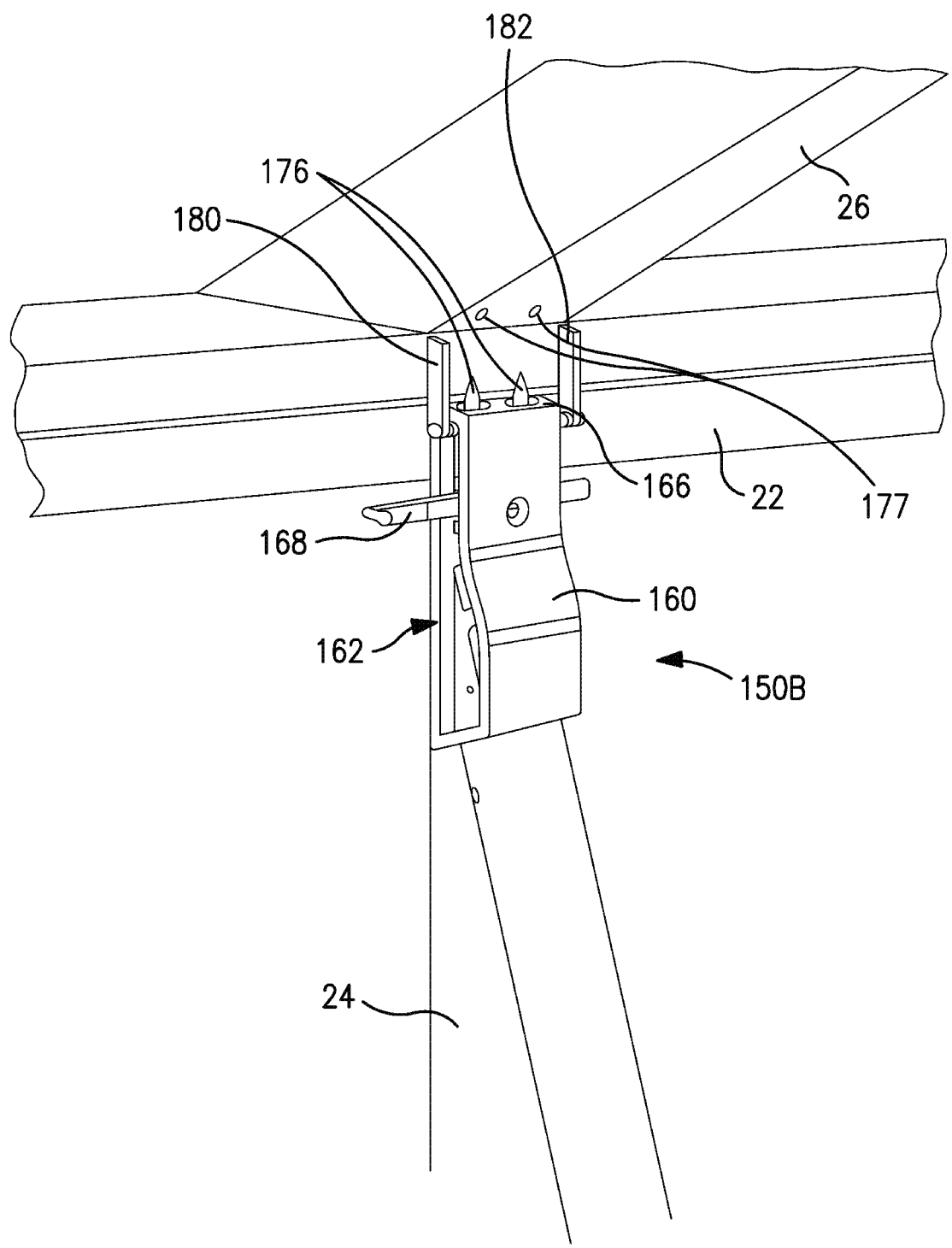
FIG. 43 is a representative perspective view, partly in schematic, of a structure during its construction phase and illustrating a further embodiment of an installation tool guide head.

With reference to FIGS. 42 and 43, alternative embodiments of the guide assembly that mount to the end of the telescopic tube assembly of an installation tool are generally designated as guide head 150A and guide head 150B, respectively. These guide heads include additional features both for providing the proper alignment and positioning for the screw and for enhancing the ability of the operator and/or an inspector to verify that a proper connection has been made. Each of the guide heads has a frame 160 with a planar locating surface 162 disposed at an acute angle with respect to a tube assembly. Locating surface 162 defines a channel opening for the fastener channel access of the tube assembly. A planar end plate 166 is configured to engage or closely approach the underside of the roof support member 26.

An L-shaped bracket preferably extends transversely at opposed sides of the engagement surface and projects outwardly from the surface to provide an alignment bracket 168 to engage the vertical support 24. Bracket 168 may be adjustable. A pair of arms 180 and 182 are pivotally mounted at the top of the frame. One or more of the arms 180 and 182 may be pivoted upwardly to engage a vertical side of member 26 and provide a proper positioning relative to the roof support member 26.

A stabber point 170 projects through the end plate 166. In addition, the upper portion of the frame mounts a linear ink pad 190. In the embodiment position illustrated in FIGS. 42 and 43, the guide heads 160A and 160B have not been positioned against the roof support member 26. Upon proper positioning, the pivotal arms 180 and 182 would engage against the sides of the support member 26, and the ink pad would make a linear mark indicated at 191 on the bottom of the roof support member 26. In addition, the stabber 170 would stab into the wood and leave a mark 171 as indicated. It should be appreciated that either the ink mark 191 or the stab mark 171 could be used to identify both the proper fastener as well as the proper entry angle of the fastener and accordingly indicate that a proper connection has been completed.

The guide head 150B illustrated in FIG. 43 has a pair of barbs 176 projecting from the end plate 166. When properly engaged under the roof support member 26, the pair of barbs would provide two marks 177 which would again provide a unique marking for indicating the proper connection. Of course, the barbs 176 also enhance the stability of the installation tool and the fastener during the installation process.

The installation tool preferably includes an auxiliary handle (in addition to the handle on the driver 40) to facilitate two-handed positioning and stability during the driving process. Various auxiliary handle configurations can be employed.

Figure 1:
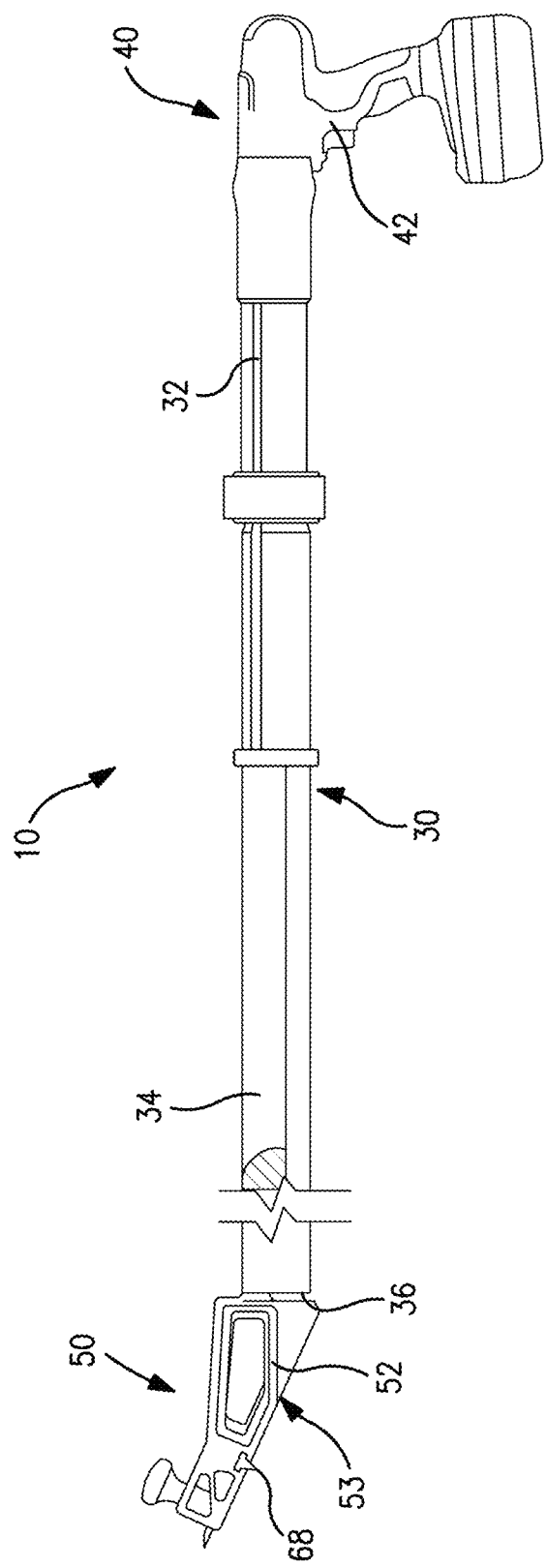
FIG. 1 is a side view, partly broken away, of a fastener installation tool for securing a top plate to a roof support member.
Figure 2:
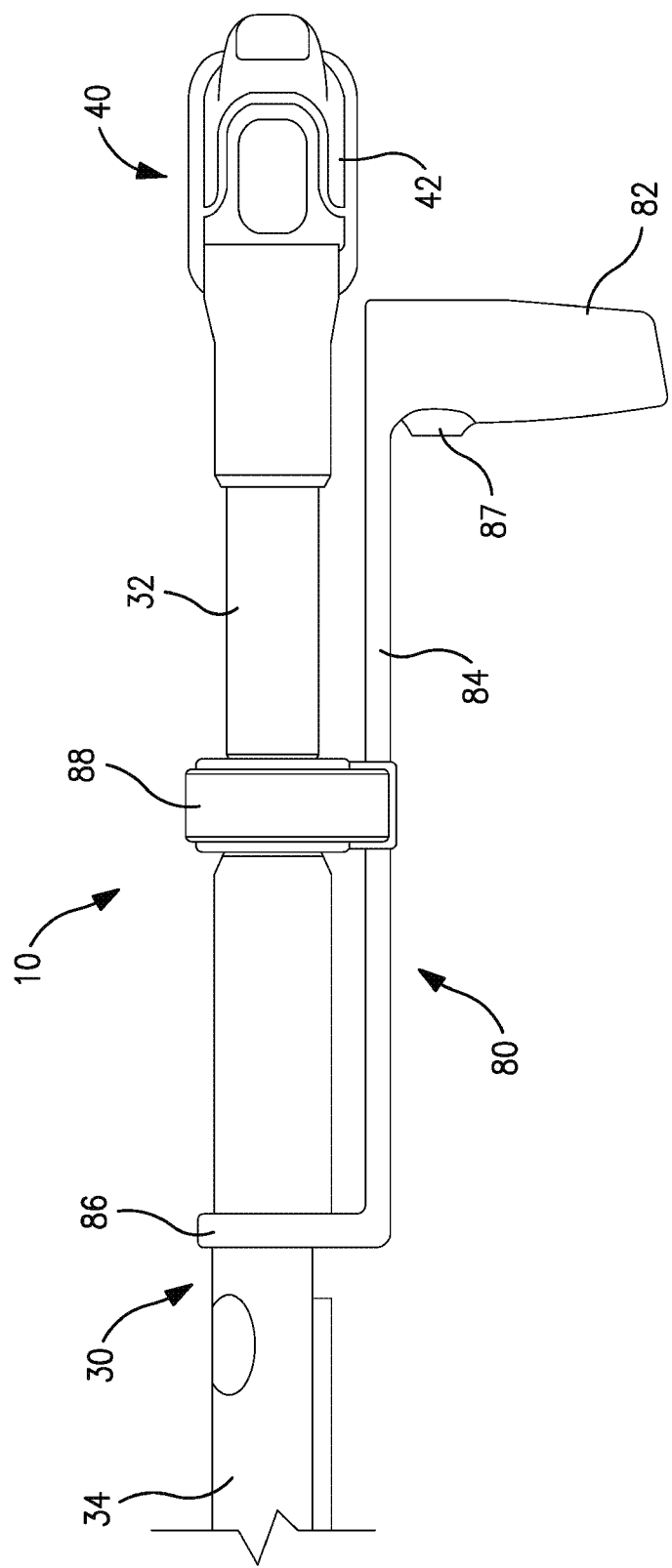
FIG. 2 is a fragmentary top plan view of the installation tool of FIG. 1.
Figure 3:
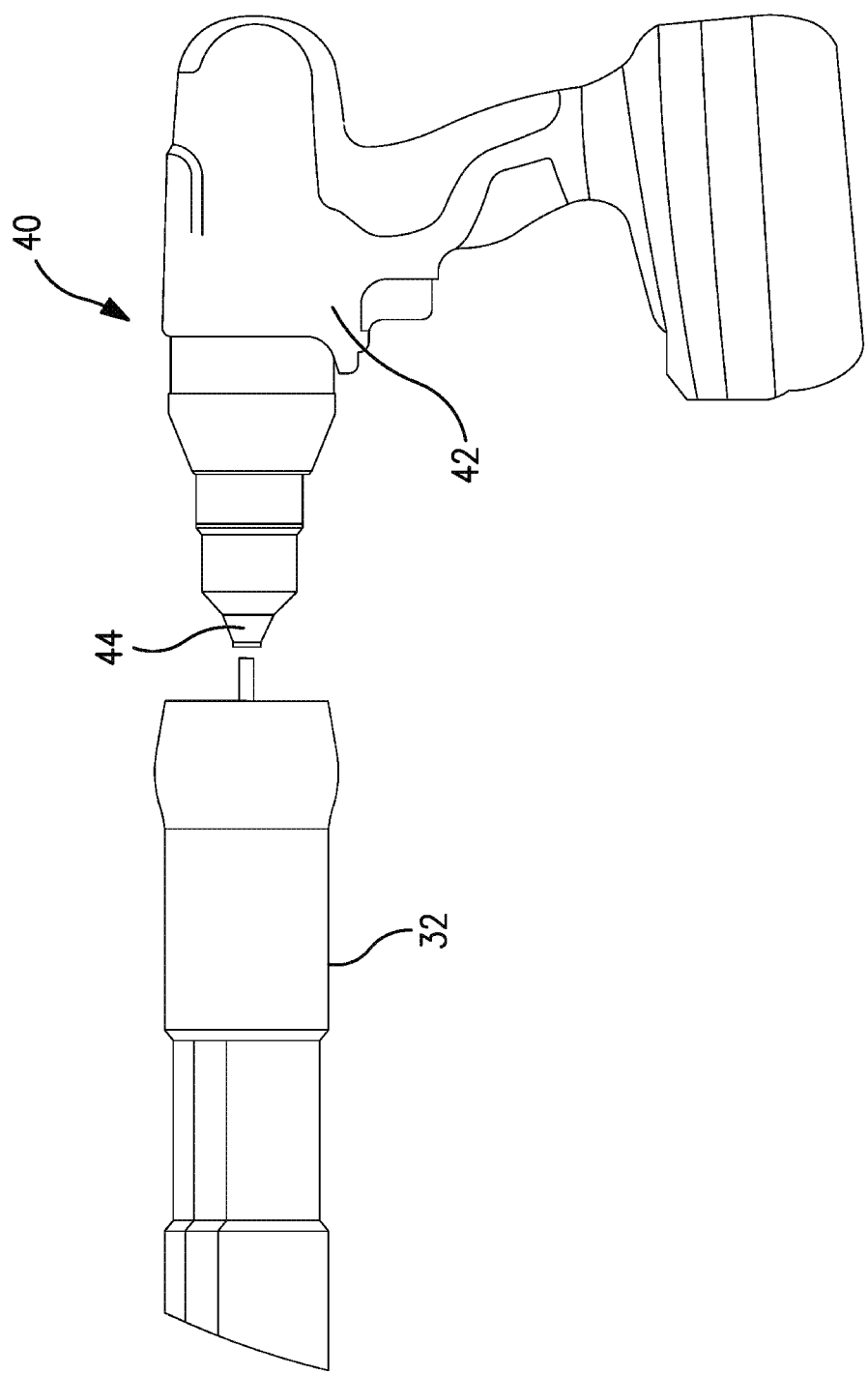
FIG. 3 is a fragmentary partially disassembled side view of the installation tool of FIG. 1.
Figure 9:
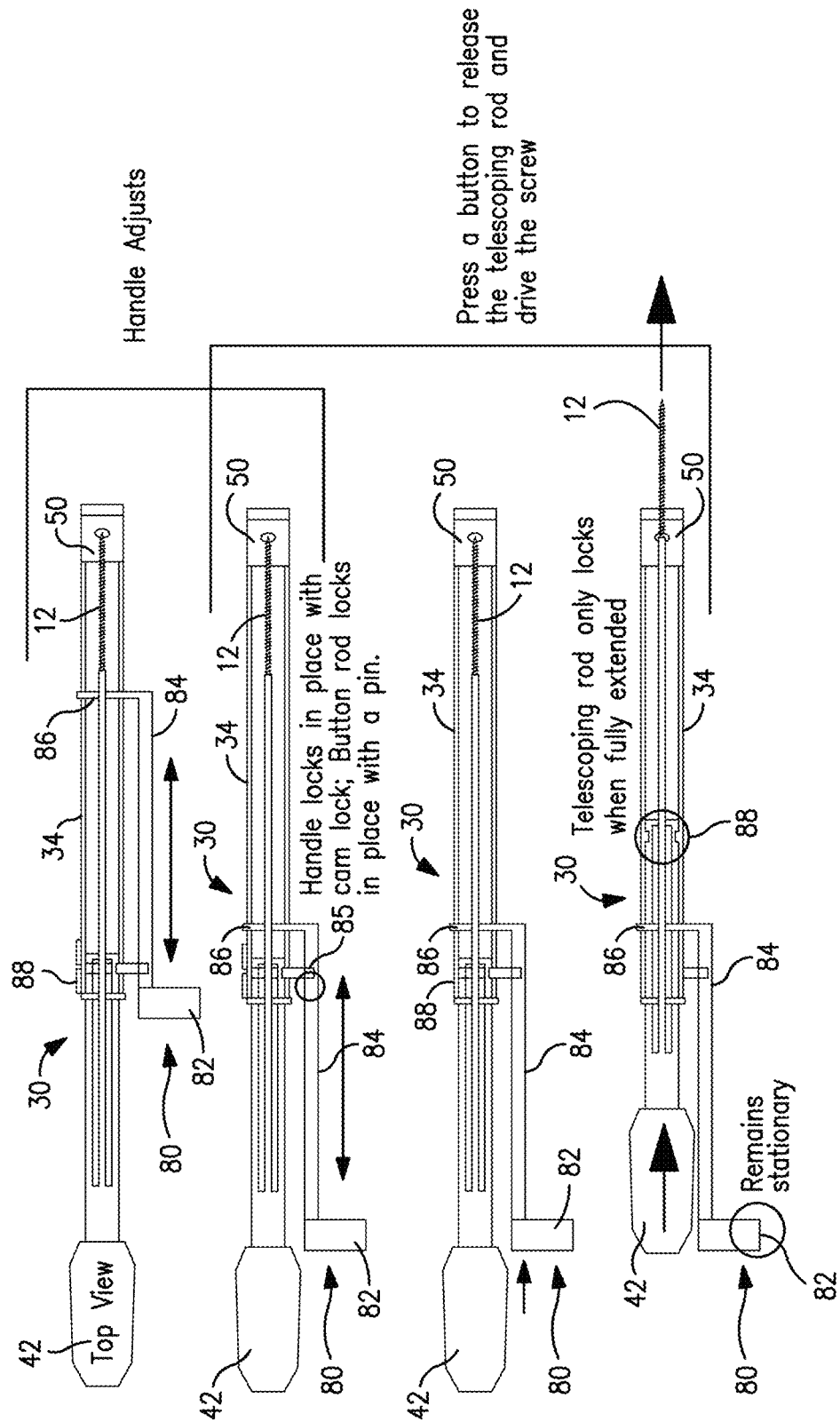
FIG. 9 is an annotated composite schematic view illustrating the sequential operation of the installation tool of FIG. 1.
Figure 10:
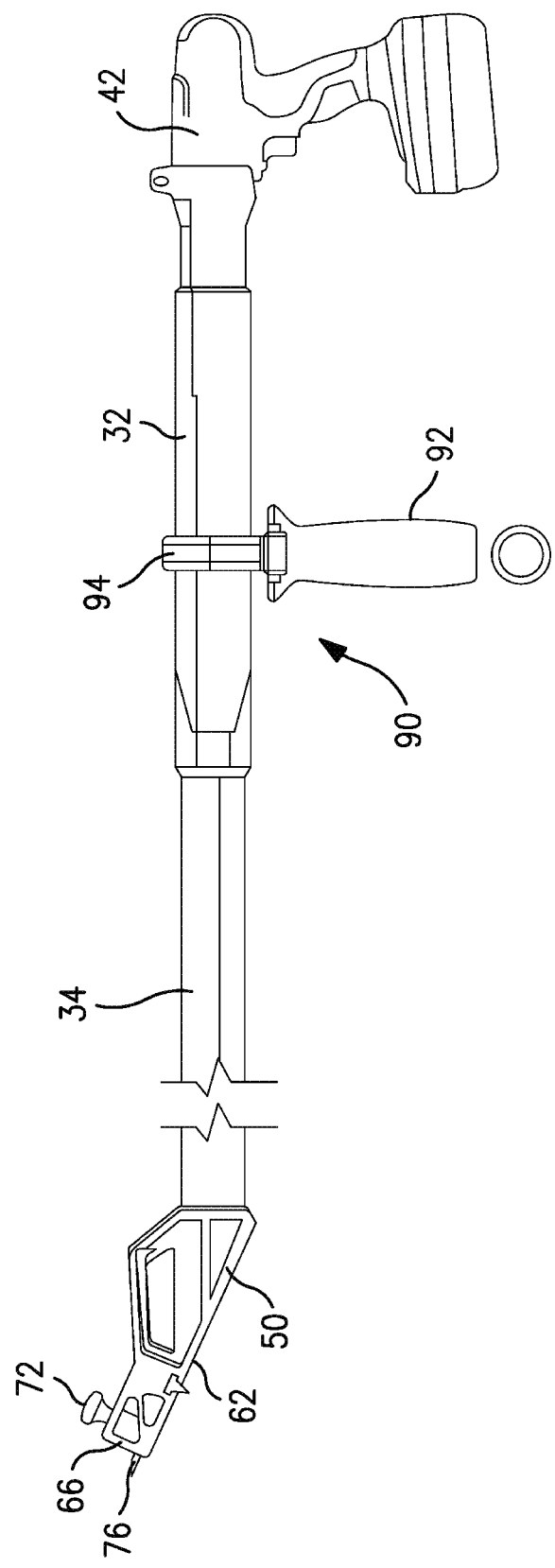
FIG. 10 is a side elevational view, partly broken away, of a second embodiment of a fastener installation tool for connecting a top plate with a roof support member.
Figure 11:
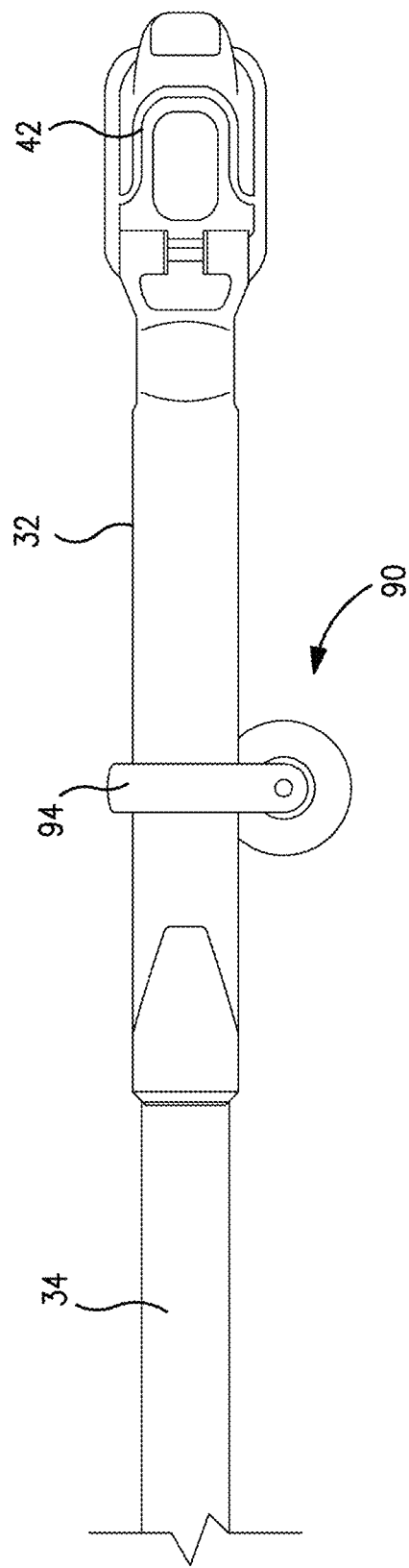
FIG. 11 is a fragmentary top plan view of the installation tool of FIG. 10.

With reference to FIGS. 2 and 9, an auxiliary handle 80 is slidably mounted to the tube and is longitudinally adjustable to provide an auxiliary handle for the installer. The handle 80 includes a rear grip 82 which radially projects radially or quasi-radially relative to the longitudinal axis of the tube assembly. A forward rod 84 extends from the grip generally parallel to the tube assembly. The rod 84 connects to a forward yoke 86 which envelopes the outer surface of the tube assembly and is slidable along the tube assembly. The intermediate portion of the rod is received in a cam lock 88 carried by the fixed proximal tube 32 that mounts to the forward portion of the driver 42. The rod locks in place with the cam lock 88.

The tube 34 telescopes with the proximal tube 32 and is slidably receivable throughout the driving of the fastener 12 in the installation process as the fastener is driven to complete the connection. The changing dynamic relationships of the fastener 12, the guide assembly 50, the telescopic tube assembly 30 and the handle 80 at the various stages of installation are illustrated in FIG. 9.

The auxiliary handle 80 is selectively adjustable by the installer to provide maximum stability and comfort to the installer. The handle locks in place with a pin 85. The handle 80 is initially adjustable. A button 87 is pressed to release the telescoping tube 34 from its fixed relationship with the proximal tube 32 and drive the threaded fastener. The handle 80 essentially remains stationary as the driver moves during the installation progress, as best illustrated in FIG. 9. The tube 32 retracts relative to tube 34 to accommodate the progressive expelling of the fastener 12 from the fastener chamber 52. The telescoping tubes 32 and 34 only lock when in the fully driven position, at which point, the fastener 12 is fully driven.

It should be appreciated that approximately six-inch driving link is required for driving a six-inch fastener.

With reference to FIGS. 10, 11 and 12A-C, an automatic locking handle is generally designated by the numeral 90. The handle 90 is generally configured to radially extend from the proximal tube 32 and slide along the tube 32 during the driving process until it automatically locks at the full drive position. The handle has an orthogonally projecting grip 92 which connects with a yoke 94. The yoke 94 wraps around the tube 32 and is exteriorly slidable therealong.

Figure 12A:
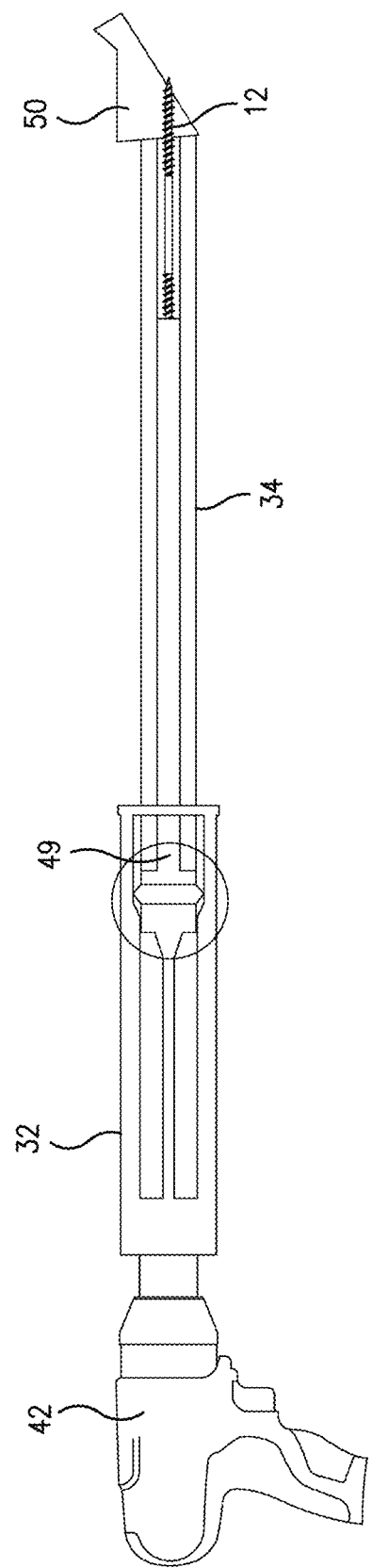
FIGS. 12A-12C are side elevational views, partly in schematic, illustrating the sequential operation of the installation tool of FIG. 10.
Figure 12B:
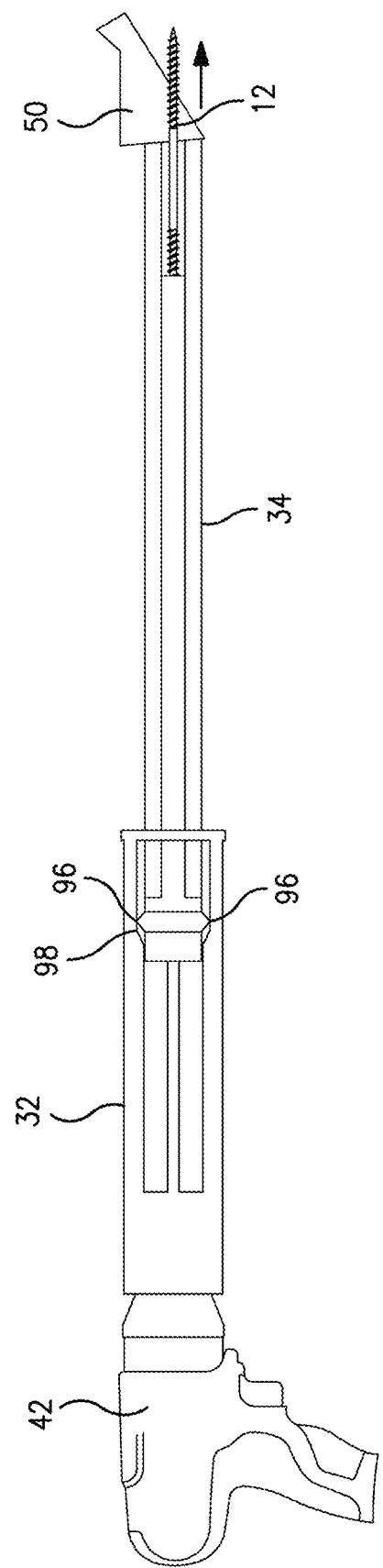
Figure 12C:
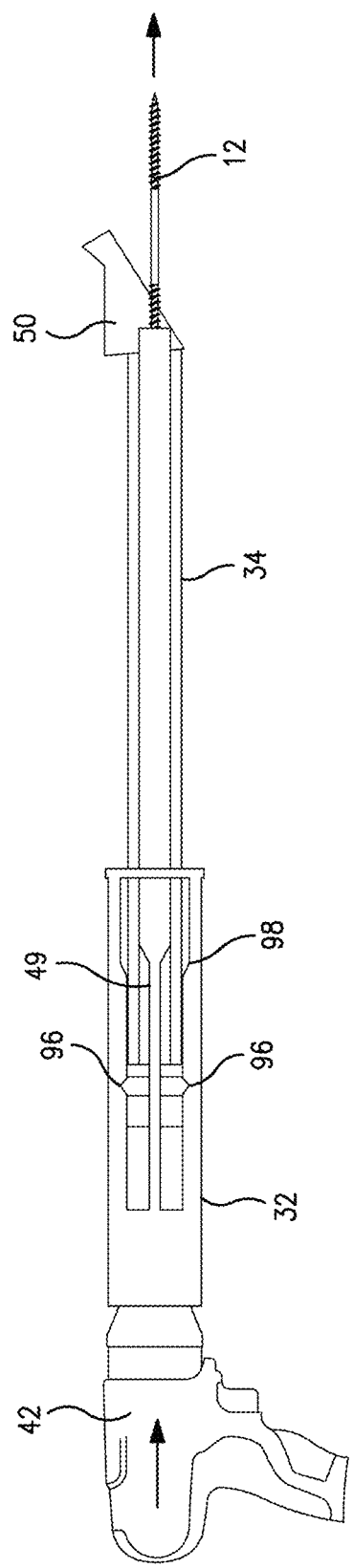
Figure 13:
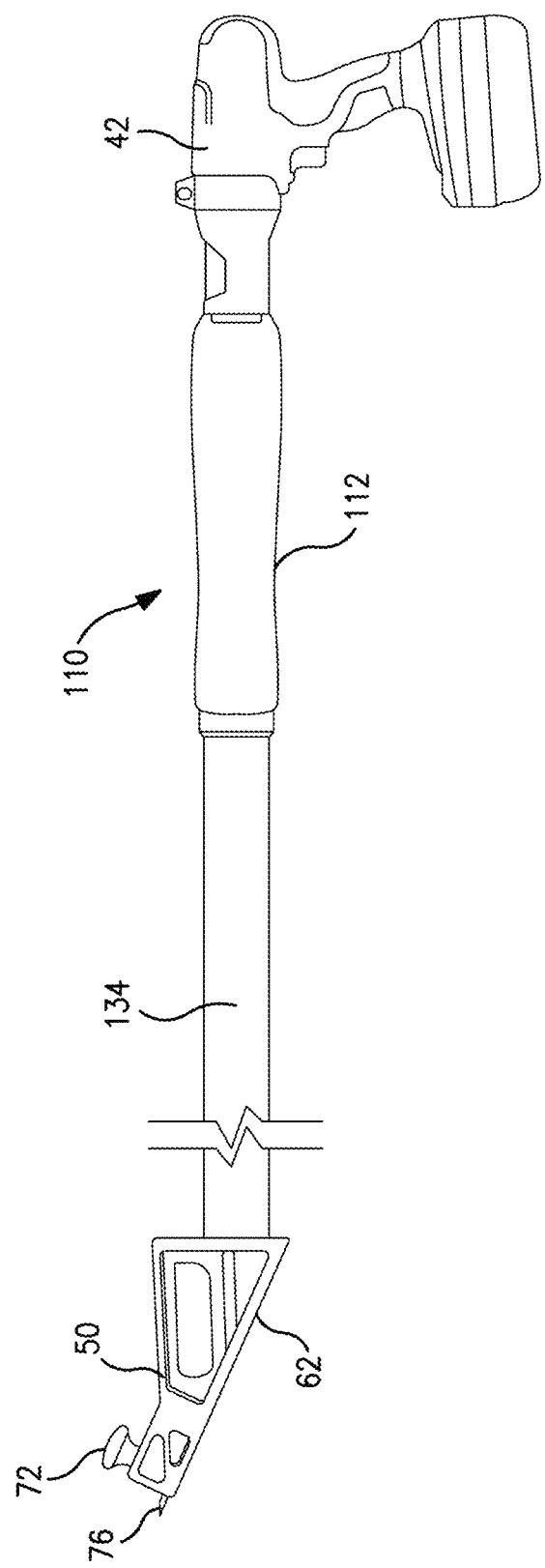
FIG. 13 is a side elevational view, partly broken away, of a third embodiment of a fastener installation tool for connecting a top plate with a roof support member.
Figure 14:
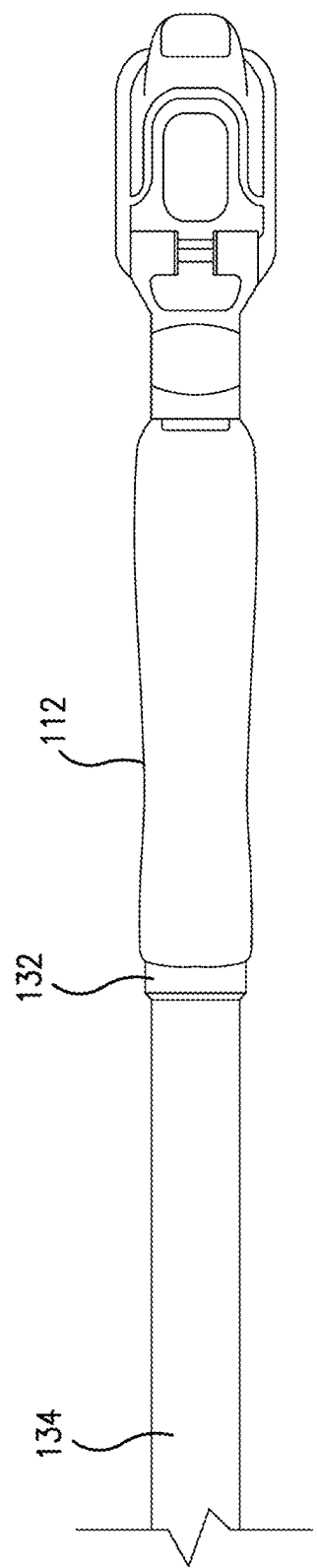
FIG. 14 is a fragmentary top plan view of the installation tool of FIG. 13.

The automatic locking handle 90 is automatically locked by the use of balls 96 which are entrapped in a bearing 98. The driving rod 49 has a varying diameter along a longitudinal portion. As best illustrated in the sequence of FIGS. 12A-C, as the fastener 12 is driven, the geometry of the driving rod has reduced diametric surfaces allowing the balls to slip by and the outer distal tube 34 to fully telescope. The external handle can be placed anywhere along the proximal tube 32. It will be appreciated that as the fastener 12 is driven, the handle is rearwardly displaced toward the driver 42 until a fully locked position is obtained and the telescoping tube 34 is retracted.

With reference to FIGS. 13, 14 and 15A-D, another handle which may be employed for a third embodiment of a fastener installation tool is generally designated by the numeral 110. The handle 110 includes a circumferential grip 112 which extends around the proximal tube 132. The grip 112 may be easily moved along the base tube 32 and tightened in position or loosened by means of a twisting motion on the grip about the longitudinal axis of the tube assembly 30.

Figure 15B:
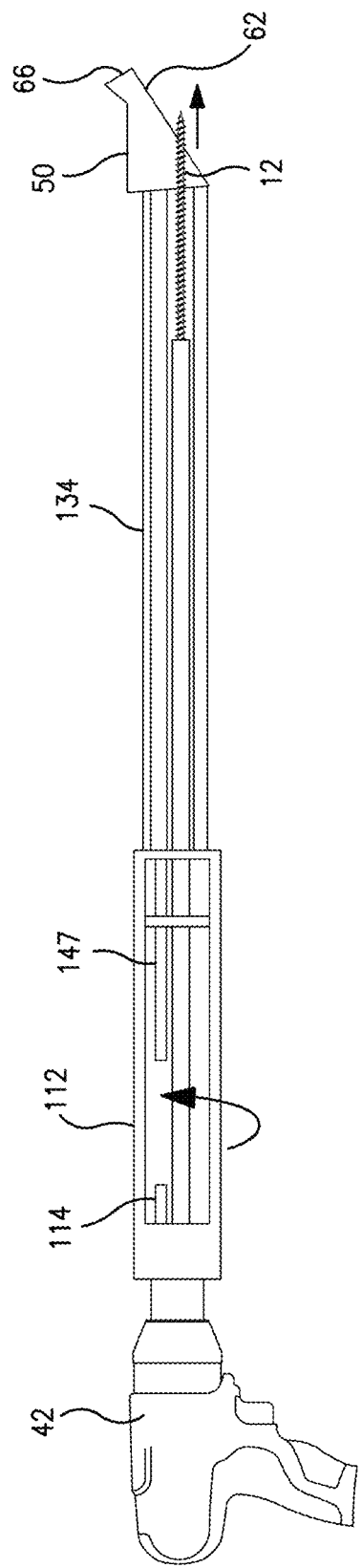
Figure 15C:
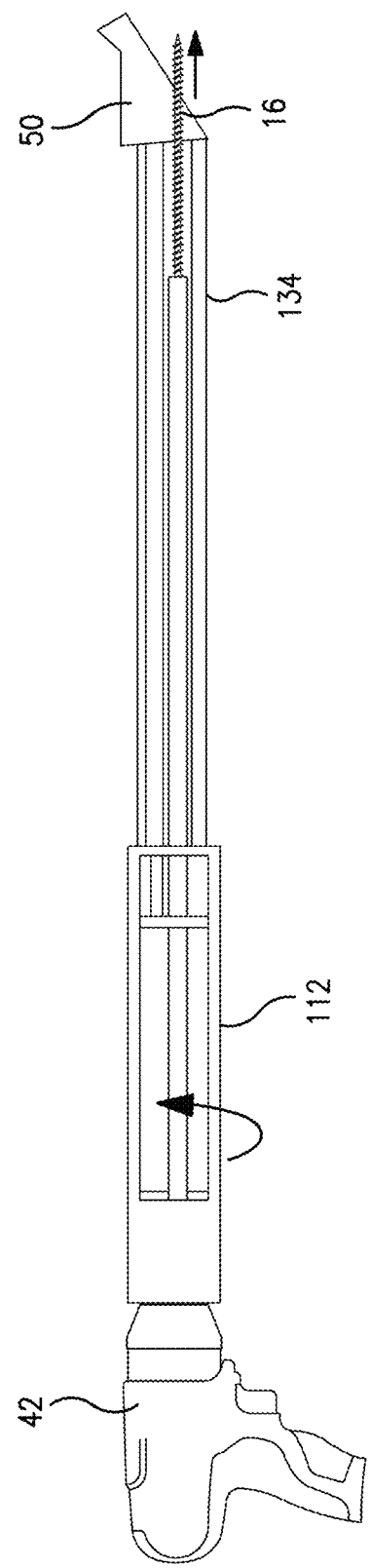
Figure 15D:
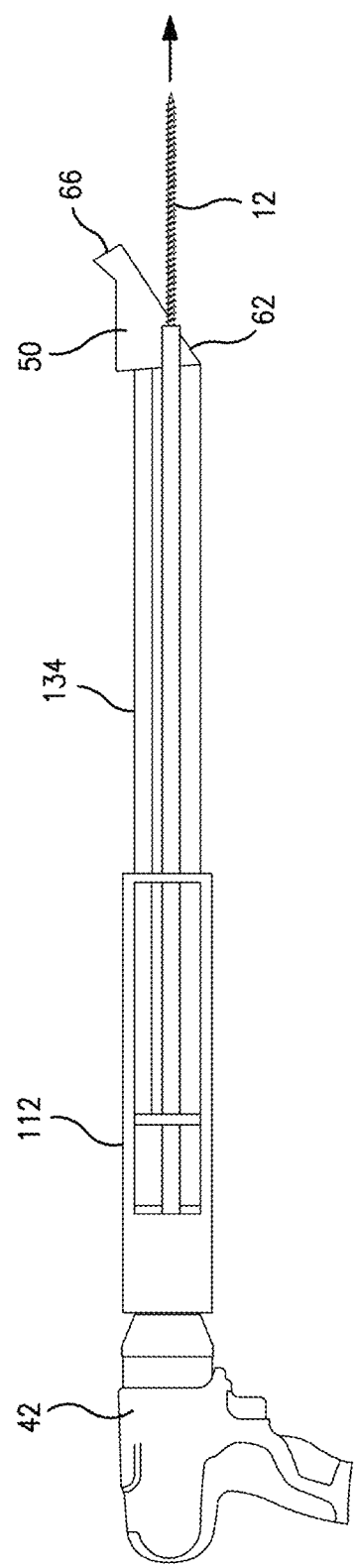

A protrusion 114 rides within an internal slot 116 which is attached in fixed relationship to the driver 42. The proximal tube 132 forms the internal slot 116, and the sliding tube 134 includes an external rib 147. The internal slot 116 is not aligned with the rib 147 in the dormant/non-drive state (FIG. 15A). As the driver starts to drive, the protrusion 114 starts to ride in the internal slot 116 until it changes geometry and twists, thereby causing the handle to twist (FIGS. 15B-C). The foregoing continues until the second slot is aligned with the external rib, thereby allowing the tube 134 to fully telescope inwardly (FIG. 15D). When the installer feels the handle 110 rotate slightly, the installer knows that the fastener 12 has been sufficiently initially driven, and the installer can release the grip 112 on the handle and place both hands on the driver 42.

Naturally, other handles are possible. In some embodiments, an auxiliary handle as such is not required. In such embodiments, the installer merely grips along the tube assembly at a location that appears to be most advantageous.

The installation tool 10 is preferably battery powered and includes a chargeable battery power pack. However, in some embodiments, the power driver (not illustrated) may be directly electrically powered and include a cord which connects with the power line.

Figure 16A:
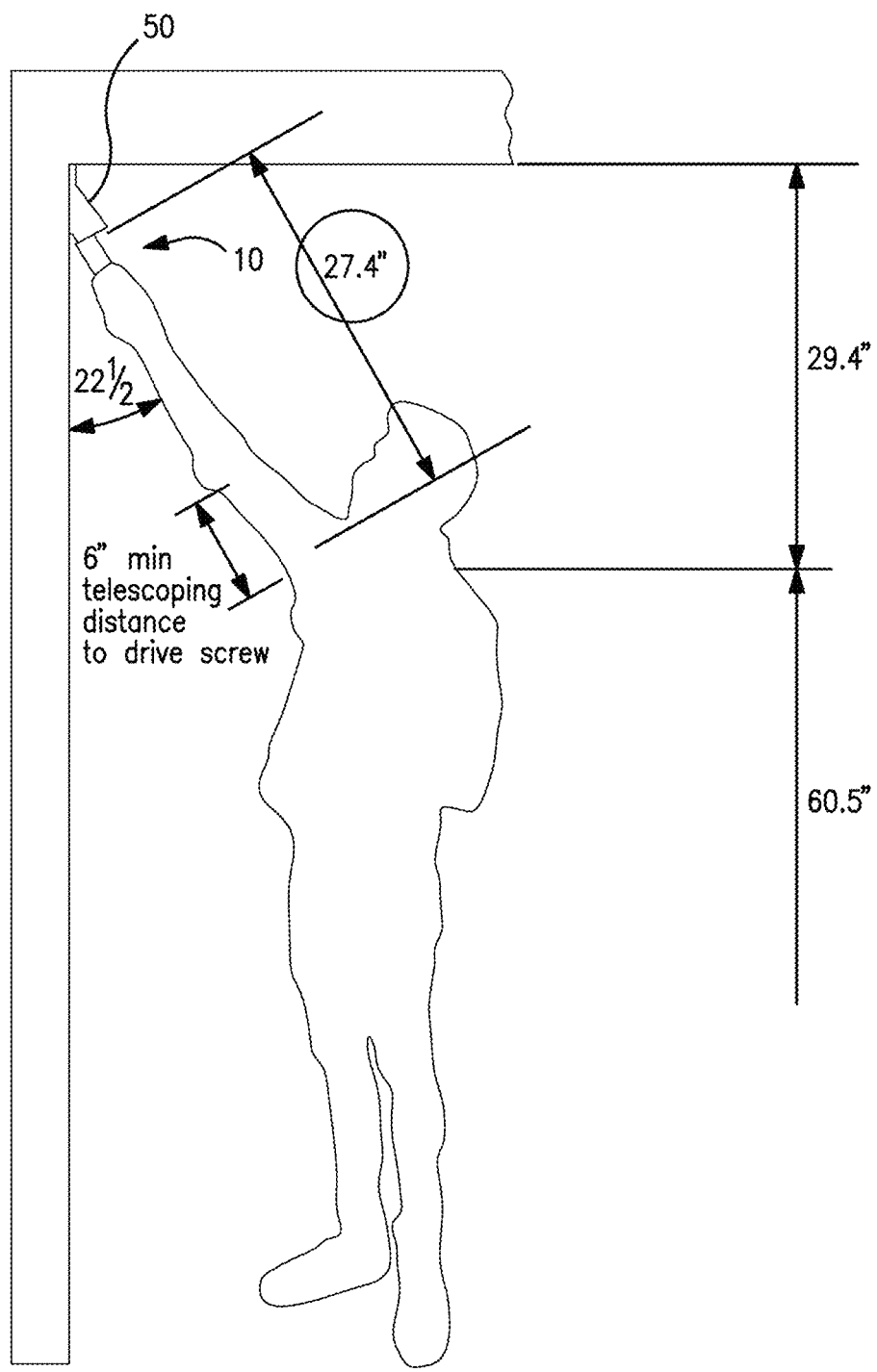
FIGS. 16A-16B are schematic diagrams illustrating the usage and versatility of a representative fastener installation tool for different structural heights and wherein the installers have different heights.
Figure 16B:
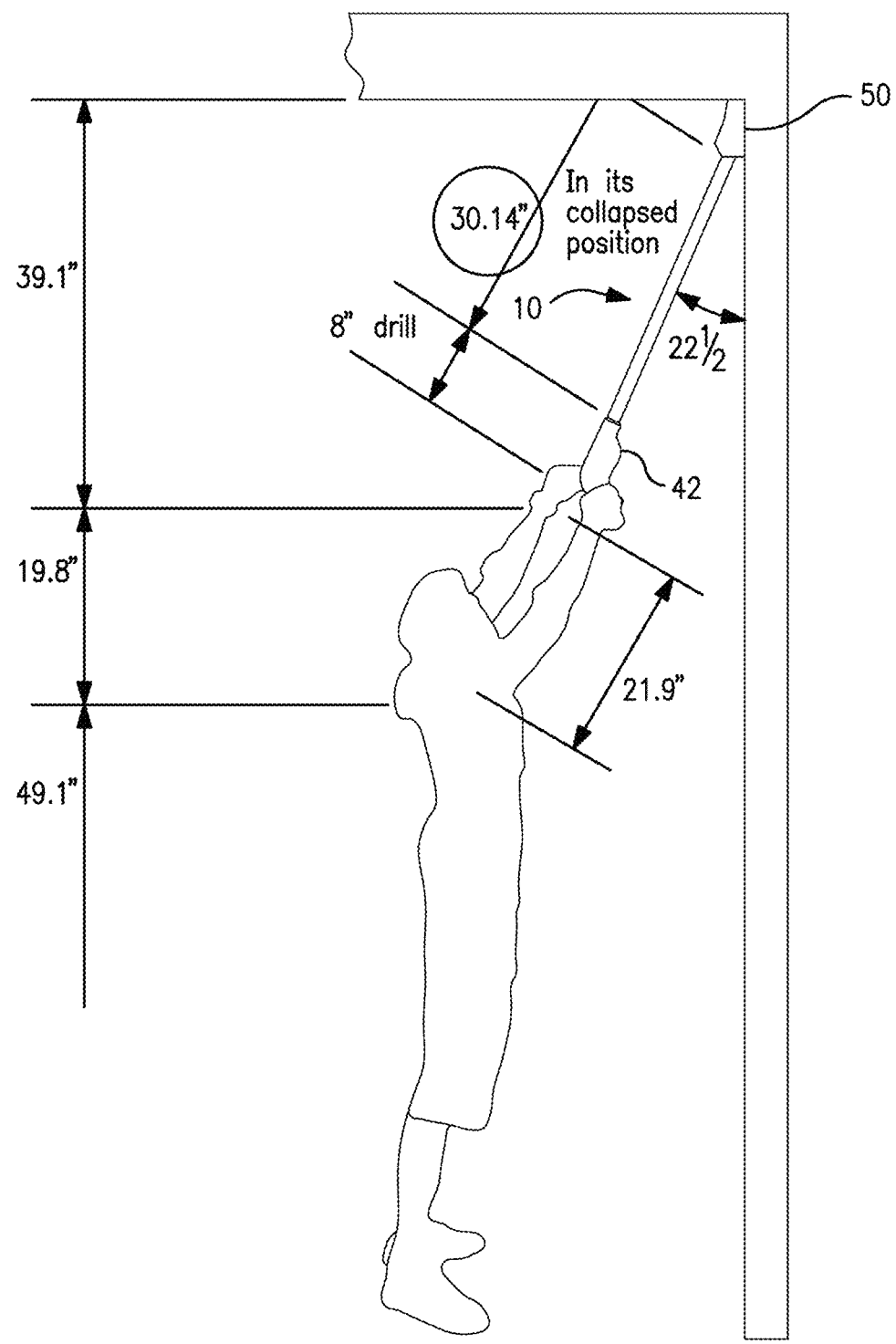

With reference to FIGS. 16A and 16B, two different structural heights of the top plane 22 and two appropriately dimensioned installation tools for relatively tall and short installers (shown in silhouette) are illustrated, it should be appreciated that the dimensioning of the telescopic tube assembly 30, in terms of longitudinal length, is established to accommodate the preferred application in connection with connecting a top plate 22 to a roof support member 26 without the installer needing a ladder or a platform to obtain the correct reach for driving the fastener. In addition, because the height and reach of an installer may significantly vary, the length of the telescopic tube assembly 30 is preferably selected to accommodate a wide range of installers' physical dimensions.

For applications wherein a fastener greater than 6 inches or even less than 6 inches may be applicable, an alternative guide assembly may be employed. For such a guide assembly, the effective depth of the fastener channel is altered. In addition, the telescopic extremes of the telescopic tubes 32 and 34 are adjusted to accommodate for the driving length for the fastener. Naturally, the coupler of the installation tool is adapted to complement the head of the fastener.

It should also be appreciated that for applications in which an angle other than 22½° is desired, the guide assembly may also be configured so that the fastener channel is at an acute angle relative to the engagement surface at the prescribed optimum angle. Naturally, the position of the alignment bracket 68 may also be varied in accordance with a specific project. Multiple guide assemblies for various installation angles may be provided and attached to the telescopic tube assembly as desired.

For some embodiments, the power driver 40 is easily dismounted from the telescopic tube assembly 30. The telescopic tube assembly may employ a receiver configured to receive and functionally attach to a wide range of dismountable drill guns without the torque driver being fully integrated with the telescopic tube assembly.

Figure 17:
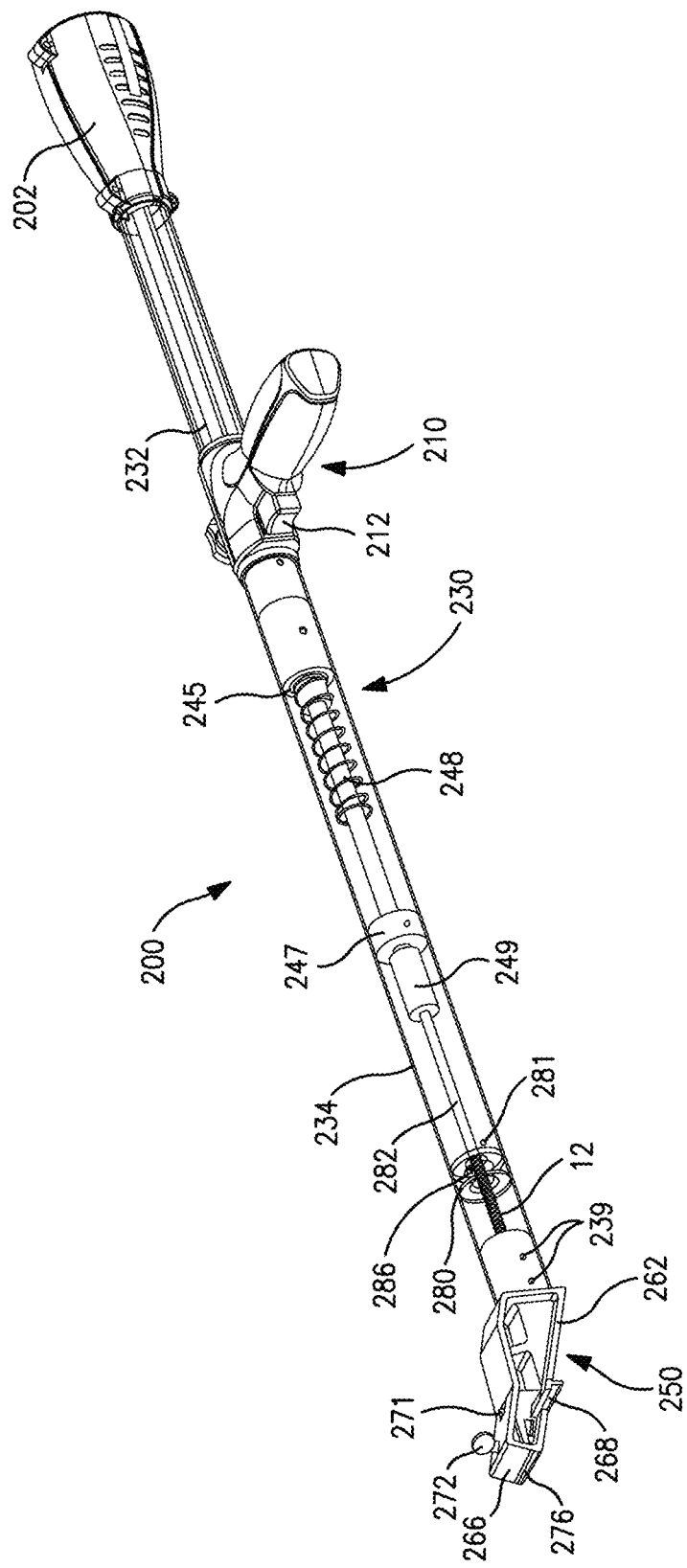
FIG. 17 is a perspective view of a fourth embodiment of an installation tool without the power driver assembly wherein certain external portions are shown as transparent to reveal internal components.
Figure 18:
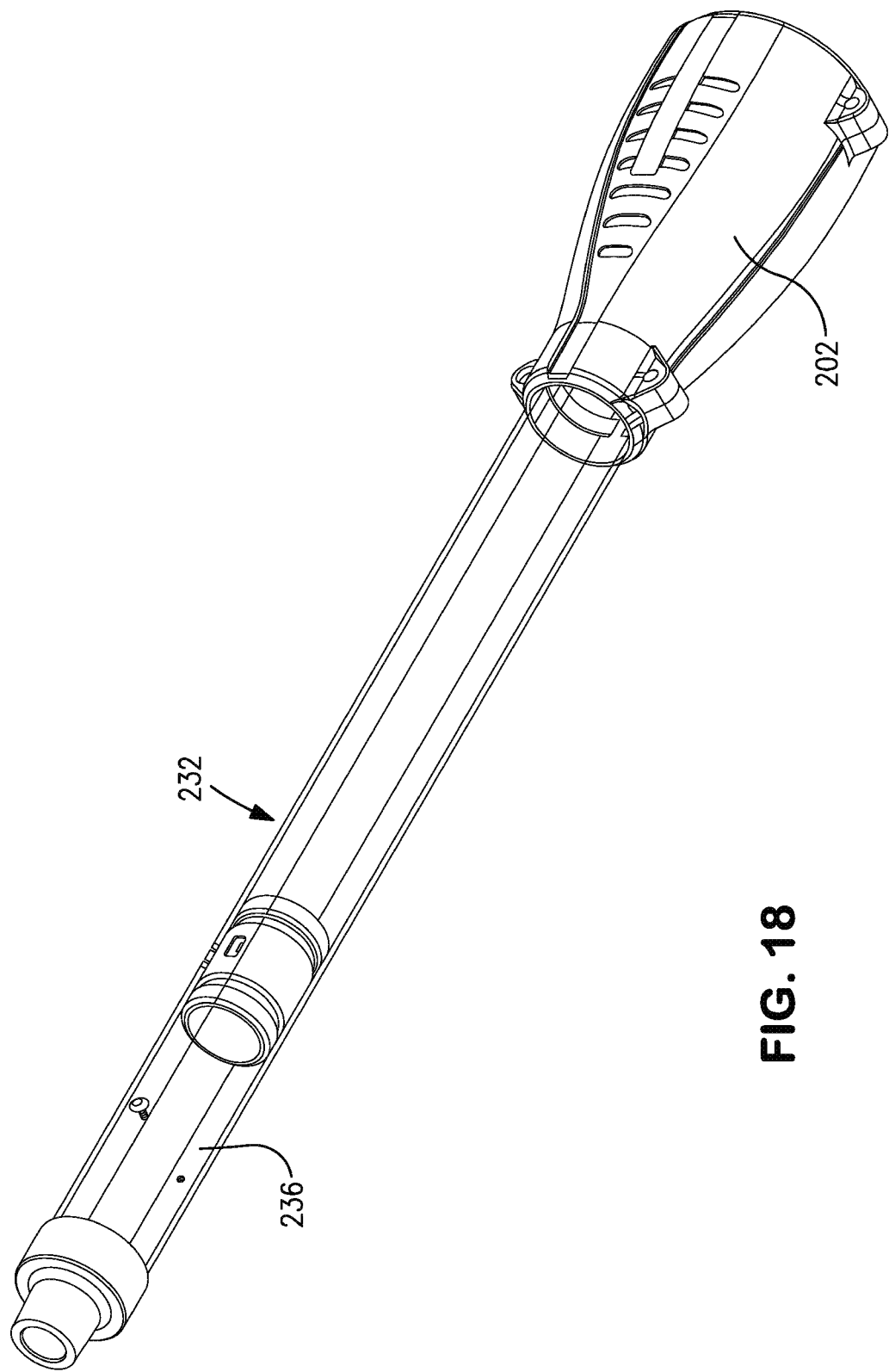
FIG. 18 is an enlarged perspective view of a portion of the installation tool of FIG. 17 wherein certain external components are shown as transparent to reveal internal components.
Figure 19A:
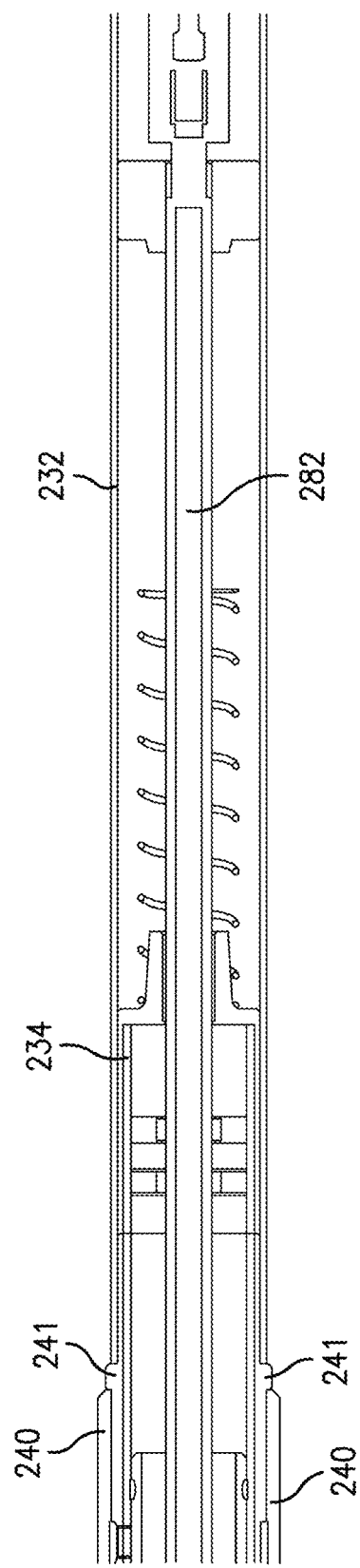
FIGS. 19A and 19B are top sectional views of portions of the installation tool of FIG. 17.
Figure 19B:
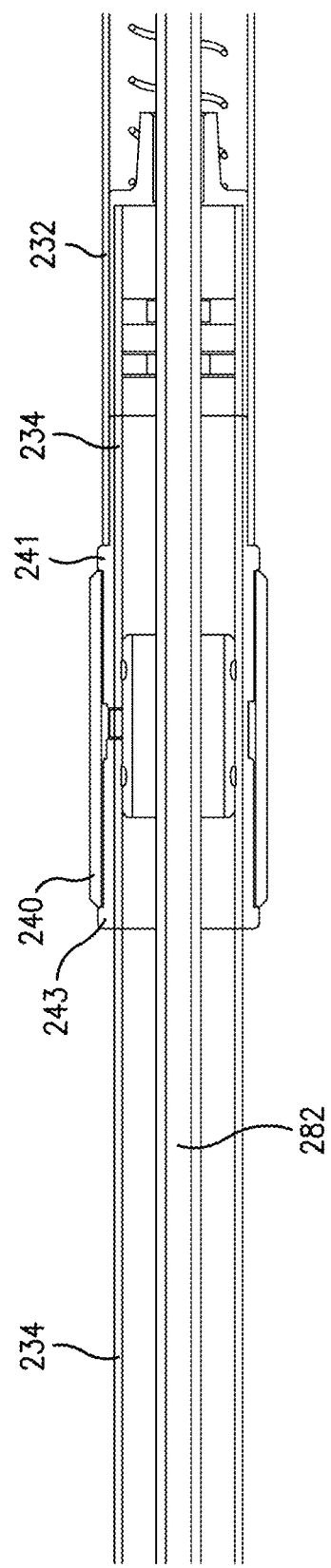
Figure 20:
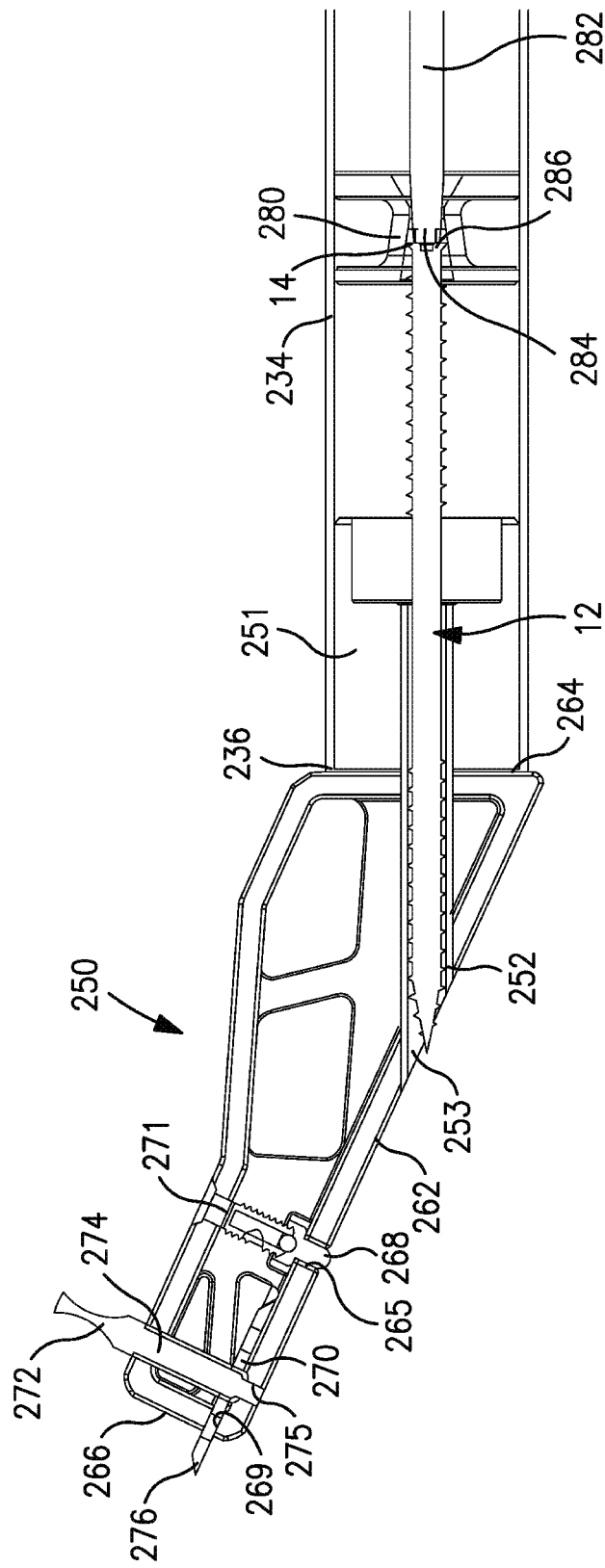
FIG. 20 is an enlarged end sectional view of the installation tool of FIG. 17 and further illustrating a fastener received in the installation tool.

With reference to FIGS. 17-25, another embodiment of an installation tool (which does not show the power driver assembly) is generally designated by the numeral 200 (FIG. 17). Installation tool 200 includes a receiver 202 for the power driver assembly (not illustrated), a telescopic tube assembly 230 comprising telescopic tubes 232 and 234, and a fastener guide head assembly 250 which is mounted at the end 236 of tube 234.

A handle assembly 210 is disposed in longitudinally fixed relationship to tube 234 and includes a trigger 212 which is depressible into one of essentially two positions. One partially depressed position of the trigger 212 allows for the handle assembly to be angularly adjusted about the longitudinal axis of the distal tube 234 at a preset defined angular position. The full depressed position of the trigger 212 allows for the proximal tube 232 to be retracted relative to the distal tube 234 when the fastener 12 is driven. The handle assembly 210 also provides for two-handed support of the tool so that the stabilizing edge 276 can be effectively stabbed into the support member. It should be appreciated that the tubes 232 and 234 do not rotate relative to each other with the non-rotatable position being ensured by a longitudinal flat 236 which engages through the handle assembly.

With reference to FIGS. 19A-B and 23-25, the handle 210 has a grip portion 214 which carries the trigger 212. The handle assembly 210 is attached to the distal tube 234 by a yoke 240 which is longitudinally fixed between a pair of collars 241 and 243. The trigger 212 moves a ramp 216 which engages complementary ramp 218 of a plunger 220. The plunger 220 has a radially acting detent 222 which is biased inwardly into the tube 234.

A plurality of (preferably five) recesses 225 are angularly spaced in fixed relationship to the outer tube 234. The projectable detent 222 is longitudinally aligned with the recesses 225 and receivable in a selected recess for retention under the plunger bias. Upon depressing the trigger 212, the detent 222 is retracted from a recess 225. Angularly rotating the grip 214 relative to the distal tube 234 allows detent 222 to be angularly engageable into a selected recess 225 to fix the angular position of the handle assembly 210 as desired by the installer. That angular position is further secured by a thumb screw 246 at the top which is tightened to secure the desired angular position.

A pair of internal collar mounts 245 and 247 are respectively fixedly mounted interiorly of the tubes 232 and 234. The mounts allow rotational and axial movement of the drive train. A spring 248 bears against the mounts and essentially biases the tubes 232 and 234 to a maximum extended position which is limited by a stop 249. The spring 248 may be optional. Stop 249 allows for replacement of the driver bit 282 to complement the fastener head. The plunger detent 222 also extends through an opening 223 to prevent movement between the distal tube 234 and the proximal tube 232 and thus fix the effective tool length. When the trigger 212 is fully depressed, the plunger is retracted from the opening 223 to allow the proximal tube to move relative to the distal tube against the bias of the spring 248 until the fastener is fully driven.

With additional reference to FIGS. 5, 17 and 20-22, a dual floating alignment bushing or receiver guide 280 is mounted at the interior of the distal tube 234 and has a central opening which receives the output coupler 284 of the drive train 282. The guide 280 ensures a concentric alignment between the fastener and the driver. The dual receiver guide 280 has a double conical or funnel-like constriction 286 which receives the head 14 of the fastener 12 and centers it for engagement by the coupler 284 as illustrated.

A fastener guide head assembly 250 is mounted at the distal tip 236 of the tube assembly. The guide head assembly 250 has a generally cylindrical base 251 which is retained to the distal tube 234 by means of one or more set screws 239 (FIG. 17). A sleeve 252 extends through the base 251 to form a channel which receives and guides the fastener 12. Surface 262 defines the sleeve input opening 253 to sleeve 252 for the fastener as correspondingly described with respect to guide assembly 50. The sleeve 252 receives the fastener so that the head 14 is properly positioned to be readily engageable by the torque coupler 282. The major thread diameters of the fastener 12 and the interior diameter of the sleeve 252 are configured so that the interior diameter of the sleeve is only slightly larger than the major thread diameters of the fastener. Preferably, the maximum diameter of the head 14 is approximately equal to the major diameter of the threads. It will be appreciated that as the fastener 12 is loaded into the guide head assembly 250, the head 14 moves through the sleeve or channel 252 and is convergently directed via the funnel-like constriction 286 (FIG. 20) toward engagement with the torque coupler 284 of the drive train. The coupler 284 is also axially centered by the dual receiver guide 280. The dual receiver guide 280 can axially move or float within the tube. The movement is inwardly limited by a dimple 281.

The guide head assembly 250 is preferably a cast or molded member of lightweight rigid form which includes a frame extending from the base with a planar engagement surface 262 disposed at an acute angle with respect to the lower planar mounting surface 264. Mounting surface 264 preferably engages against the end of the tube assembly and transversely extends across the distal end 236 of the tube 234. A planar end plate 266 is parallel to surface 264 and positioned to engage the underside of the roof support member 26. The acute angle is preferably 22½°, although other angles may be provided depending on the intended application of the installation tool. The specific angle can be provided with a guide head assembly having the required angle of the sleeve or guide channel relative to the engagement surface 262.

Figure 21:
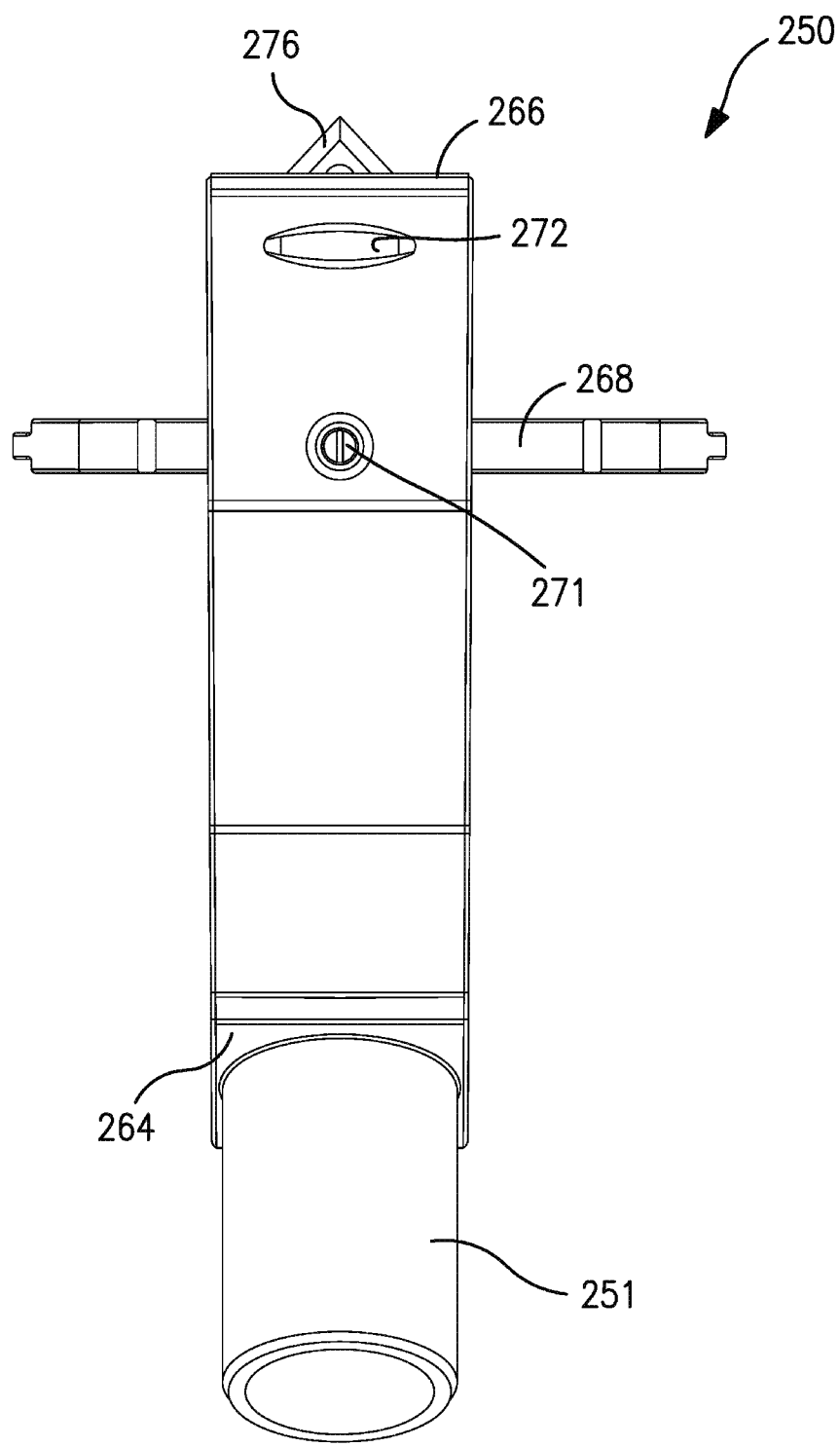
FIG. 21 is an enlarged generally top plan view of the guide head portion of the installation tool of FIG. 17.
Figure 22:
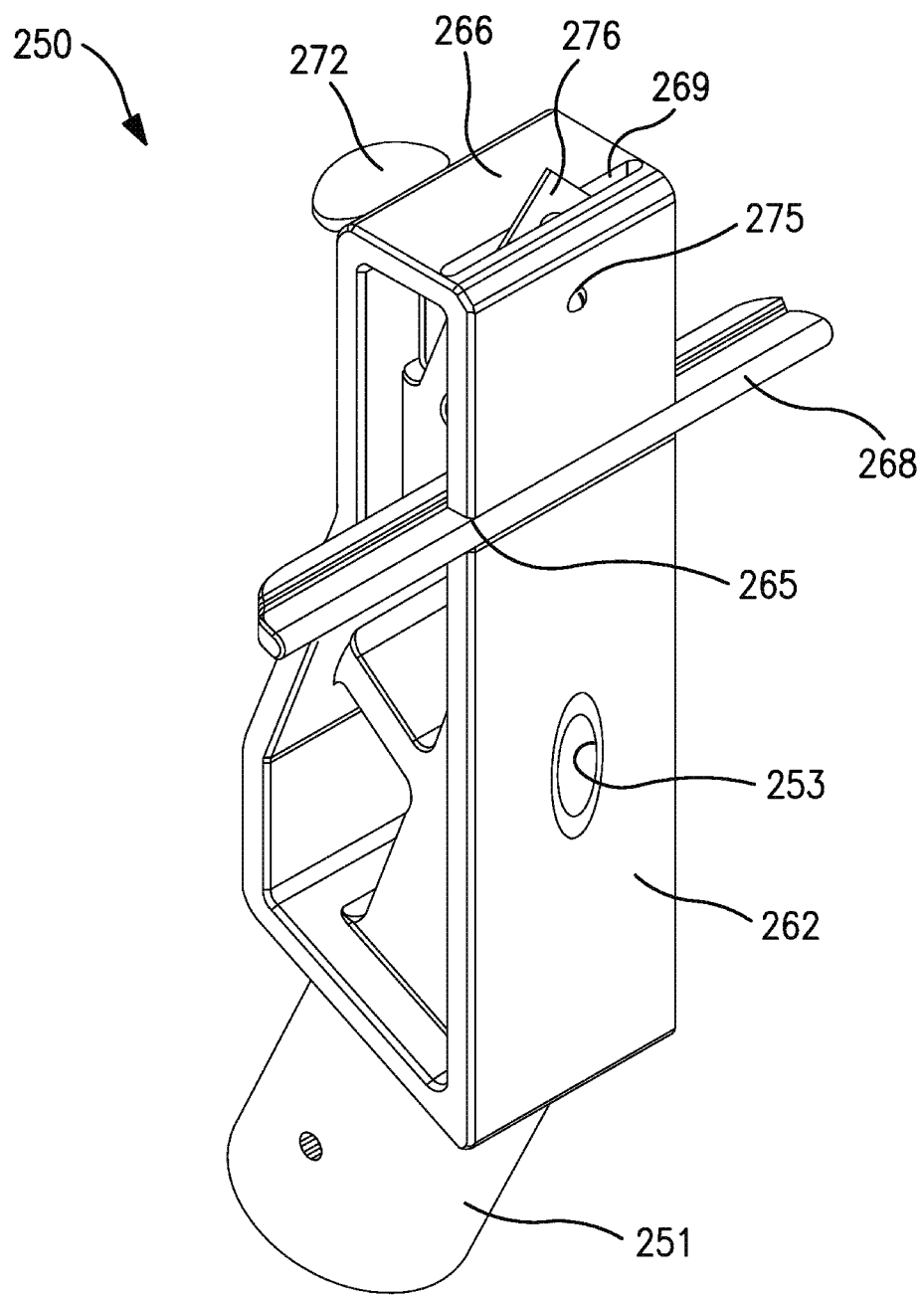
FIG. 22 is an enlarged generally bottom perspective view of a guide head portion of FIG. 21.
Figure 23:
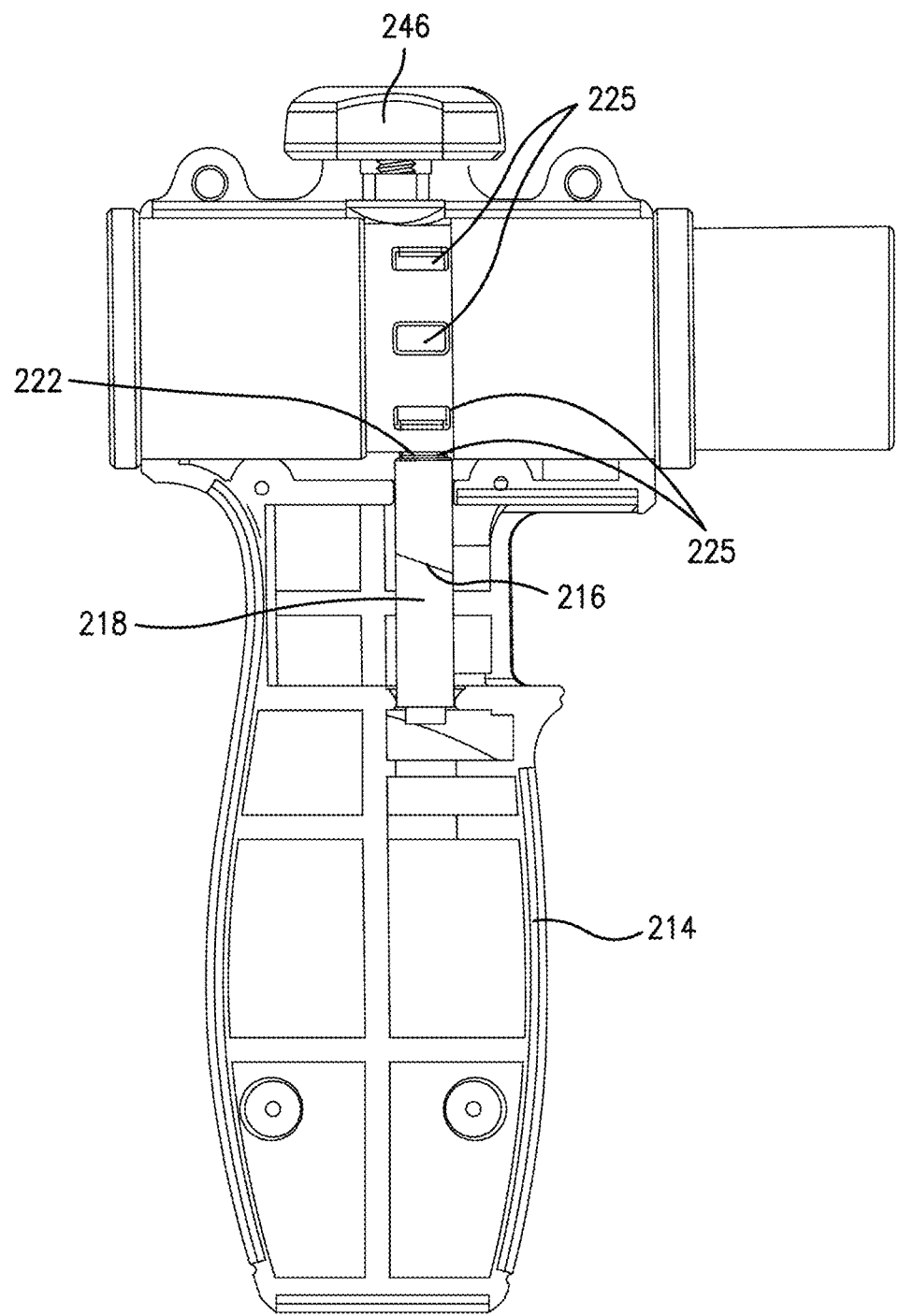
FIG. 23 is an enlarged generally opposite side elevational view, portions removed, of a handle assembly for the installation tool of FIG. 17.
Figure 24:
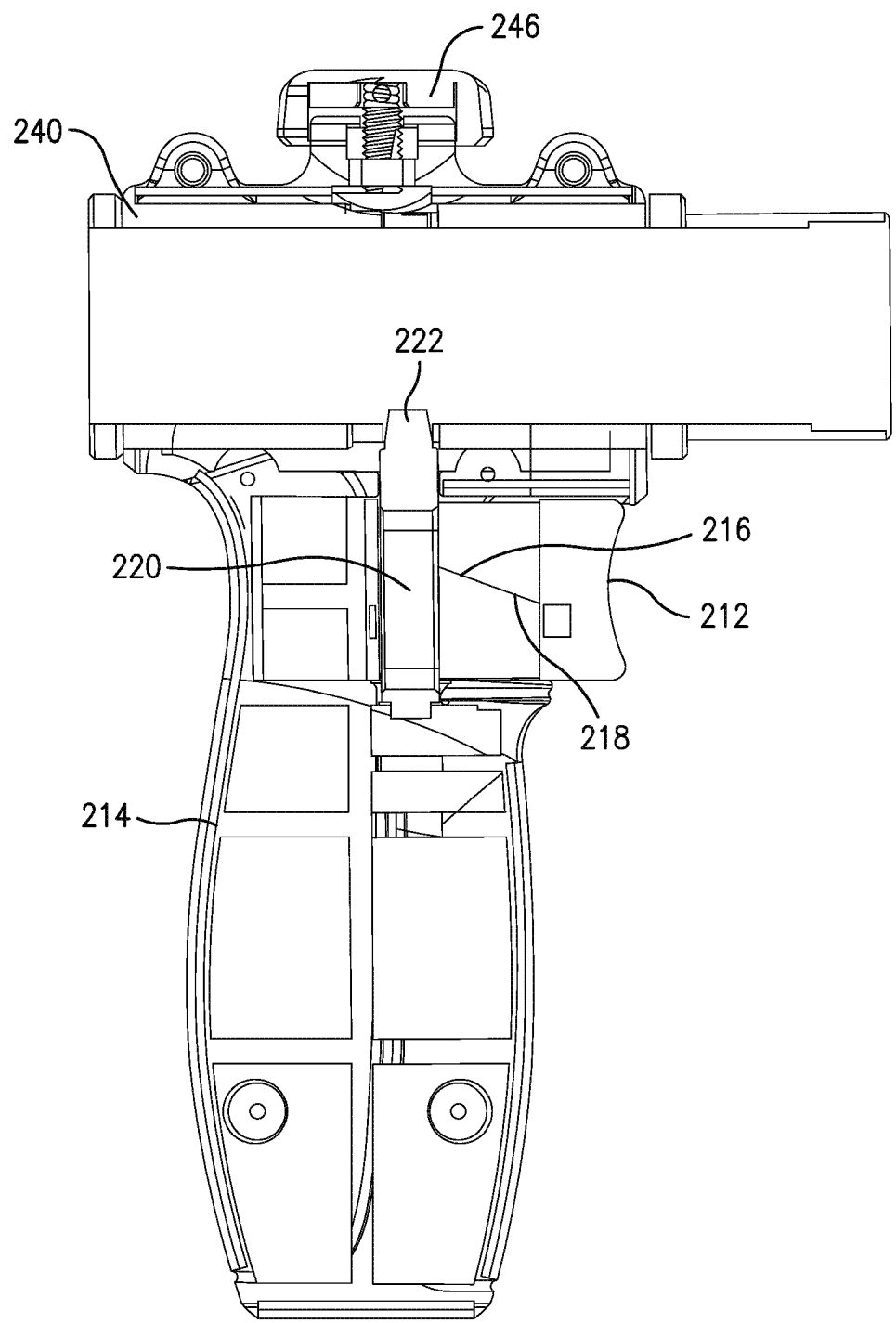
FIG. 24 is an enlarged side elevational view, portions in section and portions removed, of the handle assembly of FIG. 23.
Figure 25:
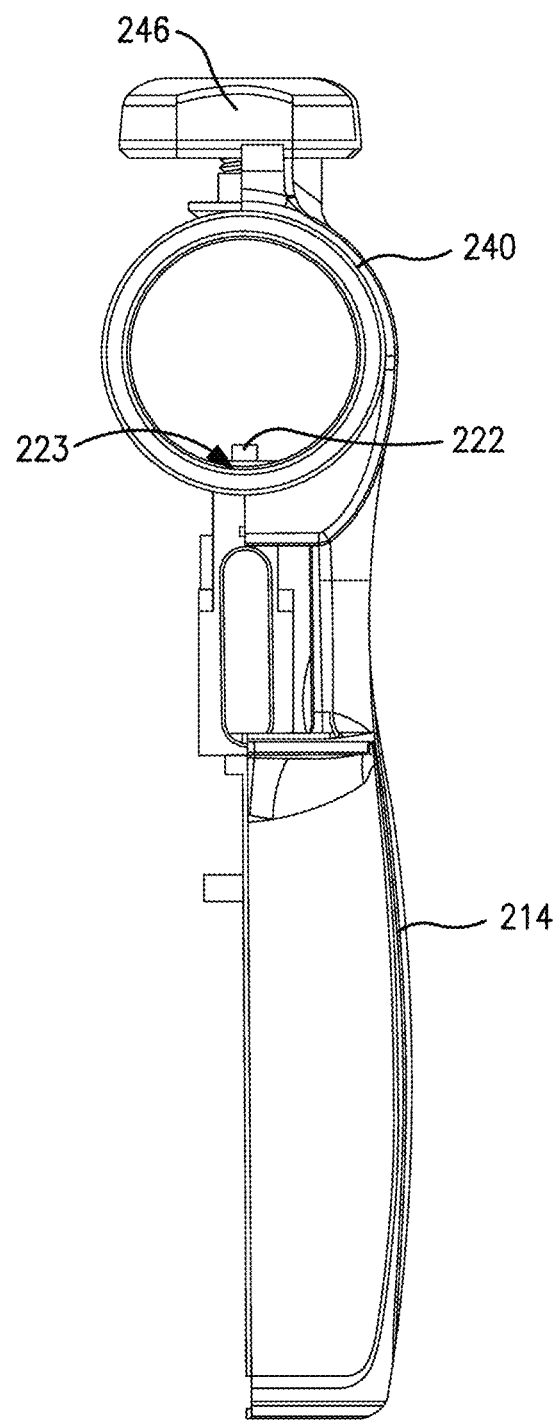
FIG. 25 is an enlarged generally right side view of a portion of the handle portion of FIG. 24, taken from the right thereof and partially broken away to show detail

A transverse slot 265 receives an L-shaped alignment bracket 268 which protrudes transversely at opposed sides of the engagement surface 262 and also projects outwardly from the surface 262. A set screw 271 secures the bracket 268 and allows the bracket 268 to be adjusted laterally, for example, when required at corners. The alignment bracket 268 is positioned and configured to fit below the 2×4 at the top plate 22 to ensure proper perpendicular alignment with the top plate. For corner configurations, the alignment bracket 268 may be moved to an extreme lateral position, either left or right of the position as shown in FIG. 21.

The upper portion of the frame is traversed by a slot 269 which receives a metal stabilizer plate 270. The stabilizer plate is secured by an adjustment knob 272 which connects with a threaded rod 274. The rod extends through an opening in the plate and threads into separate threaded opening 275. The stabilizer plate 270 preferably has a square configuration with four vertices which form edges 276. The edges 276 are sharpened. When the guide head assembly 250 is properly positioned a sharp edge 276 projects upwardly from the edge surface 266 of the frame. The function of the stabilizer plate 270 with edge 276 is to provide a stabbing structure to engage into the wood proximate the interface of the top plate 22 and the roof support member 26 to thereby stabilize the tool 200 and prevent movement or walking while the fastener 12 is being torqued by the installation tool. The stabilization is important at the initial stages of driving the fastener.

FIGS. 26-29 illustrate installation tools 300, 400, 500 and 600 which incorporate various adapters for coupling with the conventional rotary driver tools.

Figure 26:
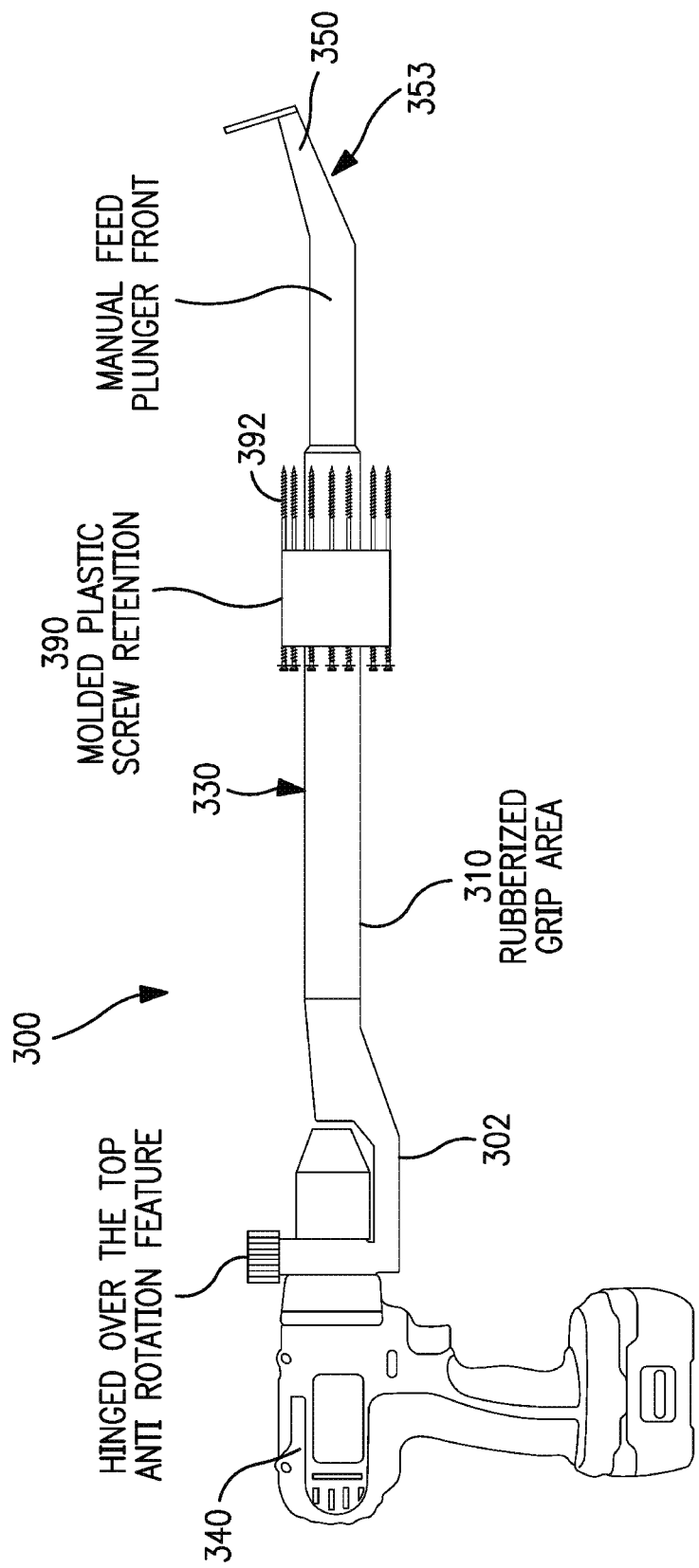
FIG. 26 is an annotated side elevational view, partly in schematic, of an installation tool.

FIG. 26 illustrates an installation tool 300 with an adapter 302 for attachment to the type of rotary driver tool which includes a collar mounted auxiliary handle. Such handles are frequently found on hammer type drills to provide additional leverage for the user. In this case, the disclosed adapter 302 replaces the auxiliary handle of the driver tool 340 with a collar attachment to secure the adapter to the rotary driver behind the chuck. The chuck is used to secure the extended length drive shaft to the rotary driver and a grip 310 permits the user to securely grasp and maneuver the tool 300 and adapter 302. The grip 310 of the tube assembly 330 receives a manually fed plunger front portion. The plunger front portion is configured to telescope inside the grip of the adapter during screw installation. The manual feed plunger incorporates a screw guide 353 which surrounds and guides the screw during installation. The guide head 350 is configured to permit the user to accurately place the screw in the center of a wood structural member so that the screw will be installed centered on the truss and parallel to truss orientation, and preferably at a 22.5° angle with respect to a vertical direction. This 22.5° angle is selected to ensure that the installed screw passes through the lower building components and accurately penetrates an upper building component, for example a roof truss. It will be apparent to those skilled in the art that other angles may be suitable for other applications and that alternative plunger tip configurations will be desirable for other screw installations.

The rotary tool adapter illustrated in FIG. 26 includes a cylindrical screw magazine 390 disposed about the grip 310 of the tube assembly 330. In this embodiment, screws 392 are removed from the magazine 390 and manually inserted into the screw guide 353 located in the plunger front end of the tube assembly 330. The screw guide is configured to closely receive a screw without excess radial space around the screw. The screw guide is configured to accurately start and deliver the screw 392 through the wood structural members. The length of the screw and the intended structural purpose of the installation require precise guidance and delivery of the screw through the associated wood members.

Figure 27:
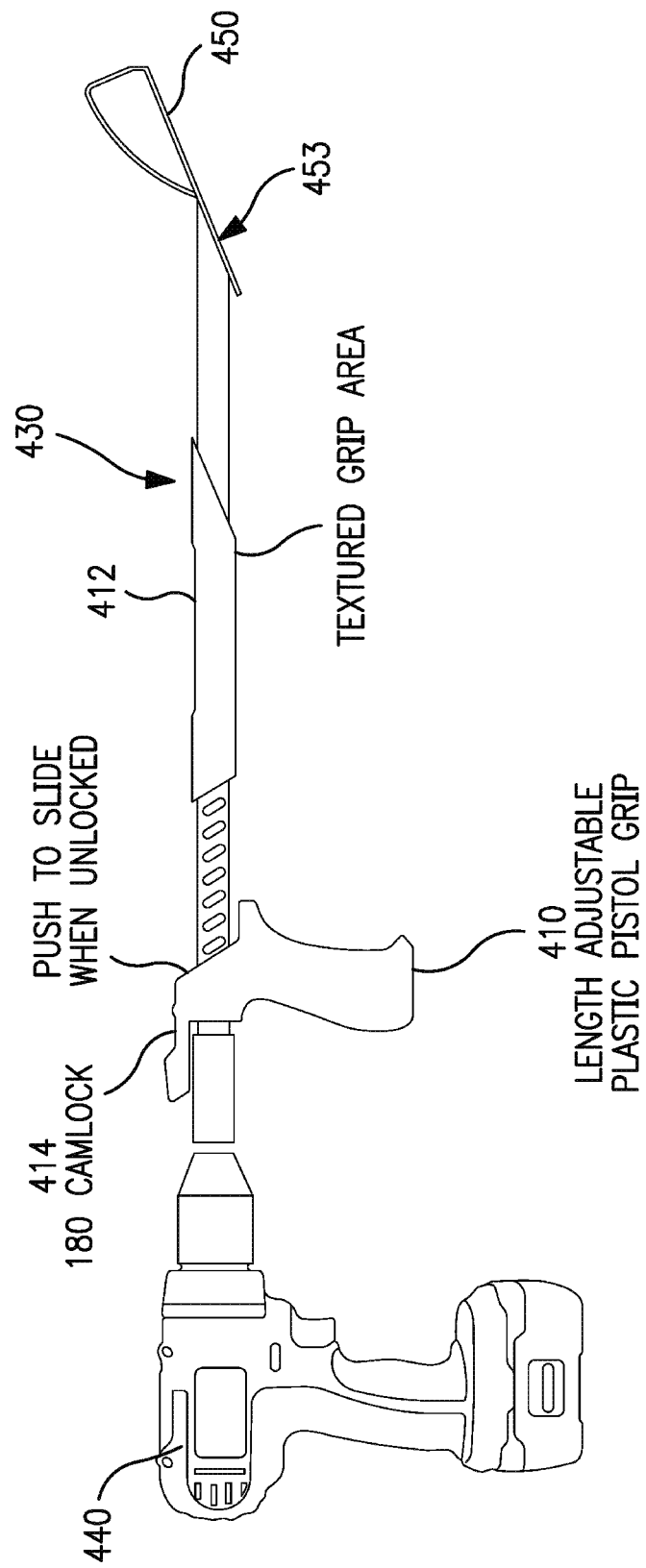
FIG. 27 is a side elevational view, partly in schematic and partly annotated, of an installation tool.

FIG. 27 illustrates an installation tool 400 with a second embodiment of a tool adapter for use with the disclosed construction system. The embodiment of FIG. 27 illustrates a pistol grip adapter 402 configured to engage a rotary driver tool 440. The pistol grip permits the user to maintain control over the adapter and rotary tool during screw installation. This embodiment also includes a grip 412 forward of the pistol grip 410 and a plunger/screw guide 453 at the forward end of the tube assembly 430. The tip of the plunger/screw guide is configured to assist the operator to drive screws at the 22.5° angle (FIG. 27, lower right), though other tip configurations and angles are compatible with the disclosed construction system. The embodiment of FIG. 27 shows an arrangement where the position of the pistol grip 410 is adjustable on the rear portion of the tube assembly 430. This arrangement permits the user to customize the ergonomics of the adapter to the task and an operator. A lever actuated cam lock system 414 allows the user to disengage the pistol grip 410 from a tubular rear portion and to fix the pistol grip in a selected alternative position. FIG. 27 illustrates a view of a guide head 450 for the screw guide plunger which includes a sight line enhancing an operator's ability to center the screw on a structural member during installation.

FIGS. 28A and 28B illustrate an installation tool 500 with an alternative embodiment of a tool adapter 502. The embodiment of FIGS. 28A and 28B includes a pair of flexible arms 504 configured to elastically deform and grip the sides of a rotary driver tool 540. Thermoplastic resin pads 506 enhance frictional engagement between the arms and the sides of the rotary tool. The adapter 502 of FIGS. 28A and 28B also includes an extended grip area 510 for use by the operator. The screw guide/plunger front end of the adapter is shown with one of several contemplated plastic guide heads 550. The illustrated head 550 is configured to aid the operator in installing a screw at a 22.5° angle relative to the vertical as previously described. A plurality of plastic tips for mounting on the end of the screw guide can be swapped out for different screw installation purposes.

Figure 29:
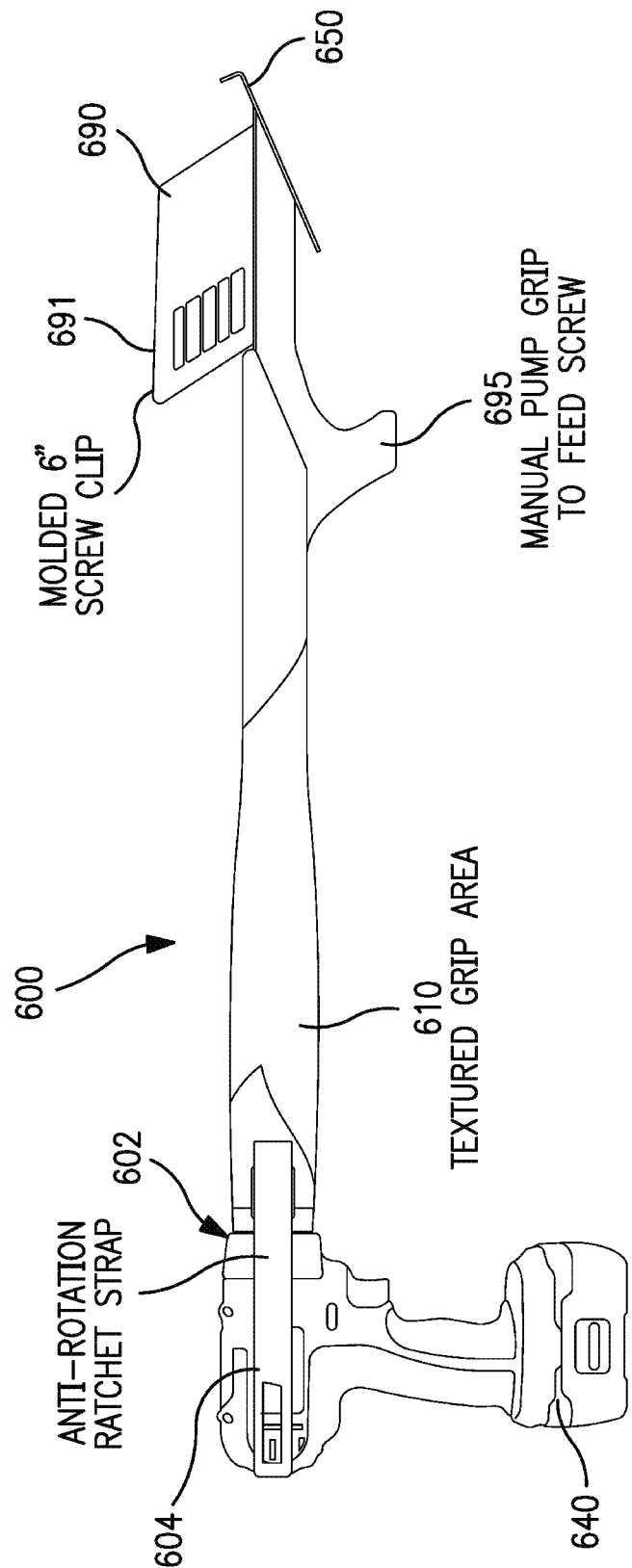
FIG. 29 is an annotated side elevational view of an installation tool.

In installation tool 600 with a further alternative tool adapter 602 is disclosed in FIG. 29. In this embodiment, the adapter is secured to the rotary tool by a ratchet type strap 604 extending from the sides of the adapter around a rear portion of the rotary tool 640. This configuration permits the adapter to be securely integrated with the rotary tool. Various means may be provided to tighten the ratchet strap in a manner similar to arrangements used on snow sport bindings for example. In the embodiment of FIG. 29, the rear grip portion 610 has an ergonomic shape and a textured grip area to enhance operator ease of use and safety. The embodiment of FIG. 29 shows a molded plastic plunger guide head 650 with an integrated molded 6" screw clip 690. The grip portion 610 is configured to permit the forward plunger portion to recede into the grip portion during screw delivery. A pump action screw feeder is illustrated where screws are moved from a clip to a screw guide by manual cycling of the manual pump grip 695. Once the first screw is manually fed into the screw guide, further screws may be delivered with the longitudinal cycling of the screw guide during subsequent screw installation. A sight line 691 on top of a clip 690 enhances the user's ability to center the screw guide on a structural member for accurate delivery of screws.

Figure 30:
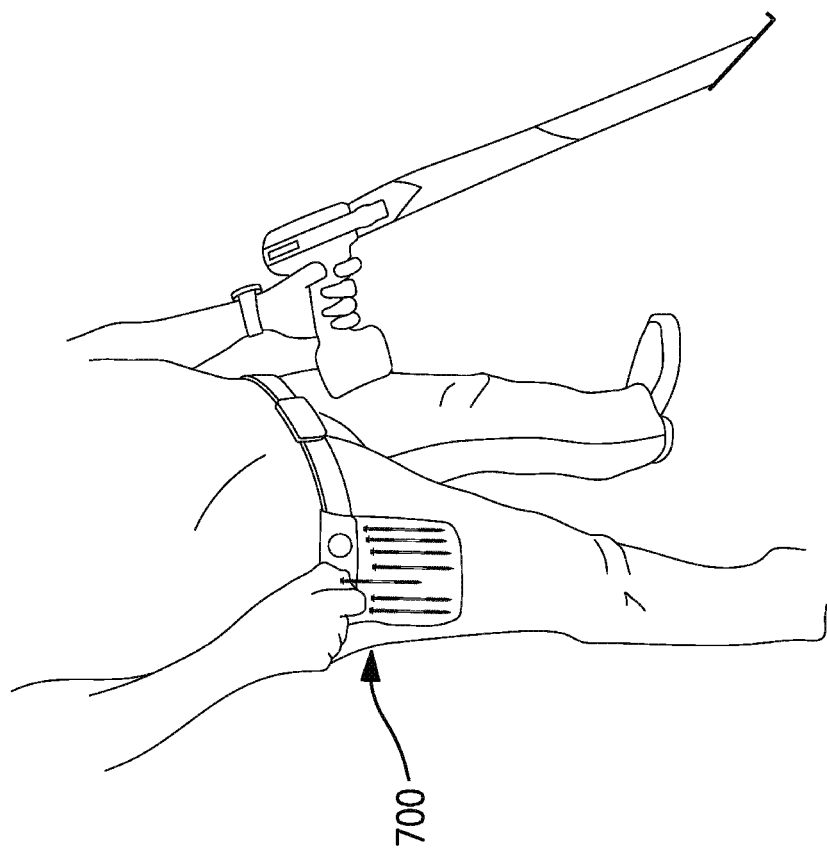
FIG. 30 is a schematic view of an installer illustrating a belt holster and a representative installation tool for reception by said holster.
Figure 31A:
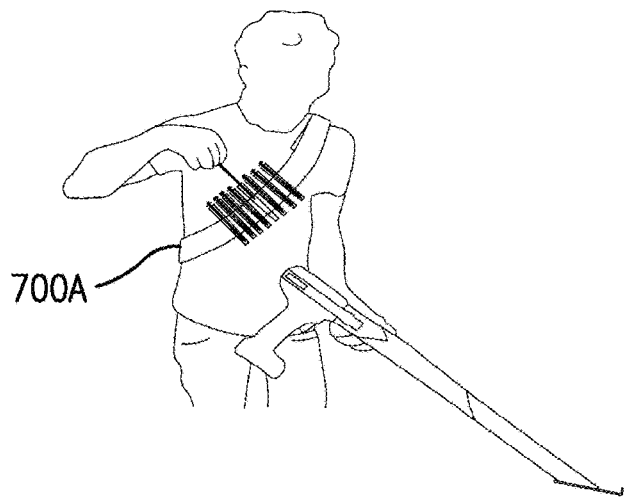
FIGS. 31A and 31B are respectively a schematic view illustrating a bandolier holder for fasteners and a representative installation tool and an enlarged fragmentary front view of the bandolier holder and fasteners.
Figure 31B:
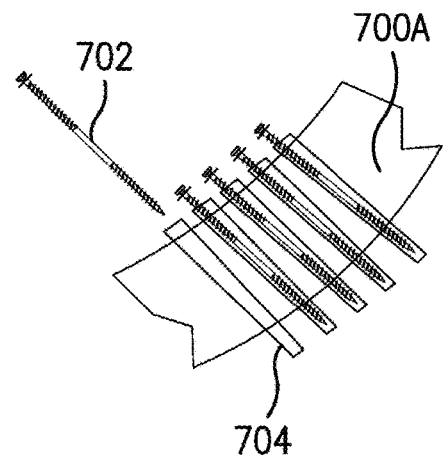
Figure 32A:
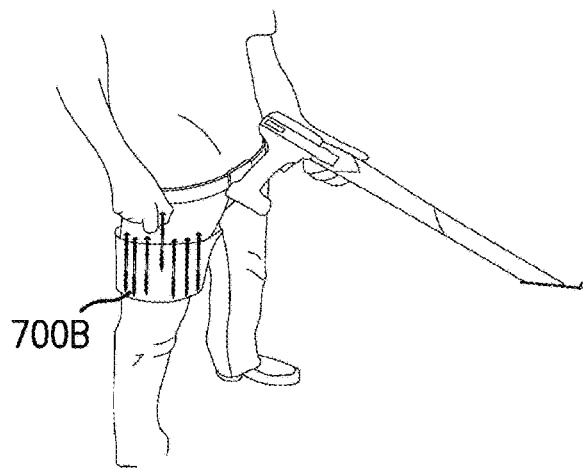
FIGS. 32A and 32B are respectively a schematic side view of a thigh-mounted fastener holder and a representative installation tool and an enlarged fragmentary front view of the thigh-mounted fastener holder and fasteners.
Figure 32B:
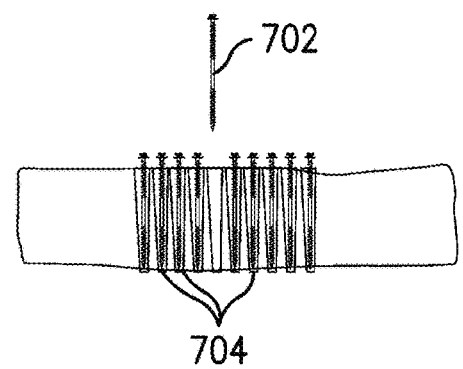

Accessories can also aid in efficient use of the disclosed installation tools and the construction system. Various ways of maintaining a supply of fasteners on the person of an operator are disclosed. Such accessories minimize the necessity to interrupt installation to renew a supply of fasteners. For example, FIG. 30 illustrates a belt holster 700 holding several screws from which the operator efficiently retrieves a screw and manually installs each screw in a screw guide.

FIGS. 31A-31B and 32A-32B respectively illustrate a bandolier 700A and leg mounted screw holster 700B as alternatives for maintaining a number of screws 702 on the person of the operator. The screw holding systems illustrated in FIGS. 31A-31B and 32A-32B may include magnets arranged to maintain screws in the disclosed holders while the worker is moving about the construction site. This reduces the chance that screws may fall out of the disclosed holders and enhance ease of use. The fastener holders of FIGS. 30-32B may include tapered plastic tubes 704 for each fastener. The tubes can be configured to cover the sharp points of the fasteners to avoid inadvertent injury to the operator. For example, the bottom end of the tapered tubes 704 may be closed.

Figure 33:
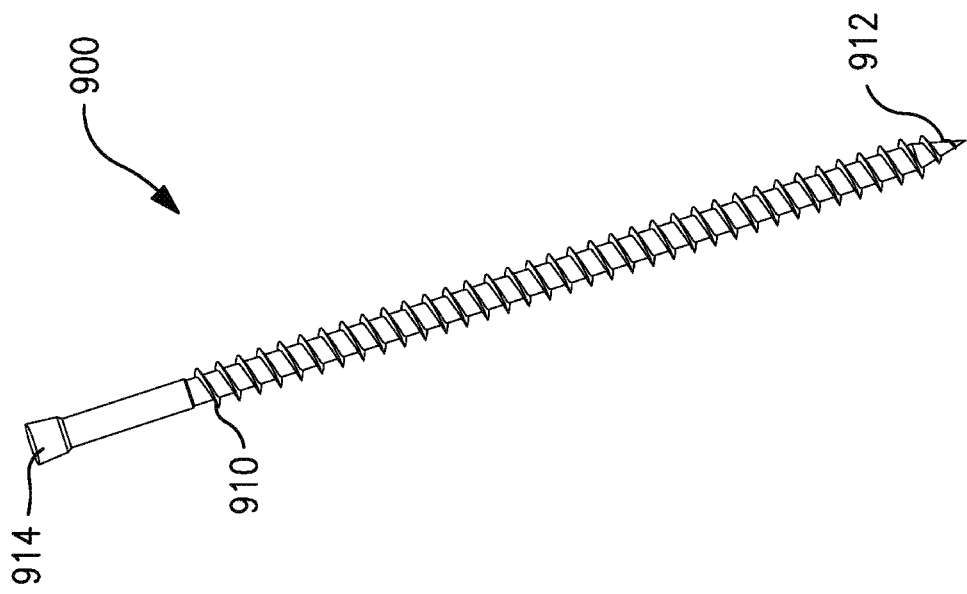
FIG. 33 is a perspective view of a representative fastener that may be employed in the installation tools.

The disclosed installation tools may be adapted for use in driving a wide range of fasteners to implement various connections of wood components in a wood structure. A preferred fastener 900 which has particular applicability for providing a connection between a top plate and a truss frame is illustrated in FIG. 33. Fastener 900 is a six-inch fastener which has an uninterrupted thread 910 extending from a gimlet point 912 toward a head 914. The thread 910 is approximately five inches. In one embodiment, the gimlet point has a 30° angle. The head 914 has a socket which may be a T25 Autosert drive or other socket configuration with a fixed diameter that preferably ranges from 0.260 to 0.290 inches, which is approximately the major diameter of the thread 910.

Depending upon the application, a number of other fasteners are possible depending upon the connection to be implemented as well as the specific structural components.

FIGS. 34A-34D illustrate representative fasteners compatible with the disclosed construction system. The disclosed fasteners 920A and 920B are double-threaded, having a self-drilling tip 922 and approximately 2" bottom thread 924 paired with a threadless center shank portion 926 and 1½"-2" top thread. The top thread 928 (under the head 930A and 930B) is for increasing head pull-through performance. The top thread 928 in one configuration has a higher pitch, e.g., a greater number of threads per inch, to reduce the rate of penetration of the fastener as the top thread enters the wood during installation. This configuration will reduce the likelihood of board jacking and enhance clamping during installation. The top thread 928 may be of the same major and minor diameter as the bottom thread or may have a larger major and/or minor diameter to enhance pull-through resistance. The axial length of the top thread 928 may be as short as ½" depending upon the configuration of the upper thread and the desired pull-through resistance. The threadless center portion of the screw is arranged to permit maximum penetration of the bottom thread 924 into the various structural members prior to engagement of the top thread. The screws are illustrated with a Torx type drive socket 932 configured to facilitate automated or mechanized screw installation in the disclosed screw guides.

Different bright colors or tints are applied to the screws 920A and 920B to readily identify the fastener for both proper connection and inspection purposes. Currently, building inspectors can easily identify metal brackets applied to structural members. The alternative use of threaded fasteners potentially makes inspections more problematic. Threaded fasteners are not as easily seen by building inspectors. Even if the inspector can see the ends of the fasteners, the inspector would not necessarily know what type of fastener is installed. The disclosed construction system addresses this issue by applying bright colors to the fastener or at least the head of each fastener. Brightly colored fastener heads 930A and 930B provide a clear visual indication of the type of fastener installed in a given location. Bright colors can also help builders and workers to identify the correct fastener for a particular purpose.

FIGS. 35A-35E illustrate an embodiment of the representative installation tool and construction system being used to install the disclosed threaded fasteners to connect various structural components. Note that the construction worker standing on the floor has clear sight lines to the installed fasteners whether the installation is overhead or at floor level. The worker is neither climbing a ladder nor squatting down at floor level. The disclosed construction system should enhance workers' safety and productivity while reducing the possibility of injury or worker discomfort.

Figure 36A:
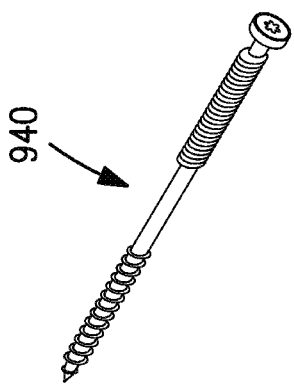
FIGS. 36A-36C are respectively a perspective view, a diagrammatic side view and an end view of a fastener which may be employed for an installation tool.
Figure 36B:
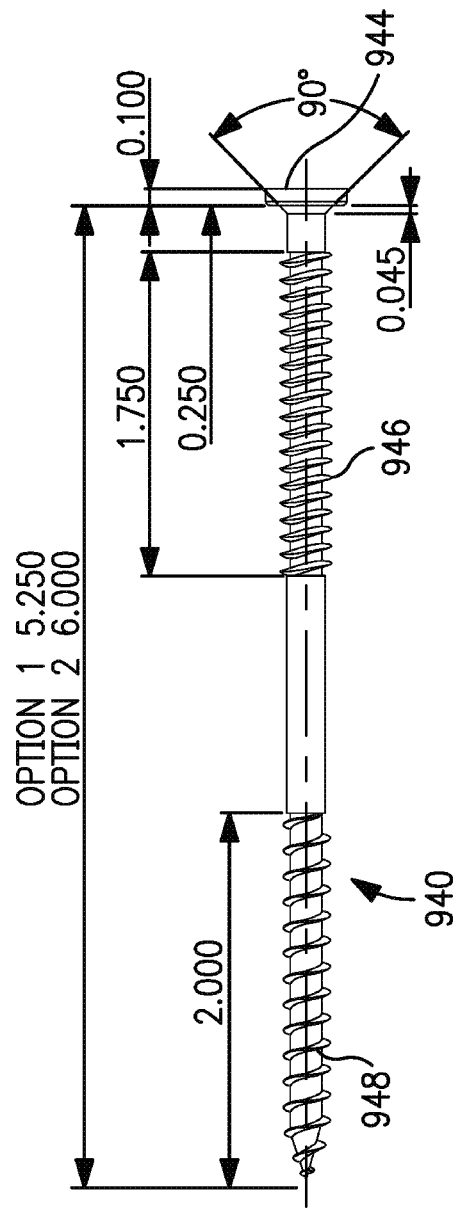
Figure 36C:
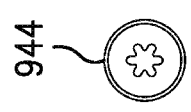

FIGS. 36A-36C illustrate a proposed embodiment of a fastener 940 compatible with the disclosed construction system. A Torx™ drive socket 942 in the screw head 944 is shown but other socket-type drive heads, such as square drive, Torx T-Tap™, Torx Plus™, Phillips, etc. are possible. The head 944 of the fastener employs an internal (socket) type drive, is compact and relatively small in diameter to reduce the likelihood of interference with other building components such as sheathing on the outside and sheetrock on the inside of a structure. The relatively small head can reduce the fastener resistance to pulling through wood structural members when subjected to forces along the axis of the fastener.

In the disclosed fastener 940 shown in FIGS. 36A-36C, it can be seen that the top thread 946 has a higher pitch than the bottom thread 948. This thread pitch differential between top and bottom threads for some applications to reduces board jacking and enhances building component clamping during installation of the disclosed screws. The top threads of the disclosed fasteners are configured to enhance pull-through resistance of the disclosed fasteners. It will be noted that the major diameter of the top thread 946 is larger than the major diameter of the bottom thread 948. The disclosed fastener employs a single diameter shank which is formed to result in the disclosed thread patterns. Multi-diameter blanks are also contemplated where the diameter of the shank at the top of the fastener may be larger to provide more material for the top thread resulting in enhanced pull-through resistance. The disclosed threaded fasteners are contemplated between 5.25"-6" in length but length will vary depending on the intended purpose of the fastener. The illustrated fastener 940 has a 2" bottom thread 948 and a 1.75" top thread 946. The length of the top thread and the length of the unthreaded center portion of the screw shank can be varied to tune screw performance.

While the fastener 940 employs a thread configuration where the top thread 946 has a higher thread count (TPI) than the bottom thread 948, fasteners with the same thread count or a bottom thread having a higher thread count than the top thread may be useful for some purposes.

FIGS. 37A-37C illustrate an alternative screw configuration 960 contemplated as useful for certain locations in a structure. This fastener is a single thread fastener with a fin 962 or wing type boring feature adjacent to the tip. Fastener 960 may be suitable for a bottom plate to rim joist applications for example. The flared head 964 of this fastener provides enhanced pull-through resistance in locations where interference with sheathing or sheetrock is not a concern. The boring feature reduces the possibility of cracking the wood structural member during screw installation. This fastener has a large diameter main thread 966 to reduce strip out of the fastener when tightening multiple plies of laminated veneer lumber beams together. Alternatively, the boring feature may be configured as more of a fin type wing that can appear as a spiral and may be applied by a threading machine, eliminating the need for a secondary pointing operation. There may be two, three or four fins 962 that are equi-angularly distributed about the circumference of the screw tip. Each of the fasteners illustrated in FIGS. 36A-36C and 37A-37C are configured so that the head penetrates slightly into a structural member or sits flat against the member to prevent interference with other building components such as sheathing or brackets, straps and joist hangers that may need to be installed.

Figure 38C:
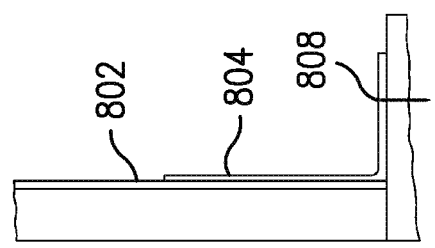
FIGS. 38A-38C are respectively fragmentary portions of a perspective view of a representative construction illustrating the use of a bracket assembly, an exploded view of the brackets, and a side sectional view illustrating the mounting of the brackets.
Figure 38A:
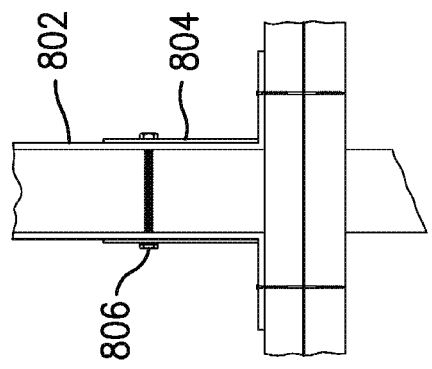
Figure 38B:
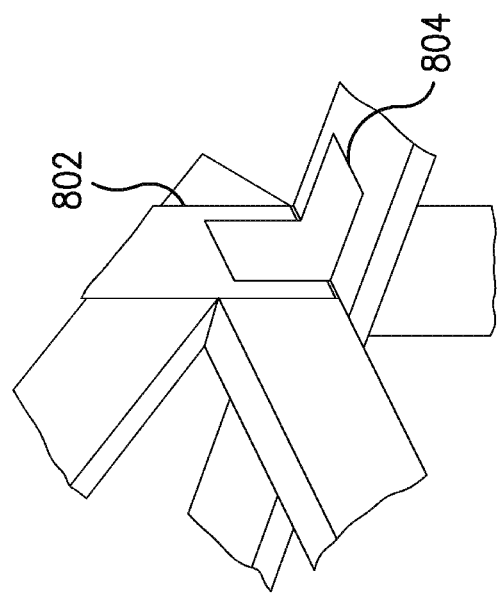

FIGS. 38A-38C illustrate various metal brackets and straps that may be employed in conjunction with the disclosed construction system. FIGS. 38A-38C illustrates the junction of a roof truss with the top plate of a structure. This is a location where many building codes require that the truss be strapped or tied to the top plate using a hurricane tie or the like. Metal plates 802 are typically used to hold truss components together. Such truss plates 802 are installed in a factory setting and include perforations that provide metal penetrating barbs to hold the plate to the truss components, thereby securing the truss components to each other. The resulting perforated configuration may provide an opportunity to attach L-shaped brackets 804 to tie the roof truss to the top plate of the wall as shown in FIGS. 38A-38C. Screws or bolts 806 may pass through the roof truss plates 802 and L-shaped brackets 804. Threaded fasteners 808 may be used to attach the lower portion of the L-shaped bracket to the top plate. FIG. 38C illustrates an L-shaped bracket 804 with perforations and wood penetrating barbs arranged to match the perforations in the truss plates. The L-shaped bracket 804 could be installed by pressing or hammering into the truss plates and threaded fasteners 808 can be employed to tie the L-shaped bracket 804 to the top plate.

FIGS. 39A-39E illustrate a possible alternative configuration for a truss plate. The disclosed truss plate 810 is U-shaped with the vertical portions of the U including perforations and wood penetrating points configured to secure the truss plate to the truss components. The bottom portion of the U-shape includes wood penetrating barbs 812 directed away from the truss and intended to penetrate the top plate of the wall. Threaded fasteners 814 contemplated in the disclosed construction system are then installed to tie the truss to the top plate and wall. The downward extending barbs 812 from the proposed U-shaped truss plate grip the top plate and enhance a secure connection of the truss to the wall. Further, the metal bottom panel 818 of the proposed truss plate 810 enhances pull-through resistance of the fastener relative to the truss.

Figure 40B:
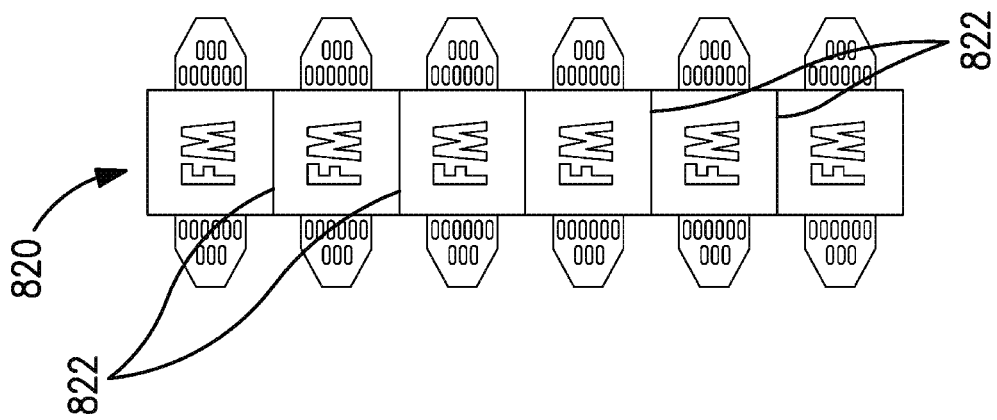
FIGS. 40A-40B respectively illustrate a perspective view of another bracket as mounted in place and a top view in a preassembled stage for the bracket.
Figure 40A:
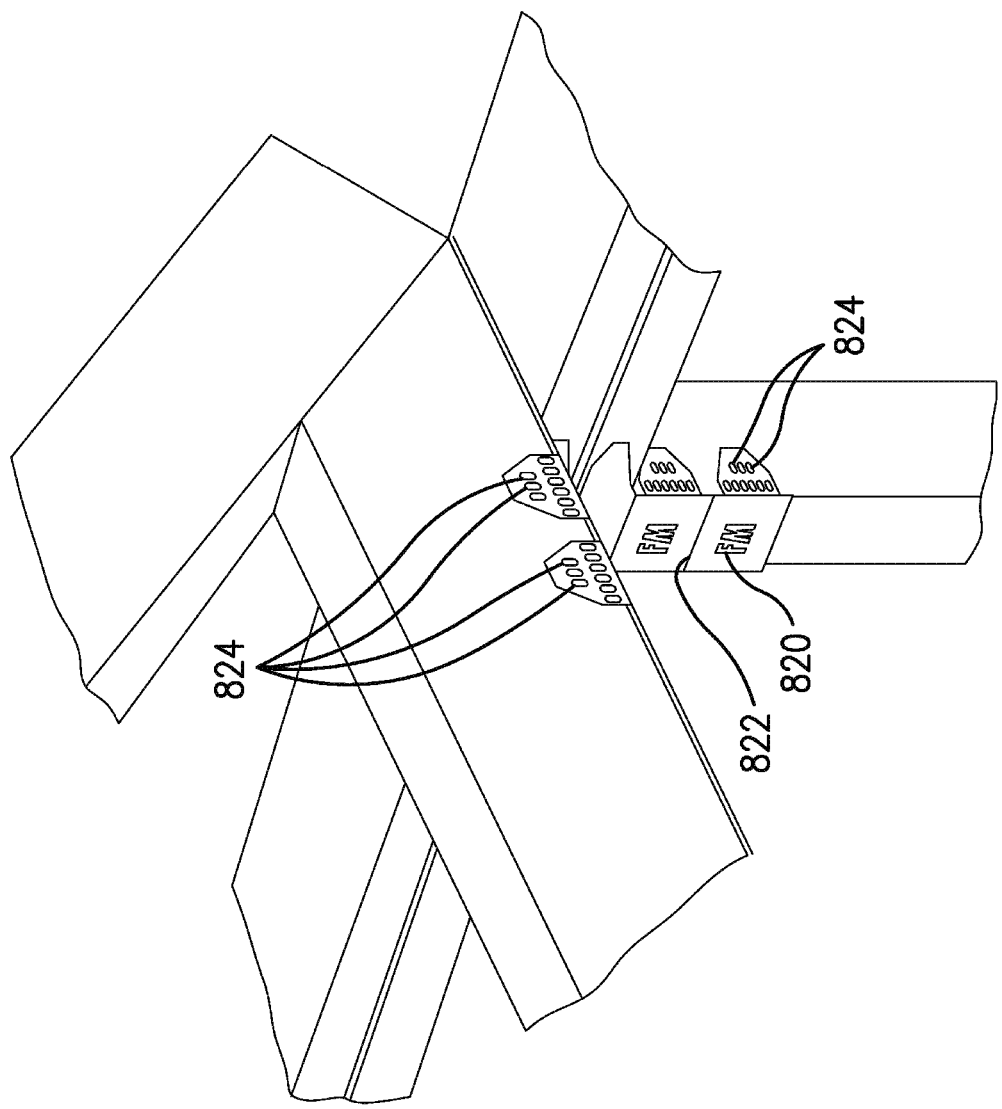
Figure 41B:
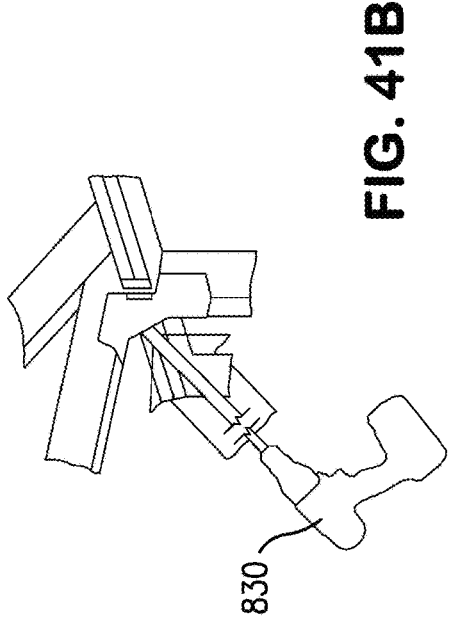
FIGS. 41A-41D respectively illustrate a first step and tool which may be employed in installing the bracket of FIGS. 40A and 40B, a second step in the installation process, a third step in the installation process, and an installed view of the bracket.
Figure 41D:
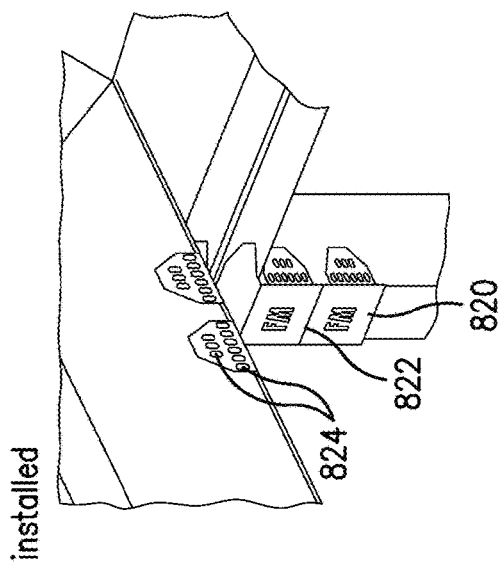
Figure 41A:
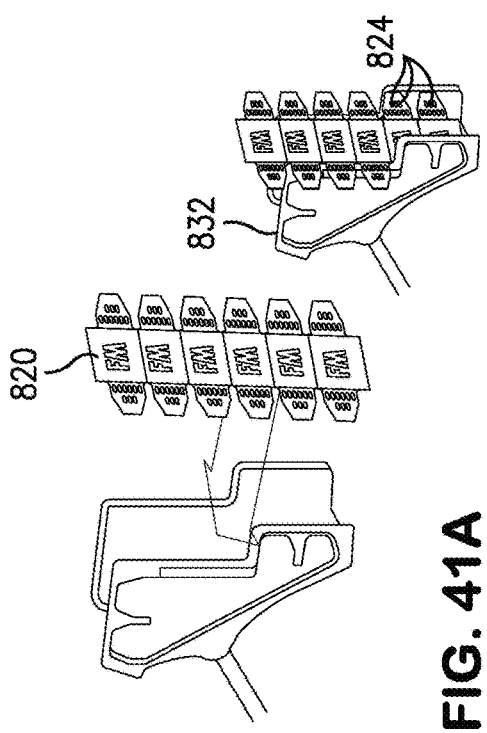
Figure 41C:
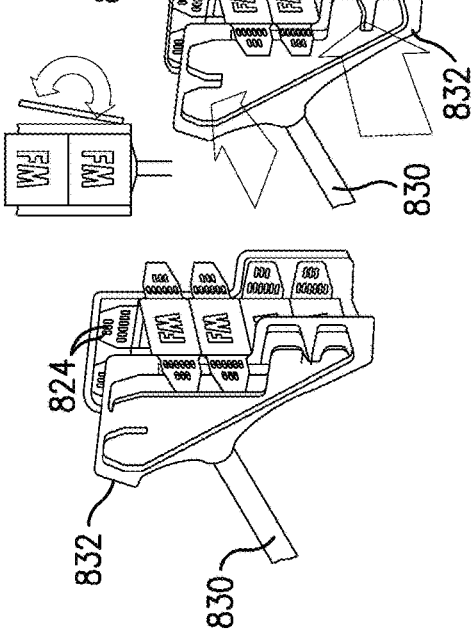

FIGS. 40A-40B illustrate an alternative metal construction bracket system. Flexible metal brackets 820 are arranged in elongated strips with score marks 822 or indentations between the segments. The elongated strips may be cut or broken between segments to provide metal brackets of different length. FIG. 40A illustrates a five-segment bracket placed to tie a vertical stud to a top plate and a roof truss. The disclosed metal brackets 820 include metal perforations which can be pressed into the wood to provide a secure bracket to wood connection.

FIGS. 41A-41D illustrate a tool 830 complementary to the disclosed flexible metal brackets 820. The tool 830 is configured to bend and clamp the proposed bracket in place, pushing the perforated metal barbs into the wood. A tool adapter 832 provides clamping force on the disclosed brackets. A rotary drive tool adapter is disclosed, though a hydraulic tool is also suitable for this purpose. The jaws of the tool include protrusions configured to mate with perforations on the brackets and push portions of the brackets into the wood, thereby attaching the brackets to the wood.

Figure 44D:
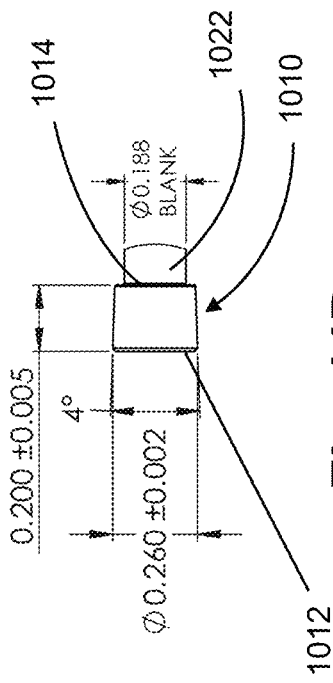
Figure 44F:
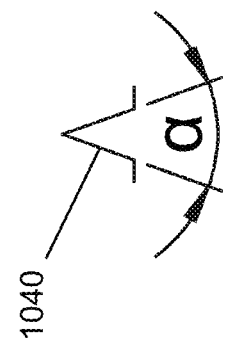
Figure 44B:
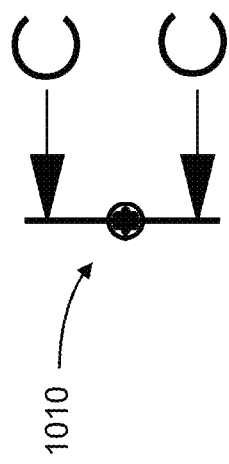
Figure 44E:
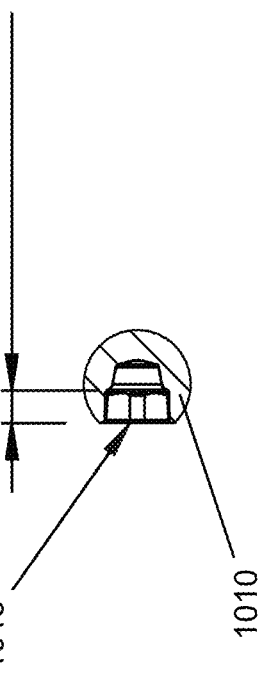
Figure 45A:
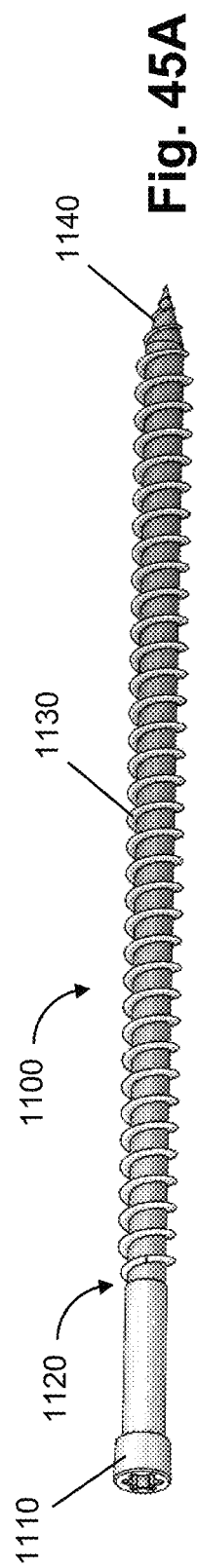
FIGS. 45A-45D are perspective views of fasteners which may be employed with an installation tool to fasten a first member to a second member at a pre-established angle.
Figure 45B:
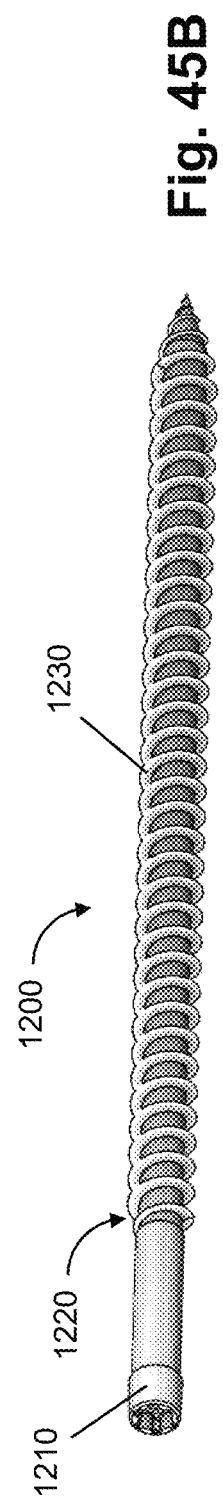
Figure 45C:
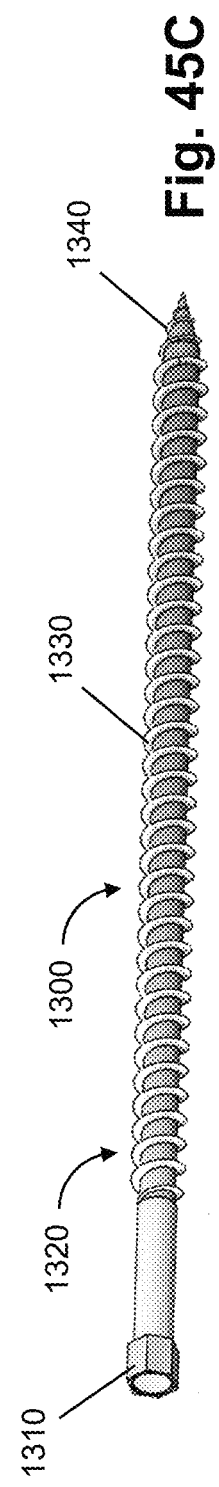
Figure 45D:
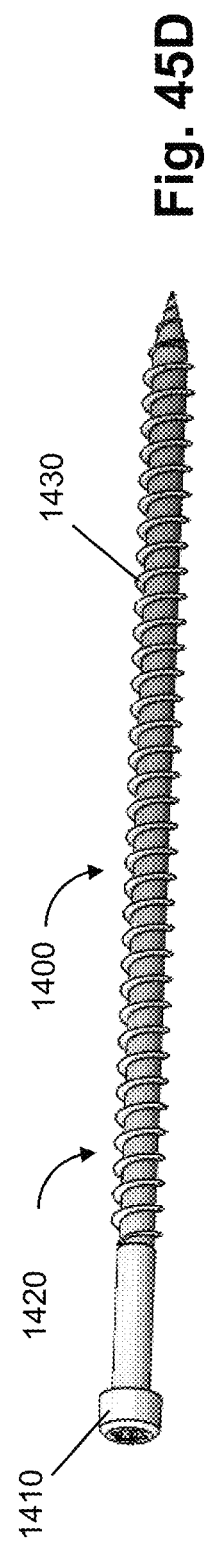

FIGS. 44A-F illustrate a fastener 1000 which can be employed in an installation tool as previously disclosed and which is compatible with the previously disclosed construction system. The fastener 1000 has a compact, proximal drive head 1010 which inwardly uniformly tapers at a small acute angle from a maximum diameter at the proximal engagement end 1012 to a slightly smaller diameter adjacent a fastener neck portion 1014. For a preferred embodiment, the acute angle is approximately 4°. The head 1010 has a recess or socket 1016 which is adapted for rotatable drive engagement by the drive coupler of the installation tool. In a preferred form, the socket 1016 is configured to couple with a T-25 AutoSert™ drive and preferably has a penetration depth P of between 0.065 and 0.075 inches (FIG. 44E). Other socket-type drive head configurations compatible with a rotatable drive engagement, such as Torx T-Tap™, Torx Plus™, Phillips, square drive socket, etc. are possible. The maximum diameter of the head 1010 is preferably 0.260 inches and the head axially extends approximately 0.200 inches.

A shank 1020 integrally extends from the head neck/end portion 1014 to a tapered distal tip 1030. The shank has an unthreaded portion 1022 adjacent the head of uniform diameter. An uninterrupted threaded portion 1024 along most of the shank is generally uniformly helically threaded along the remainder of the shank and onto the tip.

The thread 1040 preferably has a pitch of 7.5 threads per inch and a symmetric thread flank angle $\alpha$ having a range of 25° to 45° (FIG. 44F). In one preferred embodiment, angle $\alpha$=40°. The major diameter of thread 1040 is approximately 0.260 inches which is the maximum diameter of the head 1010. It should be noted that the corresponding fastener channel 52, 252 in a corresponding installation tool would be approximately 0.030 inches.

In one preferred embodiment, the minor diameter of thread 1040 is 0.172 inches; the diameter of the unthreaded portion 1022 is approximately 0.188 inches; the length of fastener 1000 is approximately 6.00 inches; and the length of thread 1040 is approximately 5.00 inches. The thread 1040 preferably continues onto the tapered tip 1030. Naturally, other fastener lengths, head and thread configurations are possible.

With reference to FIGS. 45A-45D, fasteners which may be employed with the installation tools as previously described are designated respectively as fasteners 1100, 1200, 1300 and 1400. The fasteners 1100, 1200, 1300 and 1400 typically have a length of six inches and a longitudinal thread length of five inches.

Fastener 1100 has a head 1110 and a shank 1120 with an uninterrupted thread 1130 which tapers at a distal tip 1140. The head 1110 has a maximum diameter which is equal to the major diameter of the thread 1130.

Fastener 1200 has a head 1210 with a shank 1220 having an uninterrupted thread 1230 having a major diameter larger than the maximum diameter of the head 1210.

Fastener 1300 has a head 1310 with an external hex drive. The fastener has a shank 1320 with an uninterrupted thread 1330 which tapers at the distal tip 1340.

Fastener 1400 has a shank 1420 with an uninterrupted thread 1430 which has a major thread diameter which is less than the maximum diameter of the head 1410.

FIG. 46 illustrates various drive-types which can be implemented into the fasteners of FIGS. 45A-45D. Drive-type 1512A is a Phillips drive; drive-type 1512B is a Freeroom™ drive; drive-type 1512C is a Mortorq™ drive; drive-type 1512D is a Robertson™ drive; drive-type 1512E is a Pozidriv™ drive; drive-type 1512F is a Supadriv™ drive; drive-type 1512G is an external hex drive; and drive-type 1512H is an internal hex drive. It will be appreciated that each of the drives will have a corresponding fastener driver coupler (designated generally as coupler 1514 in FIG. 47) complementary to the drive for torquing the fastener.

Figure 48:
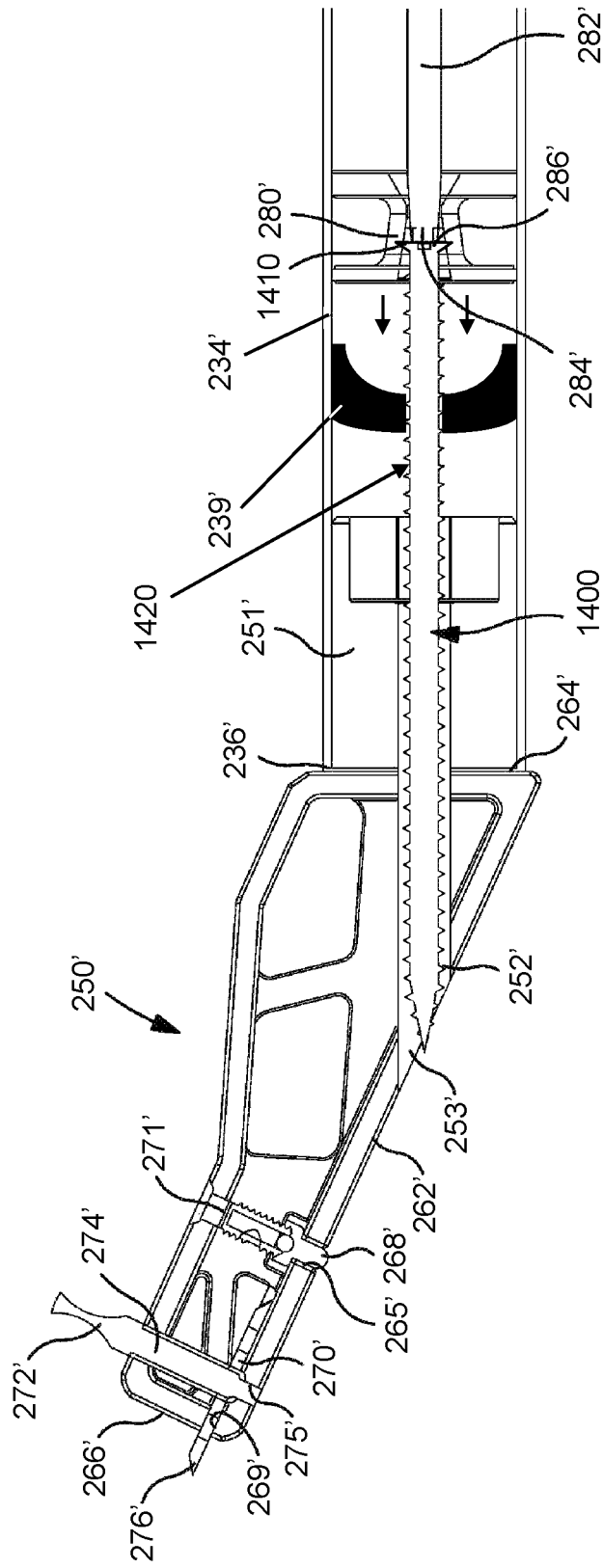
FIG. 48 is an enlarged end sectional view of a modified installation tool and illustrating a fastener having a head with a diameter greater than the maximum thread diameter received therein.

With reference to FIG. 48, a modified fastener guide head assembly 250' is mountable to the distal tip of the various previously described tube assembly. Corresponding components of and features of guide assembly 250 are designated with the same numerals and a prime in FIG. 20. The modified guide head assembly 250' is particularly adapted for fastener 1400 which has a major thread diameter which is less than the maximum diameter of the head 1410. Because the threads have a smaller major diameter than the diameter of the sleeve 252', to allow for the head to be properly driven through the opening 253', it is necessary to ensure that the fastener received in the guide assembly remains at the proper angle. This requires that the fastener threads be centered in the sleeve 252' even though the thread major diameter is significantly less than the diameter than the sleeve 252'. The centering module 239' has resilient wing-like tabs and may be formed of rubber or other resilient material. A centering module 239' is mounted in the distal end of the tube 234'. The centering module 239' inwardly engages against the received fastener shank so that it maintains a substantially proper alignment as it is being driven. The centering module 239' may be either accomplished by a single component or multiple components biased to engage opposing portions of the threads of the fastener.

Figure 47:
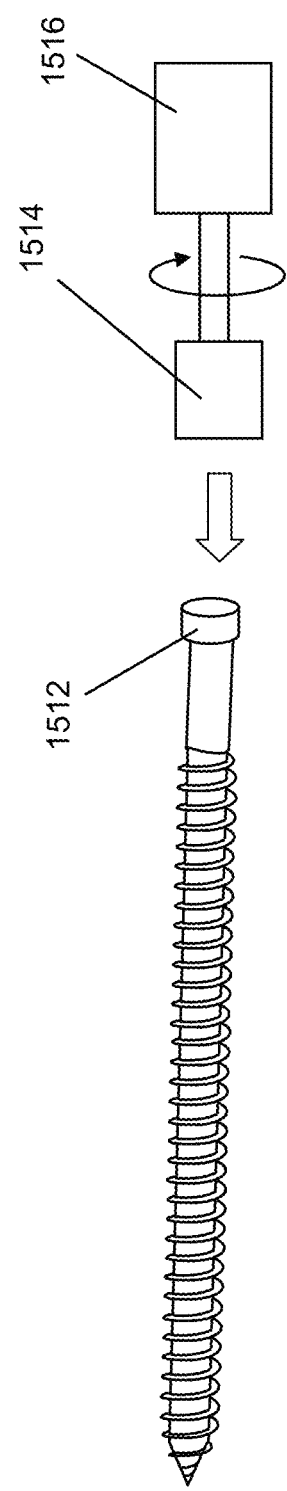
FIG. 47 is a schematic diagram of a torque coupler which is engageable with a fastener having a head with a selected drive-type.

With reference to FIG. 47, the drive-type of a given generic fastener 1500 is designated by the numeral 1512. The drive-type may be any of the previous drive-types described previously in the application. It will be appreciated that the output coupler 1514 of the drive train 1516 will be configured to provide the proper drive torque coupling with a given selected drive-type of the fastener. Accordingly, fasteners having any of the drive-type engagements previously described and any of the fasteners having the head and thread relationships as previously described may thus be employed in the installation tool.

While the preferred embodiments of the foregoing installation tool fasteners and construction system have been set forth for purposes of illustration, the foregoing description should not be deemed a limitation of the inventions herein. Accordingly, various modifications, adaptations and alternatives may occur to one skilled in the art without departing from the spirit and the scope of the present invention.

The invention claimed is:

1. An installation tool and fastener for fastening a first member to a second member comprising:
a fastener having a driver head with a drive-type and a maximum head diameter and a shank extending from said head and having a thread with a major diameter greater than said maximum head diameter;
a transfer assembly comprising an elongated tube assembly having a proximal end portion and a distal end, said proximal end portion adapted to receive a torque driver, and a torque transfer unit disposed in said tube assembly that transfers torque produced by said torque driver to a fastener coupler adjacent said distal end and a centering assembly which engages said fastener to center said fastener to said tube assembly, said centering assembly comprising a centering member having opposed ends and defining a centering axis and continuously extending about said centering axis between said opposed ends along the full axial extent thereof having an enlarged portion which tapers to a reduced portion adjacent the fastener coupler, said enlarged portion being closer to said distal end than said reduced portion: and
a guide assembly mounted at said distal end and having an engagement surface and a fastener channel defining a central axis and having an axial distal channel discharge opening and said central axis disposed at an acute angle to said engagement surface and having a uniform channel diameter which is slightly greater than said major diameter and configured to receive said fastener so that when said engagement surface is positioned relative said first member, said fastener is received in said channel through said distal channel discharge opening, the centering assembly guides the driver head into engagement with the fastener coupler and the torque driver is energized, said fastener coupler rotatably engages said driver head and the torque driver drives said fastener through said distal channel discharge opening and said first member into said second member.

2. The installation tool and fastener of claim 1 wherein the drive-type is selected from the group consisting of Philips drive, external square drive, internal square drive, external hex drive and internal hex drive.

3. The installation tool and fastener of claim 1 wherein said fastener has a longitudinal length of approximately 6.00 inches.

4. The installation tool and fastener of claim 1 wherein said helical thread has a pitch of 7.5 threads per inch.

5. The installation tool and fastener of claim 1 wherein said helical thread extends onto said tapered tip.

6. The installation tool and fastener of claim 1 wherein said major thread diameter is approximately 0.26 inches.

7. The installation tool and fastener of claim 1 wherein said shank has an unthreaded portion adjacent said head.

8. The installation tool and fastener of claim 4 wherein said thread extends approximately 5.00 inches.

9. An installation tool and fastener for fastening a first member to a second member comprising:

a fastener having a head with a drive-type and a maximum head diameter and a shank extending from said head and having a thread with a major diameter less than said maximum head diameter;

a transfer assembly comprising an elongated tube assembly having a proximal end portion and a distal end, said proximal end portion adapted to receive a power tool, and a torque transfer unit disposed in said tube assembly transfers torque produced by said power tool to a fastener coupler adjacent said distal end, and a centering assembly disposed in said tube assembly which engages said fastener to center said fastener in said tube, said centering assembly comprising a centering member having opposed ends defining a centering axis and continuously extending about said centering axis between said opposed ends along the full axial extent thereof and having an enlarged portion which tapers to a reduced portion, said enlarged portion being closer to said distal end than said reduced portion: and a guide assembly mounted at said distal end and having an engagement surface and a fastener channel having a distal channel discharge opening defining an axis at an acute angle to said engagement surface and having a uniform channel diameter which is slightly greater than said maximum diameter and configured to receive said fastener so that when said engagement surface is positioned relative said first member, said fastener is received in said channel through said distal channel discharge opening, said reduced portion guides said driver head into engagement with said fastener coupler, a power tool is energized, said fastener coupler rotatably engages said driver head and the power tool drives said fastener through said distal channel discharge opening and said first member into said second member.

10. The installation tool and fastener of claim 9 wherein the drive-type is selected from the group consisting of Philips drive, external square drive, internal square drive, external hex drive and internal hex drive.

11. The installation tool and fastener of claim 9 wherein said fastener has a longitudinal length of approximately 6.00 inches.

12. An installation tool and fastener for fastening a first member to a second member comprising:

a fastener having a head with an external drive head and a shank extending from said head and having an uninterrupted thread, said fastener having a maximum diameter;

a transfer assembly comprising an elongated telescopic tube assembly having a proximal end portion and a distal end, said proximal end portion adapted to receive a power tool, and a torque transfer unit disposed in said tube assembly transfers torque produced by said power tool to a fastener coupler adjacent said distal end and a centering assembly comprising a tapered member having an enlarged portion and a reduced portion adjacent the fastener coupler which member engages the fastener to center said fastener to said tube, said enlarged portion being closer to said distal end than said reduced portion: said tapered member defining a centering axis and continuously extending about the centering axis between the enlarged portion and the reduced portion along the full axial extend thereof; and a guide assembly mounted at said distal end and having an engagement structure and a fastener channel having a distal end defining an axis at an acute angle to said engagement structure and having a uniform channel diameter which is slightly greater than said maximum diameter and configured to receive said fastener so that when said engagement structure is positioned relative said first member, said fastener is received in said channel through said distal end± said reduced portion guiding said head to engage said fastener coupler, aaet the power tool is energized, said fastener coupler engages said head to rotatably engage said fastener and the power tool drives said fastener through said first member into said second member.

13. The installation tool and fastener of claim 12 wherein the external drive is an external square drive.

14. The installation tool and fastener of claim 12 wherein the external drive is an external hex drive.

15. The installation tool and fastener of claim 12 wherein the fastener has a length and a helical thread which extends at least three fourths of the length of the fastener.

16. The installation tool and fastener of claim 12 wherein said fastener has a longitudinal length of approximately 6.00 inches.

17. The installation tool and fastener assembly of claim 9 wherein said centering assembly further comprises a component which component is spaced from said centering member and engages the thread of the fastener.

18. The installation tool and fastener of claim 17 wherein said component is formed from a resilient rubber material.

19. The installation tool and fastener of claim 12 wherein said centering assembly further comprises a component which component is spaced from said tapered member and engages the thread of the fastener.

20. The installation tool and fastener of claim 19 wherein said component is formed from a resilient rubber material.

* * * * *

UNITED STATES PATENT AND TRADEMARK OFFICE
CERTIFICATE OF CORRECTION

PATENT NO. : 10,603,768 B2
APPLICATION NO. : 15/483424
DATED : March 31, 2020
INVENTOR(S) : R. Timothy Irwin et al.

Page 1 of 1

It is certified that error appears in the above-identified patent and that said Letters Patent is hereby corrected as shown below:

On the Title Page

Item (63):
Replace "Continuation of application No. 14/481,169, filed on Sep. 9, 2014, now Pat No. 10,018,215, which is a continuation-in-part of application No. 14/211,685, filed on Mar. 14, 2014, now Pat No. 9,452,514." with --continuation-in-part of application No. 14/481,169, filed on Sep. 9, 2014, now Pat No. 10,018,215, which is a continuation-in-part of application No. 14/211,685, filed on Mar. 14, 2014, now Pat No. 9,452,514.--

Signed and Sealed this
Fourth Day of August, 2020

Andrei Iancu
*Director of the United States Patent and Trademark Office*